US012486273B2

(12) United States Patent
Chen et al.

(10) Patent No.: US 12,486,273 B2
(45) Date of Patent: Dec. 2, 2025

(54) HYDRO-1H-PYRROLO[1,2-A]PYRAZINE COMPOUNDS FOR THE TREATMENT OF AUTOIMMUNE DISEASE

(71) Applicant: Hoffmann-La Roche Inc., Little Falls, NJ (US)

(72) Inventors: Dongdong Chen, Shanghai (CN); Fabian Dey, Zurich (CH); Dong Ding, Shanghai (CN); Hongtao Xu, Shanghai (CN); Wei Zhu, Shanghai (CN); Ge Zou, Shanghai (CN)

(73) Assignee: Hoffmann-La Roche Inc., Little Falls, NJ (US)

( * ) Notice: Subject to any disclaimer, the term of this patent is extended or adjusted under 35 U.S.C. 154(b) by 834 days.

(21) Appl. No.: 17/777,260

(22) PCT Filed: Nov. 17, 2020

(86) PCT No.: PCT/EP2020/082316
§ 371 (c)(1),
(2) Date: May 16, 2022

(87) PCT Pub. No.: WO2021/099284
PCT Pub. Date: May 27, 2021

(65) Prior Publication Data
US 2023/0219959 A1    Jul. 13, 2023

(30) Foreign Application Priority Data
Nov. 19, 2019    (WO) ................ PCT/CN2019/119517

(51) Int. Cl.
*C07D 487/04*    (2006.01)
*C07D 519/00*    (2006.01)

(52) U.S. Cl.
CPC ......... *C07D 487/04* (2013.01); *C07D 519/00* (2013.01)

(58) Field of Classification Search
CPC .......................... C07D 487/04; C07D 519/00
See application file for complete search history.

(56) References Cited

U.S. PATENT DOCUMENTS

| | | | | |
|---|---|---|---|---|
| 5,703,072 | A | * 12/1997 | Power | ................. C07D 471/04 540/551 |
| 7,642,350 | B2 | 1/2010 | Pryde | |
| 8,163,738 | B2 | 4/2012 | Doherty et al. | |
| 8,729,088 | B2 | 5/2014 | Carson et al. | |
| 10,544,143 | B2 | 1/2020 | Dyckman et al. | |
| 2012/0083473 | A1 | 4/2012 | Holldack et al. | |
| 2014/0088085 | A1 | 3/2014 | Burgess et al. | |
| 2015/0105370 | A1 | 4/2015 | Carlson et al. | |
| 2017/0008885 | A1 | 1/2017 | Koul et al. | |
| 2017/0174653 | A1 | 6/2017 | Sherer et al. | |
| 2018/0037570 | A1 | 2/2018 | Sherer et al. | |
| 2019/0185469 | A1 | 6/2019 | Dyckman et al. | |
| 2020/0325142 | A1 | 10/2020 | Chakravarty et al. | |
| 2022/0340597 | A1 | 10/2022 | Zhu et al. | |
| 2023/0022297 | A1 | 1/2023 | Chen et al. | |
| 2023/0034723 | A1 | 2/2023 | Xu et al. | |

FOREIGN PATENT DOCUMENTS

| | | |
|---|---|---|
| CL | 2014000301 | 10/2014 |
| CL | 2014003278 A1 | 6/2015 |
| CL | 2016000662 A1 | 12/2016 |
| CL | 2018001624 A1 | 9/2018 |
| CL | 2021002521 A1 | 4/2022 |
| CN | 105992766 A | 10/2016 |
| CN | 108794485 A | 11/2018 |
| WO | 2012/084704 A1 | 6/2012 |
| WO | 2012/097177 A2 | 7/2012 |
| WO | 2013/181579 A2 | 12/2013 |
| WO | 2015/057655 A1 | 4/2015 |
| WO | 2015/057659 A1 | 4/2015 |
| WO | 2015/088045 A1 | 6/2015 |
| WO | 2017/081111 A1 | 5/2017 |
| WO | 2017/106607 A1 | 6/2017 |
| WO | 2018/005586 A1 | 1/2018 |
| WO | 2018/026620 A1 | 2/2018 |
| WO | 2018/031434 A1 | 2/2018 |
| WO | 2018/047081 A1 | 3/2018 |
| WO | 2018/049089 A1 | 3/2018 |
| WO | 2018/232274 A1 | 12/2018 |
| WO | 2019/018354 A1 | 1/2019 |
| WO | 2019/028301 A1 | 2/2019 |
| WO | 2019/028302 A1 | 2/2019 |
| WO | 2019/099336 A1 | 5/2019 |
| WO | 2019/118799 A1 | 6/2019 |
| WO | 2019/123294 A2 | 6/2019 |

(Continued)

OTHER PUBLICATIONS

PubChem CID 5234, National Center for Biotechnology Information. PubChem Compound Summary for CID 5234, Sodium Chloride. https://pubchem.ncbi.nlm.nih.gov/compound/Sodium-Chloride. Accessed Apr. 4, 2025, create date Mar. 25, 2005. (Year: 2005).*

"International Preliminary Report on Patentability—PCT/EP2020/082316" (Report Issuance Date: May 17, 2022; Chapter I), :pp. 1-8 (Jun. 2, 2022).

"International Search Report—PCT/EP2020/082316" (w/Written Opinion), :pp. 1-13 (Dec. 16, 2020).

Alper, P., et al., "Discovery of potent, orally bioavailable in vivo efficacious antagonists of the TLR7/8 pathway" Bioorg Med Chem Lett 30(17):127366 (1-5) (Sep. 1, 2020).

Barrat, F., et al., "Treatment of lupus-prone mice with a dual inhibitor of TLR7 and TLR9 Leads to reduction of autoantibody production and amelioration of disease symptoms" Eur J Immunol (Epub: Nov. 29, 2007), 37(12):3582-3586 (Dec. 1, 2007).

(Continued)

Primary Examiner — Laura L Stockton
(74) Attorney, Agent, or Firm — Bradley E. Davis

(57)    ABSTRACT

The present invention relates to compounds of formula (I), wherein $R^1$ to $R^3$ and n are as described herein, and their pharmaceutically acceptable salt thereof, and compositions including the compounds and methods of using the compounds.

18 Claims, No Drawings

(56) References Cited

FOREIGN PATENT DOCUMENTS

| WO | 2019/125849 A1 | 6/2019 |
|---|---|---|
| WO | 2019/126081 A1 | 6/2019 |
| WO | 2019/126082 A1 | 6/2019 |
| WO | 2019/126083 A1 | 6/2019 |
| WO | 2019/126113 A1 | 6/2019 |
| WO | 2019/126242 A1 | 6/2019 |
| WO | 2019/126253 A1 | 6/2019 |
| WO | 2019/220390 A1 | 11/2019 |
| WO | 2019/233941 A1 | 12/2019 |
| WO | 2019/238629 A1 | 12/2019 |
| WO | 2020/020800 A1 | 1/2020 |
| WO | 2020/064792 A1 | 4/2020 |
| WO | 2020/207991 A1 | 10/2020 |
| WO | 2021/084022 A1 | 5/2021 |
| WO | 2021/099284 A1 | 5/2021 |
| WO | 2021/110614 A1 | 6/2021 |

OTHER PUBLICATIONS

Devarapu, S et al., "Toll-like receptors in lupus nephritis" Journal of Biomedical Science:1-11 (2018).

Horig, H., et al., "From bench to clinic and back: Perspective on the 1st IQPC Translational Research conference" J Transl Med 2:44-44 (Dec. 20, 2004).

"International Preliminary Report on Patentability—PCT/EP2020/059831" (Report Issuance Date: Sep. 28, 2021, Chapter I),:1-8 (Oct. 21, 2021).

"International Preliminary Report on Patentability—PCT/EP2020/080430" (Report Issuance Date: May 3, 2022; Chapter I),:pp. 1-8 (May 12, 2022).

"International Preliminary Report on Patentability—PCT/EP2020/083996" (Report Issuance Date: May 17, 2022; Chapter I),:pp. 1-10 (Jun. 16, 2022).

"International Search Report—PCT/EP2020/059831" (w/Written Opinion),:pp. 1-12 (Jun. 3, 2020).

"International Search Report—PCT/EP2020/080430" (w/Written Opinion),:pp. 1-11 (Dec. 23, 2020).

"International Search Report—PCT/EP2020/083996" (w/Written Opinion),:pp. 1-17 (Feb. 19, 2021).

Knoepfel, T., et al., "Target-Based Identification and Optimization of 5-Indazol-5-yl Pyridones as Toll-like Receptor 7 and 8 Antagonists Using a Biochemical TLR8 Antagonist Competition Assay" J Med Chem 63(15):8276-8295 (Jul. 30, 2020).

Mussari, C., et al., "Discovery of Potent and Orally Bioavailable Small Molecule Antagonists of Toll-like Receptors 7/8/9 (TLR7/8/9)" ACS Med Chem Lett 11(9):1751-1758 (Jul. 29, 2020).

"PubChem CID 5234, National Center for Biotechnology Information. PubChem Compound Summary for CID 5234, Sodium Chloride. https://pubchem.ncbi.nlm.nih.gov/compound/Sodium-Chloride. Accessed Apr. 25, 2025 (Year: 2005)".

Schafer, S. et al., "Failure is an option: learning from unsuccessful proof-of-concept trials" Drug Discov Today (Epub: Jun. 17, 2008), 13(21-22):913-916 (Nov. 1, 2008).

USPTO, Chen, D., et al., "U.S. Appl. No. 17/777,260, filed May 16, 2022 entitled 'Hydro-1H-Pyrrolo[1,2-A]Pyrazine Compounds for the Treatment of Autoimmune Disease".

USPTO, Chen, J., et al., "U.S. Appl. No. 17/780,161, filed May 26, 2022 entitled 'Hydropyrido[1,2-a]Pyrazine Compounds for the Treatment of Autoimmune Disease'".

USPTO, "U.S. Appl. No. 17/772,930 entitled Hydropyrazino[1,2-D][1,4]Diazepine Compounds for the Treatment of Autoimmune Disease' filed Apr. 28, 2022".

USPTO, "U.S. Appl. No. 17/777,260 entitled 'Hydro-1H-Pyrrolo[1,2-A]Pyrazine Compounds for the Treatment of Autoimmune Disease' filed May 16, 2022".

\* cited by examiner

HYDRO-1H-PYRROLO[1,2-A]PYRAZINE COMPOUNDS FOR THE TREATMENT OF AUTOIMMUNE DISEASE

CROSS-REFERENCE TO RELATED APPLICATIONS

This application is a National Stage Entry under 35 U.S.C. § 371 of International Application No. PCT/EP2020/082316, filed Nov. 17, 2020, which claims benefit of priority under 35 U.S.C. § 119(a) to Application No. PCT/CN2019/119517 filed in P. R. China, Nov. 19, 2019.

The present invention relates to organic compounds useful for therapy and/or prophylaxis in a mammal, and in particular to antagonist of TLR7 and/or TLR8 and/or TLR9 useful for treating systemic lupus erythematosus or lupus nephritis.

FIELD OF THE INVENTION

Autoimmune connective tissue disease (CTD) include prototypical autoimmune syndromes such as Systemic Lupus Erythematosus (SLE), primary Sjögren's syndrome (pSjS), mixed connective tissue disease (MCTD), Dermatomyositis/Polymyositis (DM/PM), Rheumatoid Arthritis (RA), and systemic sclerosis (SSc). With the exception of RA, no really effective and safe therapies are available to patients. SLE represents the prototypical CTD with a prevalence of 20-150 per 100,000 and causes broad inflammation and tissue damage in distinct organs, from commonly observed symptoms in the skin and joints to renal, lung, or heart failure. Traditionally, SLE has been treated with non-specific anti-inflammatory or immunosuppressive drugs. However, long-term usage of immunosuppressive drug, e.g. corticosteroids is only partially effective, and is associated with undesirable toxicity and side effects. Belimumab is the only FDA-approved drug for lupus in the last 50 years, despite its modest and delayed efficacy in only a fraction of SLE patients (Navarra, S. V. et al *Lancet* 2011, 377, 721). Other biologics, such as anti-CD20 mAbs, mAbs against or soluble receptors of specific cytokines, have failed in most clinical studies. Thus, novel therapies are required that provide sustained improvement in a greater proportion of patient groups and are safer for chronic use in many autoimmune as well as auto-inflammation diseases.

Toll like Receptors (TLR) are an important family of pattern recognition receptors (PRR) which can initiate broad immune responses in a wide variety of immune cells. As natural host defense sensors, endosomal TLRs 7, 8 and 9 recognize nucleic acids derived from viruses, bacteria; specifically, TLR7/8 and TLR9 recognize single-stranded RNA (ssRNA) and single-stranded CpG-DNA, respectively. However, aberrant nucleic acid sensing of TRL7, 8, 9 is considered as a key node in a broad of autoimmune and auto-inflammatory diseases (Krieg, A. M. et al. *Immunol. Rev.* 2007, 220, 251. Jiménez-Dalmaroni, M. J. et al *Autoimmun Rev.* 2016, 15, 1. Chen, J. Q., et al. *Clinical Reviews in Allergy & Immunology* 2016, 50, 1.). Anti-RNA and anti-DNA antibodies are well-established diagnostic markers of SLE, and these antibodies can deliver both self-RNA and self-DNA to endosomes. While self-RNA complexes can be recognized by TLR7 and TLR8, self-DNA complexes can trigger TLR9 activation. Indeed, defective clearance of self-RNA and self-DNA from blood and/or tissues is evident in SLE (Systemic Lupus Erythematosus) patients. TLR7 and TLR9 have been reported to be upregulated in SLE tissues, and correlate with chronicity and activity of lupus nephritis, respectively. In B cells of SLE patients, TLR7 expression correlates with anti-RNP antibody production, while TLR9 expression with IL-6 and anti-dsDNA antibody levels. Consistently, in lupus mouse models, TLR7 is required for anti-RNA antibodies, and TLR9 is required for anti-nucleosome antibody. On the other hand, overexpression of TLR7 or human TLR8 in mice promotes autoimmunity and auto-inflammation. Moreover, activation of TLR8 specifically contributes to inflammatory cytokine secretion of mDC/macrophages, neutrophil NETosis, induction of Th17 cells, and suppression of Treg cells. In addition to the described role of TLR9 in promoting autoantibody production of B cells, activation of TLR9 by self-DNA in pDC also leads to induction of type I IFNs and other inflammatory cytokines. Given these roles of TLR9 in both pDC and B cells, both as key contributors to the pathogenesis of autoimmune diseases, and the extensive presence of self-DNA complexes that could readily activate TLR9 in many patients with autoimmune diseases, it may have extra benefit to further block self-DNA mediated TLR9 pathways on top of inhibition of TLR7 and TLR8 pathways. Taken together, TLR7, 8 and 9 pathways represent new therapeutic targets for the treatment of autoimmune and auto-inflammatory diseases, for which no effective steroid-free and non-cytotoxic oral drugs exist, and inhibition of all these pathways from the very upstream may deliver satisfying therapeutic effects. As such, we invented oral compounds that target and suppress TLR7, TLR8 and TLR9 for the treatment of autoimmune and auto-inflammatory diseases.

SUMMARY OF THE INVENTION

The present invention relates to novel compounds of formula (I) or (Ia), wherein

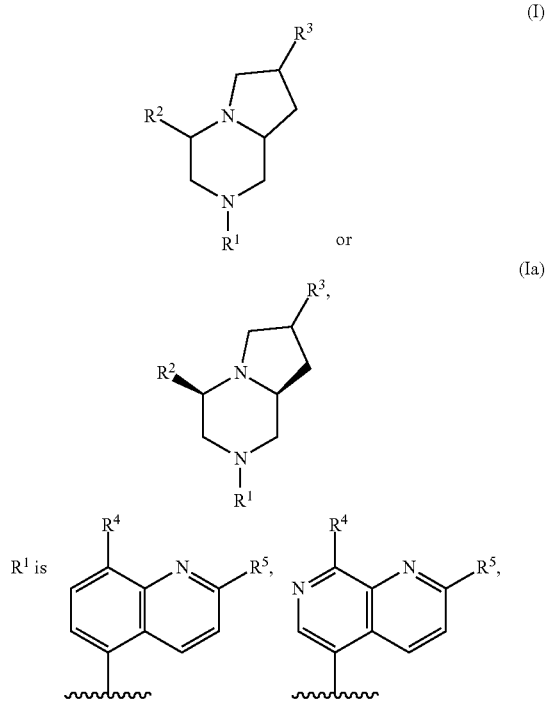

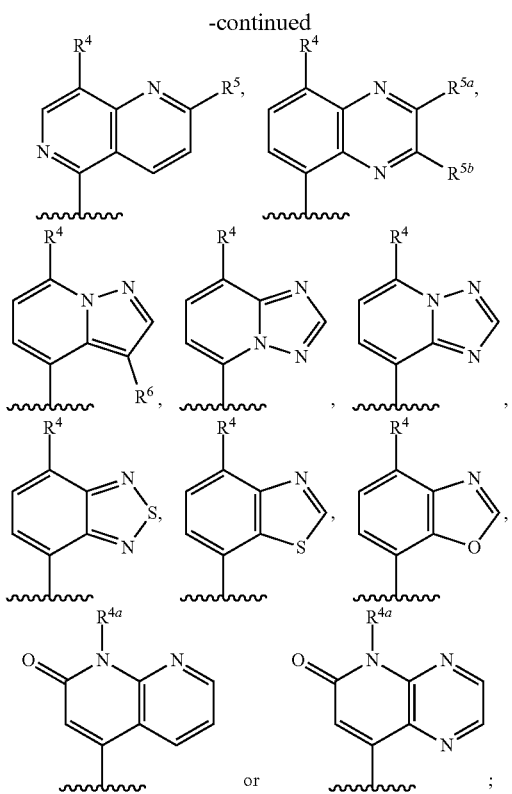

wherein R⁴ is $C_{1-6}$alkyl, $C_{1-6}$alkoxy, halo$C_{1-6}$alkyl, halogen, nitro or cyano; $R^{4a}$ is $C_{1-6}$alkyl or $C_{3-7}$cycloalkyl; $R^5$, $R^{5a}$ and $R^{5b}$ are independently selected from H and deuterium; $R^6$ is H or halogen;

$R^2$ is $C_{1-6}$alkyl;

$R^3$ is a 5-7 membered monocyclic aryl or heteroaryl, or a 7-12 membered bicyclic heterocyclyl, heterocyclyl-heterocyclyl, heterocyclylamino, $C_{1-6}$alkyl (heterocyclyl)amino or heterocyclyloxy;

or a pharmaceutically acceptable salt thereof.

Another object of the present invention is related to novel compounds of formula (I) or (Ia). Their manufacture, medicaments based on a compound in accordance with the invention and their production as well as the use of compounds of formula (I) or (Ia) as TLR7 and/or TLR8 and/or TLR9 antagonist, and for the treatment or prophylaxis of systemic lupus erythematosus or lupus nephritis. The compounds of formula (I) or (Ia) show superior TLR7 and TLR8 and TLR9 antagonism activity. In addition, the compounds of formula (I) or (Ia) also show good cytotoxicity, phototoxicity, solubility, hPBMC, human microsome stability and SDPK profiles, as well as low CYP inhibition.

DETAILED DESCRIPTION OF THE INVENTION

Definitions

The term "$C_{1-6}$alkyl" denotes a saturated, linear or branched chain alkyl group containing 1 to 6, particularly 1 to 4 carbon atoms, for example methyl, ethyl, n-propyl, isopropyl, n-butyl, isobutyl, tert-butyl and the like. Particular "$C_{1-6}$alkyl" groups are methyl, ethyl and n-propyl.

The term "halogen" and "halo" are used interchangeably herein and denote fluoro, chloro, bromo, or iodo.

The term "aryl" denotes an aromatic hydrocarbon mono- or bicyclic ring system of 5 to 12 ring atoms. Examples of aryl include, but not limited to, phenyl and naphthyl. Aryl can be further substituted by substituents includes, but not limited to $C_{1-6}$alkyl; 3,4,4a,5,7,7a-hexahydro-2H-pyrrolo[3,4-b][1,4]oxazinyl; 1,4-diazepanyl; 2,6-diazaspiro[3.3]heptanyl substituted by $C_{1-6}$alkyl; 5-oxa-2,8-diazaspiro[3.5]nonanyl; amino-1,4-oxazepanyl; azetidinyl substituted by one or two substituents independently selected from amino and $C_{1-6}$alkyl; piperazinyl unsubstituted or substituted by $C_{1-6}$alkyl; and pyrrolidinyl substituted by one or two substituents independently selected from amino, $C_{1-6}$alkoxy and halogen.

The term "heteroaryl" denotes an aromatic heterocyclic mono- or bicyclic ring system of 5 to 12 ring atoms, comprising 1, 2, 3 or 4 heteroatoms selected from N, O and S, the remaining ring atoms being carbon. Examples of heteroaryl moieties include, but not limited to, pyrrolyl, furanyl, thienyl, imidazolyl, oxazolyl, thiazolyl, triazolyl, oxadiazolyl, thiadiazolyl, tetrazolyl, pyridinyl, pyrazinyl, pyrazolyl, pyridazinyl, pyrimidinyl, triazinyl, isoxazolyl, benzofuranyl, isothiazolyl, benzothienyl, indolyl, isoindolyl, isobenzofuranyl, benzimidazolyl, benzoxazolyl, benzoisoxazolyl, benzothiazolyl, benzoisothiazolyl, benzooxadiazolyl, benzothiadiazolyl, benzotriazolyl, purinyl, quinolinyl, isoquinolinyl, quinazolinyl or quinoxalinyl. Heteroaryl can be further substituted by substituents include, but not limited to $C_{1-6}$alkyl; 3,4,4a,5,7,7a-hexahydro-2H-pyrrolo[3,4-b][1,4]oxazinyl; 1,4-diazepanyl; 2,6-diazaspiro[3.3]heptanyl substituted by $C_{1-6}$alkyl; 5-oxa-2,8-diazaspiro[3.5]nonanyl; amino-1,4-oxazepanyl; azetidinyl substituted by one or two substituents independently selected from amino and $C_{1-6}$alkyl; piperazinyl unsubstituted or substituted by $C_{1-6}$alkyl; and pyrrolidinyl substituted by one or two substituents independently selected from amino, $C_{1-6}$alkoxy and halogen.

The term "heterocyclyl" or "heterocyclic" denotes a monovalent saturated or partly unsaturated mono or bicyclic ring system of 3 to 12 ring atoms, comprising 1 to 5 ring heteroatoms selected from N, O and S, the remaining ring atoms being carbon. In particular embodiments, heterocyclyl is a monovalent saturated monocyclic ring system of 4 to 7 ring atoms, comprising 1, 2, or 3 ring heteroatoms selected from N, O and S, the remaining ring atoms being carbon. Examples for monocyclic saturated heterocyclyl are aziridinyl, oxiranyl, azetidinyl, oxetanyl, pyrrolidinyl, tetrahydrofuranyl, tetrahydrothienyl, pyrazolidinyl, imidazolidinyl, oxazolidinyl, isoxazolidinyl, thiazolidinyl, piperidinyl, tetrahydropyranyl, tetrahydrothiopyranyl, piperazinyl, morpholinyl, thiomorpholinyl, 1,1-dioxo-thiomorpholin-4-yl, azepanyl, diazepanyl, homopiperazinyl, oxazepanyl. Examples for bicyclic saturated heterocyclic ring are azabicyclo[3.2.1]octyl, quinuclidinyl, oxaazabicyclo[3.2.1]octanyl, azabicyclo[3.3.1]nonanyl, oxaaza-bicyclo[3.3.1]nonanyl, azabicyclo[3.1.0]hexanyl, oxodiazaspiro[3.4]octanyl, acetyloxodiazaspiro[3.4]octanyl, thiaazabicyclo[3.3.1]nonanyl, oxoazaspiro[2.4]heptanyl, oxoazaspiro[3.4]octanyl, oxoazabicyclo[3.1.0]hexanyl and dioxotetrahydropyrrolo[1,2-a]pyrazinyl. Examples for bicyclic heterocyclyl include, but not limited to, 1,2,3,4-tetrahydroisoquinolinyl; 5,6,7,8-tetrahydro-1,6-naphthyridinyl; 5,6,7,8-tetrahydro-1,7-naphthyridinyl; 5,6,7,8-tetrahydro-2,6-naphthyridinyl; 5,6,7,8-tetrahydro-2,7-naphthyridinyl; isoindolinyl; 3,4-dihydro-1H-2,6-naphthyridinyl; 7,8-dihydro-5H-1,6-naphthyridinyl; 4,5,6,7-tetrahydropyrazolo[3,4-c]pyridinyl; 6,7-dihydro-5H-pyrrolo[3,4-b]pyridinyl; 2,9-diazaspiro[5.5]undecanyl; 3,8-diazabicyclo[3.2.1]octanyl;

7,8-dihydro-5H-pyrido[3,4-b]pyrazinyl; 5,6,7,8-tetrahydropyrido[4,3-d]pyrimidinyl and 3,4-dihydro-1H-isoquinolinyl. Monocyclic or bicyclic heterocyclyl can be further substituted by amino, hydroxy, halogen, $C_{1-6}$alkyl, $C_{1-6}$alkoxy or heterocyclyl.

The term "heterocyclylamino" denotes heterocyclyl-NH—.

The term "heterocyclyloxy" denotes heterocyclyl-O—.

The term "pharmaceutically acceptable salts" denotes salts which are not biologically or otherwise undesirable. Pharmaceutically acceptable salts include both acid and base addition salts.

The term "pharmaceutically acceptable acid addition salt" denotes those pharmaceutically acceptable salts formed with inorganic acids such as hydrochloric acid, hydrobromic acid, sulfuric acid, nitric acid, carbonic acid, phosphoric acid, and organic acids selected from aliphatic, cycloaliphatic, aromatic, araliphatic, heterocyclic, carboxylic, and sulfonic classes of organic acids such as formic acid, acetic acid, propionic acid, glycolic acid, gluconic acid, lactic acid, pyruvic acid, oxalic acid, malic acid, maleic acid, maloneic acid, succinic acid, fumaric acid, tartaric acid, citric acid, aspartic acid, ascorbic acid, glutamic acid, anthranilic acid, benzoic acid, cinnamic acid, mandelic acid, embonic acid, phenylacetic acid, methanesulfonic acid, ethanesulfonic acid, p-toluenesulfonic acid, and salicyclic acid.

The term "pharmaceutically acceptable base addition salt" denotes those pharmaceutically acceptable salts formed with an organic or inorganic base. Examples of acceptable inorganic bases include sodium, potassium, ammonium, calcium, magnesium, iron, zinc, copper, manganese, and aluminum salts. Salts derived from pharmaceutically acceptable organic nontoxic bases includes salts of primary, secondary, and tertiary amines, substituted amines including naturally occurring substituted amines, cyclic amines and basic ion exchange resins, such as isopropylamine, trimethylamine, diethylamine, triethylamine, tripropylamine, ethanolamine, 2-diethylaminoethanol, trimethamine, dicyclohexylamine, lysine, arginine, histidine, caffeine, procaine, hydrabamine, choline, betaine, ethylenediamine, glucosamine, methylglucamine, theobromine, purines, piperizine, piperidine, N-ethylpiperidine, and polyamine resins.

The term "A pharmaceutically active metabolite" denotes a pharmacologically active product produced through metabolism in the body of a specified compound or salt thereof. After entry into the body, most drugs are substrates for chemical reactions that may change their physical properties and biologic effects. These metabolic conversions, which usually affect the polarity of the compounds of the invention, alter the way in which drugs are distributed in and excreted from the body. However, in some cases, metabolism of a drug is required for therapeutic effect.

The term "therapeutically effective amount" denotes an amount of a compound or molecule of the present invention that, when administered to a subject, (i) treats or prevents the particular disease, condition or disorder, (ii) attenuates, ameliorates or eliminates one or more symptoms of the particular disease, condition, or disorder, or (iii) prevents or delays the onset of one or more symptoms of the particular disease, condition or disorder described herein. The therapeutically effective amount will vary depending on the compound, the disease state being treated, the severity of the disease treated, the age and relative health of the subject, the route and form of administration, the judgement of the attending medical or veterinary practitioner, and other factors.

The term "pharmaceutical composition" denotes a mixture or solution comprising a therapeutically effective amount of an active pharmaceutical ingredient together with pharmaceutically acceptable excipients to be administered to a mammal, e.g., a human in need thereof.

Antagonist of TLR7 and/or TLR8 and/or TLR9

The present invention relates to (i) a compound of formula (I),

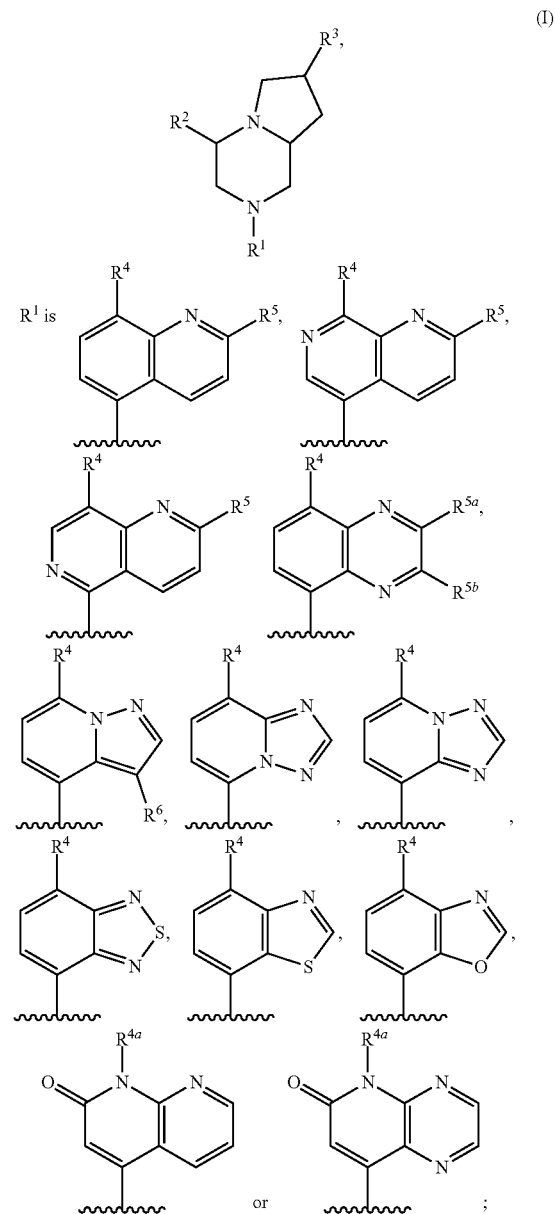

or wherein $R^4$ is $C_{1-6}$alkyl, $C_{1-6}$alkoxy, halo$C_{1-6}$alkyl, halogen, nitro or cyano; $R^{4a}$ is $C_{1-6}$alkyl or $C_{3-7}$cycloalkyl; $R^5$, $R^{5a}$ and $R^{5b}$ are independently selected from H and deuterium; $R^6$ is H or halogen;

$R^2$ is $C_{1-6}$alkyl;

$R^3$ is a 5-7 membered monocyclic aryl or heteroaryl, or a 7-12 membered bicyclic heterocyclyl, heterocyclylheterocyclyl, heterocyclylamino, $C_{1-6}$alkyl (heterocyclyl)amino or heterocyclyloxy;

or a pharmaceutically acceptable salt thereof.

Further embodiment of present invention is (ii) a compound of formula (I) according to (i), wherein
R¹ is

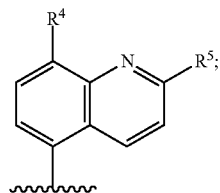

wherein R⁴ is cyano; R⁵ is H or deuterium;
R² is C$_{1-6}$alkyl;
R³ is (5,6,7,8-tetrahydro-2,6-naphthyridinyl)piperazinyl; (amino(C$_{1-6}$alkoxy)pyrrolidinyl)-3,4-dihydro-1H-2,6-naphthyridinyl; (amino(C$_{1-6}$alkoxy)pyrrolidinyl)-7,8-dihydro-5H-1,6-naphthyridinyl; (C$_{1-6}$alkyl)$_2$aminopiperidinyl; (C$_{1-6}$alkyl-4,5,6,7-tetrahydropyrazolo[3,4-c]pyridinyl)azetidinyl; (C$_{1-6}$alkyl-5,6,7,8-tetrahydro-1,6-naphthyridinyl)amino; (C$_{1-6}$alkyl-5,6,7,8-tetrahydro-2,6-naphthyridinyl)amino; (C$_{1-6}$alkyl-6,7-dihydro-5H-pyrrolo[3,4-b]pyridinyl)amino; (C$_{1-6}$alkyl-7,8-dihydro-5H-1,6-naphthyridinyl)amino; 2,9-diazaspiro[5.5]undecanyl; 3,8-diazabicyclo[3.2.1]octanyl; 4,5,6,7-tetrahydropyrazolo[3,4-c]pyridinyl; 5,6,7,8-tetrahydro-1,6-naphthyridinylamino; 5,6,7,8-tetrahydro-1,6-naphthyridinyloxy; 5,6,7,8-tetrahydro-1,7-naphthyridinylamino; 5,6,7,8-tetrahydro-2,6-naphthyridinylamino; 5,6,7,8-tetrahydropyrido[4,3-d]pyrimidinylamino; amino(C$_{1-6}$ alkyl)azetidinyl; amino(C$_{1-6}$alkyl)piperidinyl; amino(C$_{1-6}$alkyl)pyrrolidinyl; C$_{1-6}$alkyl(5,6,7,8-tetrahydro-1,6-naphthyridinyl) amino; piperazinyl; piperazinyl-3,4-dihydro-1H-isoquinolinyl or piperazinyl-7,8-dihydro-5H-pyrido[3,4-b]pyrazinyl;
or a pharmaceutically acceptable salt thereof.

Another embodiment of present invention is (iii) a compound of formula (Ia),

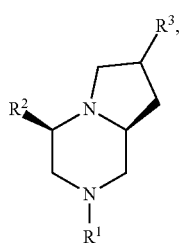

(Ia)

wherein
R¹ is

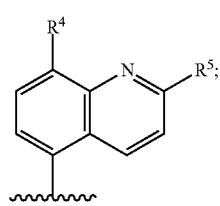

wherein R⁴ is cyano; R⁵ is H or deuterium;
R² is C$_{1-6}$alkyl;
R³ is (5,6,7,8-tetrahydro-2,6-naphthyridinyl)piperazinyl; (amino(C$_{1-6}$alkoxy)pyrrolidinyl)-3,4-dihydro-1H-2,6-naphthyridinyl; (amino(C$_{1-6}$alkoxy)pyrrolidinyl)-7,8-dihydro-5H-1,6-naphthyridinyl; (C$_{1-6}$alkyl)$_2$aminopiperidinyl; (C$_{1-6}$alkyl-4,5,6,7-tetrahydropyrazolo[3,4-c]pyridinyl)azetidinyl; (C$_{1-6}$alkyl-5,6,7,8-tetrahydro-1,6-naphthyridinyl)amino; (C$_{1-6}$alkyl-5,6,7,8-tetrahydro-2,6-naphthyridinyl)amino; (C$_{1-6}$alkyl-6,7-dihydro-5H-pyrrolo[3,4-b]pyridinyl)amino; (C$_{1-6}$alkyl-7,8-dihydro-5H-1,6-naphthyridinyl)amino; 2,9-diazaspiro[5.5]undecanyl; 3,8-diazabicyclo[3.2.1]octanyl; 4,5,6,7-tetrahydropyrazolo[3,4-c]pyridinyl; 5,6,7,8-tetrahydro-1,6-naphthyridinylamino; 5,6,7,8-tetrahydro-1,6-naphthyridinyloxy; 5,6,7,8-tetrahydro-1,7-naphthyridinylamino; 5,6,7,8-tetrahydro-2,6-naphthyridinylamino; 5,6,7,8-tetrahydropyrido[4,3-d]pyrimidinylamino; amino(C$_{1-6}$ alkyl)azetidinyl; amino(C$_{1-6}$alkyl)piperidinyl; amino(C$_{1-6}$alkyl)pyrrolidinyl; C$_{1-6}$alkyl(5,6,7,8-tetrahydro-1,6-naphthyridinyl) amino; piperazinyl; piperazinyl-3,4-dihydro-1H-isoquinolinyl or piperazinyl-7,8-dihydro-5H-pyrido[3,4-b]pyrazinyl;
or a pharmaceutically acceptable salt thereof.

A further embodiment of present invention is (iv) a compound of formula (I) or (Ia), or a pharmaceutically acceptable salt thereof, according to any one of (i) to (iii), wherein R¹ is

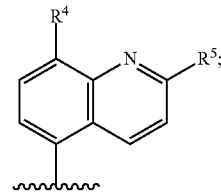

wherein R⁴ is cyano; R⁵ is deuterium.

A further embodiment of present invention is (v) a compound of formula (I) or (Ia) according to any one of (i) to (iv), wherein R³ is (3-amino-4-methoxy-pyrrolidin-1-yl)-3,4-dihydro-1H-2,6-naphthyridin-2-yl; (3-amino-4-methoxy-pyrrolidin-1-yl)-7,8-dihydro-5H-1,6-naphthyridin-6-yl; (5,6,7,8-tetrahydro-2,6-naphthyridin-3-yl)piperazin-1-yl; (5-methyl-4,5,6,7-tetrahydropyrazolo[3,4-c]pyridin-1-yl)azetidin-1-yl; (5-methyl-4,5,6,7-tetrahydropyrazolo[3,4-c]pyridin-2-yl)azetidin-1-yl; (5-methyl-5,6,7,8-tetrahydro-2,6-naphthyridin-3-yl)amino; (5-methyl-6,7-dihydro-5H-pyrrolo[3,4-b]pyridin-2-yl)amino; (6-methyl-7,8-dihydro-5H-1,6-naphthyridin-2-yl)amino; (7-methyl-5,6,7,8-tetrahydro-1,6-naphthyridin-2-yl)amino; 2,9-diazaspiro[5.5]undecan-9-yl; 3,8-diazabicyclo[3.2.1]octan-3-yl; 3-amino-3-methyl-azetidin-1-yl; 3-amino-3-methyl-pyrrolidin-1-yl; 3-piperazin-1-yl-7,8-dihydro-5H-pyrido[3,4-b]pyrazin-6-yl; 4-(dimethylamino)-1-piperidinyl; 4,5,6,7-tetrahydropyrazolo[3,4-c]pyridin-1-yl; 4,5,6,7-tetrahydropyrazolo[3,4-c]pyridin-2-yl; 4-amino-4-methyl-1-piperidinyl; 5,6,7,8-tetrahydro-1,6-naphthyridin-2-ylamino; 5,6,7,8-tetrahydro-1,6-naphthyridin-2-yloxy; 5,6,7,8-tetrahydro-1,7-naphthyridin-2-ylamino; 5,6,7,8-tetrahydro-2,6-naphthyridin-3-ylamino; 5,6,7,8-tetrahydropyrido[4,3-d]pyrimidin-2-ylamino; 6-piperazin-1-yl-3,4-dihydro-1H-isoquinolin-2-yl; methyl(5,6,7,8-tetrahydro-1,6-naphthyridin-2-yl)amino or piperazin-1-yl.

A further embodiment of present invention is (vi) a compound of formula (I) or (Ia), or a pharmaceutically acceptable salt thereof, according to any one of (i) to (v), wherein R² is methyl.

A further embodiment of present invention is (vii) a compound of formula (I) or (Ia), or a pharmaceutically acceptable salt thereof, according to any one of (i) to (vi), wherein R³ is (C₁₋₆alkyl)₂aminopiperidinyl; (C₁₋₆alkyl-4,5,6,7-tetrahydropyrazolo[3,4-c]pyridinyl)azetidinyl; 3,8-diazabicyclo[3.2.1]octanyl; piperazinyl or piperazinyl-7,8-dihydro-5H-pyrido[3,4-b]pyrazinyl.

A further embodiment of present invention is (viii) a compound of formula (I) or (Ia), or a pharmaceutically acceptable salt thereof, according to any one of (i) to (vii), wherein R³ is (5-methyl-4,5,6,7-tetrahydropyrazolo[3,4-c]pyridin-1-yl)azetidin-1-yl; 3,8-diazabicyclo[3.2.1]octan-3-yl; 3-piperazin-1-yl-7,8-dihydro-5H-pyrido[3,4-b]pyrazin-6-yl; 4-(dimethylamino)-1-piperidinyl or piperazin-1-yl.

A further embodiment of present invention is (ix) a compound of formula (I) or (Ia), or a pharmaceutically acceptable salt thereof, according to any one of (i) to (viii), wherein
R¹ is

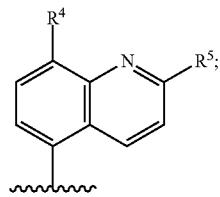

wherein R⁴ is cyano; R⁵ is deuterium;
R² is C₁₋₆alkyl;
R³ is (C₁₋₆alkyl)₂aminopiperidinyl; (C₁₋₆alkyl-4,5,6,7-tetrahydropyrazolo[3,4-c]pyridinyl)azetidinyl; 3,8-diazabicyclo[3.2.1]octanyl; piperazinyl or piperazinyl-7,8-dihydro-5H-pyrido[3,4-b]pyrazinyl;
or a pharmaceutically acceptable salt thereof.

A further embodiment of present invention is (x) a compound of formula (I) or (Ia), or a pharmaceutically acceptable salt thereof, according to any one of (i) to (ix), wherein
R¹ is

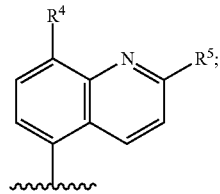

wherein R⁴ is cyano; R⁵ is deuterium;
R² is methyl;
R³ is (5-methyl-4,5,6,7-tetrahydropyrazolo[3,4-c]pyridin-1-yl)azetidin-1-yl; 3,8-diazabicyclo[3.2.1]octan-3-yl; 3-piperazin-1-yl-7,8-dihydro-5H-pyrido[3,4-b]pyrazin-6-yl; 4-(dimethylamino)-1-piperidinyl or piperazin-1-yl;
or a pharmaceutically acceptable salt thereof.

Another embodiment of present invention is a compound of formula (I) or (Ia) selected from the following:
5-[(4R,7R,8aS)-4-methyl-7-(5,6,7,8-tetrahydro-1,6-naphthyridin-2-ylamino)-3,4,6,7,8,8a-hexahydro-1H-pyrrolo[1,2-a]pyrazin-2-yl]quinoline-8-carbonitrile;
5-[(4R,7R,8aS)-4-methyl-7-(5,6,7,8-tetrahydro-2,6-naphthyridin-3-ylamino)-3,4,6,7,8,8a-hexahydro-1H-pyrrolo[1,2-a]pyrazin-2-yl]quinoline-8-carbonitrile;
5-[(4R,7R,8aS)-4-methyl-7-(5,6,7,8-tetrahydro-1,7-naphthyridin-2-ylamino)-3,4,6,7,8,8a-hexahydro-1H-pyrrolo[1,2-a]pyrazin-2-yl]quinoline-8-carbonitrile;
5-[(4R,7R,8aS)-4-methyl-7-[(6-methyl-7,8-dihydro-5H-1,6-naphthyridin-2-yl)amino]-3,4,6,7,8,8a-hexahydro-1H-pyrrolo[1,2-a]pyrazin-2-yl]quinoline-8-carbonitrile;
5-[(4R,7R,8aS)-4-methyl-7-[methyl(5,6,7,8-tetrahydro-1,6-naphthyridin-2-yl)amino]-3,4,6,7,8,8a-hexahydro-1H-pyrrolo[1,2-a]pyrazin-2-yl]quinoline-8-carbonitrile;
5-[(4R,7R,8aS)-4-methyl-7-(5,6,7,8-tetrahydropyrido[4,3-d]pyrimidin-2-ylamino)-3,4,6,7,8,8a-hexahydro-1H-pyrrolo[1,2-a]pyrazin-2-yl]quinoline-8-carbonitrile;
5-[(4R,7R,8aS)-4-methyl-7-[[(5R)-5-methyl-6,7-dihydro-5H-pyrrolo[3,4-b]pyridin-2-yl]amino]-3,4,6,7,8,8a-hexahydro-1H-pyrrolo[1,2-a]pyrazin-2-yl]quinoline-8-carbonitrile;
5-[(4R,7R,8aS)-4-methyl-7-[[(5S)-5-methyl-6,7-dihydro-5H-pyrrolo[3,4-b]pyridin-2-yl]amino]-3,4,6,7,8,8a-hexahydro-1H-pyrrolo[1,2-a]pyrazin-2-yl]quinoline-8-carbonitrile;
5-[(4R,7R,8aS)-4-methyl-7-[[(7S)-7-methyl-5,6,7,8-tetrahydro-1,6-naphthyridin-2-yl]amino]-3,4,6,7,8,8a-hexahydro-1H-pyrrolo[1,2-a]pyrazin-2-yl]quinoline-8-carbonitrile;
5-[(4R,7R,8aS)-4-methyl-7-[[(7R)-7-methyl-5,6,7,8-tetrahydro-1,6-naphthyridin-2-yl]amino]-3,4,6,7,8,8a-hexahydro-1H-pyrrolo[1,2-a]pyrazin-2-yl]quinoline-8-carbonitrile;
5-[(4R,7R,8aS)-4-methyl-7-[[(5S)-5-methyl-5,6,7,8-tetrahydro-2,6-naphthyridin-3-yl]amino]-3,4,6,7,8,8a-hexahydro-1H-pyrrolo[1,2-a]pyrazin-2-yl]quinoline-8-carbonitrile;
5-[(4R,7R,8aS)-4-methyl-7-[[(5R)-5-methyl-5,6,7,8-tetrahydro-2,6-naphthyridin-3-yl]amino]-3,4,6,7,8,8a-hexahydro-1H-pyrrolo[1,2-a]pyrazin-2-yl]quinoline-8-carbonitrile;
5-[(4R,7S,8aS)-4-methyl-7-(6-piperazin-1-yl-3,4-dihydro-1H-isoquinolin-2-yl)-3,4,6,7,8,8a-hexahydro-1H-pyrrolo[1,2-a]pyrazin-2-yl]quinoline-8-carbonitrile;
5-[(4R,7S,8aS)-7-[2-[(3R,4R)-3-amino-4-methoxy-pyrrolidin-1-yl]-7,8-dihydro-5H-1,6-naphthyridin-6-yl]-4-methyl-3,4,6,7,8,8a-hexahydro-1H-pyrrolo[1,2-a]pyrazin-2-yl]quinoline-8-carbonitrile;
5-[(4R,7S,8aS)-7-[7-[(3R,4R)-3-amino-4-methoxy-pyrrolidin-1-yl]-3,4-dihydro-1H-2,6-naphthyridin-2-yl]-4-methyl-3,4,6,7,8,8a-hexahydro-1H-pyrrolo[1,2-a]pyrazin-2-yl]quinoline-8-carbonitrile;
5-[(4R,7R,8aS)-4-methyl-7-[4-(5,6,7,8-tetrahydro-2,6-naphthyridin-3-yl)piperazin-1-yl]-3,4,6,7,8,8a-hexahydro-1H-pyrrolo[1,2-a]pyrazin-2-yl]quinoline-8-carbonitrile;
5-[(4R,8aS)-4-methyl-7-(5,6,7,8-tetrahydro-1,6-naphthyridin-2-yloxy)-3,4,6,7,8,8a-hexahydro-1H-pyrrolo[1,2-a]pyrazin-2-yl]quinoline-8-carbonitrile;
5-[(4R,7S,8aS)-4-methyl-7-piperazin-1-yl-3,4,6,7,8,8a-hexahydro-1H-pyrrolo[1,2-a]pyrazin-2-yl]-2-deuterio-quinoline-8-carbonitrile;
2-Deuterio-5-[(4R,7S,8aS)-7-(3,8-diazabicyclo[3.2.1]octan-3-yl)-4-methyl-3,4,6,7,8,8a-hexahydro-1H-pyrrolo[1,2-a]pyrazin-2-yl]quinoline-8-carbonitrile;
5-[(4R,7S,8aS)-7-(3-amino-3-methyl-azetidin-1-yl)-4-methyl-3,4,6,7,8,8a-hexahydro-1H-pyrrolo[1,2-a]pyrazin-2-yl]-2-deuterio-quinoline-8-carbonitrile;
5-[(4R,7S,8aS)-7-(4-amino-4-methyl-1-piperidyl)-4-methyl-3,4,6,7,8,8a-hexahydro-1H-pyrrolo[1,2-a]pyrazin-2-yl]-2-deuterio-quinoline-8-carbonitrile;

2-Deuterio-5-[(4R,7S,8aS)-7-(3-amino-3-methyl-pyrroli-
   din-1-yl)-4-methyl-3,4,6,7,8,8a-hexahydro-1H-pyrrolo[1,
   2-a]pyrazin-2-yl]quinoline-8-carbonitrile;
5-[(4R,7S,8aS)-7-[4-(dimethylamino)-1-piperidyl]-4-
   methyl-3,4,6,7,8,8a-hexahydro-1H-pyrrolo[1,2-a]
   pyrazin-2-yl]-2-deuterio-quinoline-8-carbonitrile;
2-Deuterio-5-[(4R,7S,8aS)-7-(2,9-diazaspiro[5.5]undecan-
   9-yl)-4-methyl-3,4,6,7,8,8a-hexahydro-1H-pyrrolo[1,2-a]
   pyrazin-2-yl]quinoline-8-carbonitrile;
5-[(4R,7S,8aS)-4-methyl-7-[3-[(5R)-5-methyl-4,5,6,7-tetra-
   hydropyrazolo[3,4-c]pyridin-1-yl]azetidin-1-yl]-3,4,6,7,
   8,8a-hexahydro-1H-pyrrolo[1,2-a]pyrazin-2-yl]-2-deute-
   rio-quinoline-8-carbonitrile;
5-[(4R,7S,8aS)-4-methyl-7-[3-[(5R)-5-methyl-4,5,6,7-tetra-
   hydropyrazolo[3,4-c]pyridin-2-yl]azetidin-1-yl]-3,4,6,7,
   8,8a-hexahydro-1H-pyrrolo[1,2-a]pyrazin-2-yl]-2-deute-
   rio-quinoline-8-carbonitrile;
2-Deuterio-5-[(4R,7S,8aS)-4-methyl-7-(4,5,6,7-tetrahydro-
   pyrazolo[3,4-c]pyridin-1-yl)-3,4,6,7,8,8a-hexahydro-1H-
   pyrrolo[1,2-a]pyrazin-2-yl]quinoline-8-carbonitrile;
2-deuterio-5-[(4R,7S,8aS)-4-methyl-7-(4,5,6,7-tetrahydro-
   pyrazolo[3,4-c]pyridin-2-yl)-3,4,6,7,8,8a-hexahydro-1H-
   pyrrolo[1,2-a]pyrazin-2-yl]quinoline-8-carbonitrile; and
2-Deuterio-5-[(4R,7S,8aS)-7-(2,9-diazaspiro[5.5]undecan-
   9-yl)-4-methyl-3,4,6,7,8,8a-hexahydro-1H-pyrrolo[1,2-a]
   pyrazin-2-yl]quinoline-8-carbonitrile;
or a pharmaceutically acceptable salt thereof.

Synthesis

The compounds of the present invention can be prepared by any conventional means. Suitable processes for synthesizing these compounds as well as their starting materials are provided in the schemes below and in the examples. All substituents, in particular, $R^1$ and $R^2$ are as defined above unless otherwise indicated. Furthermore, and unless explicitly otherwise stated, all reactions, reaction conditions, abbreviations and symbols have the meanings well known to a person of ordinary skill in organic chemistry.

General synthetic routes for preparing the compound of formula(I), (VII) and (VIII) are shown below.

Scheme 1

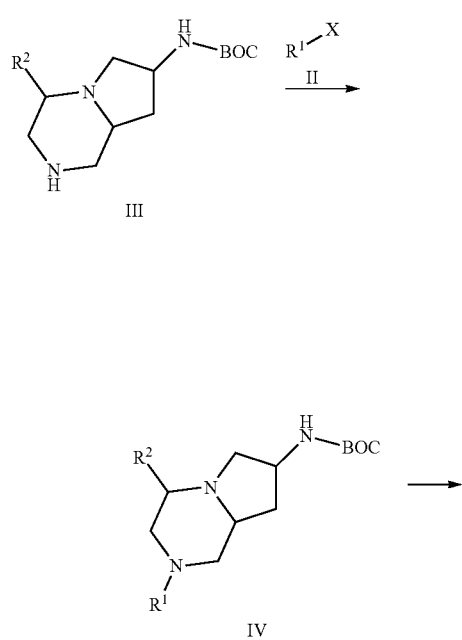

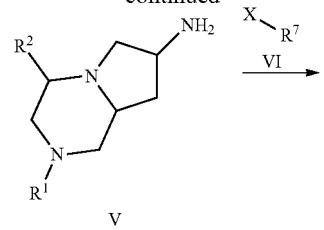

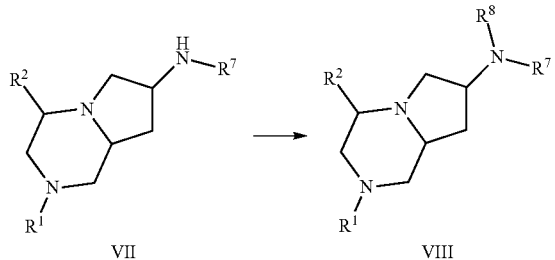

Wherein X is halogen or leaving group, such as methanesulfonate; $R^7$ is a 5-7 membered monocyclic aryl or heteroaryl, or a 7-12 membered bicyclic heterocyclyl; $R^8$ is H or $C_{1-6}$alkyl; or $R^7$ and $R^8$ together with the nitrogen they are attached to form a heterocyclyl.

The synthesis of compounds of the present invention started from the reaction of bicyclic amine, compound of formula III, with halide II via Buchwald-Hartwig amination reaction in the presence of a catalyst, such as Ruphos Pd-G2, and a base, such as $Cs_2CO_3$, which provides compound of formula IV (ref: Acc. Chem. Res. 1998, 31, 805-818; Chem. Rev. 2016, 116, 12564-12649; Topics in Current Chemistry, 2002, 219, 131-209; and references cited therein). Alternatively, compound of formula IV can also be obtained via nucleophilic substitution between halide II and compound of formula III in the presence of a base, such as DIPEA, $NaHCO_3$ and $K_2CO_3$. Boc deprotection of compound of formula IV in acidic condition (such as HCl in EtOAc and TFA in DCM) gives compound of formula V, which can be transformed into compound of formula VII via either nucleophilic substitution with compound of formula VI in the presence of a base, such as DIPEA $NaHCO_3$ and $K_2CO_3$, or Buchwald-Hartwig amination reaction with compound of formula VI, followed by appropriate deprotection. Reductive amination of compound of formula VII with $R^8$—CHO followed by appropriate deprotection can be applied to afford formula VIII.

Synthetic routes for preparing the compound of formula (I), (VIII) and (XIV) are shown in scheme 2.

Scheme 2

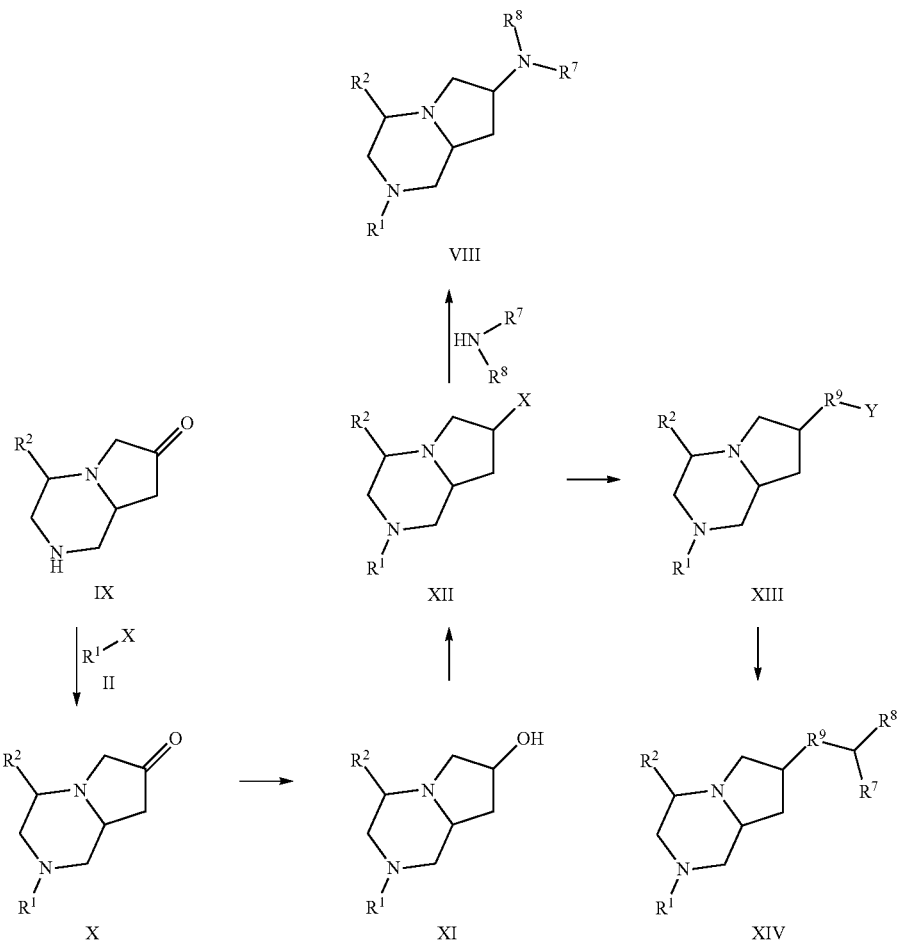

Wherein X is halogen; Y is halogen or leaving group, such as methanesulfonate; $R^9$ is a 5-7 membered monocyclic aryl or heteroaryl, or a 7-12 membered bicyclic heterocyclyl; $R^7$ and $R^8$ together with the nitrogen they are attached to form a heterocyclyl Buchwald-Hartwig amination reaction between halide II and compound of formula IX with a catalyst, such as Ruphos Pd-G2, and a base, such as $Cs_2CO_3$ provides compound of formula X (ref: Acc. Chem. Res. 1998, 31, 805-818; Chem. Rev. 2016, 116, 12564-12649; Topics in Current Chemistry, 2002, 219, 131-209; and references cited therein). Alternatively, compound of formula X can also be obtained via nucleophilic substitution between halide II and compound of formula IX in the presence of a base, such as DIPEA, $NaHCO_3$ and $K_2CO_3$. Reduction of compound of formula X in typical condition (such as $NaBH_4$ in MeOH) gives compound of formula XI, which can be transformed into compound of formula XII by converting the secondary hydroxyl into a leaving group, such as methanesulfonate. Replacement of the leaving group of compound of formula XII via substitution reactions with amine $HR^9Y$ in the presence of catalyst and base, such as KI and $K_2CO_3$, affords compound of formula XIII.

Buchwald-Hartwig amination reaction or nucleophilic substitution between compound of formula XIII and amine $NHR^7R^8$, followed by appropriate deprotection can provide compound of formula XIV. Replacement of the leaving group in compound of formula XII via substitution reactions with amine $NHR^7R^8$ in the presence of catalyst and base, such as KI and $K_2CO_3$, affords compound of formula VIII.

Synthetic routes for preparing the compound of formula (I) and (XVII) are shown in scheme 3.

Scheme 3

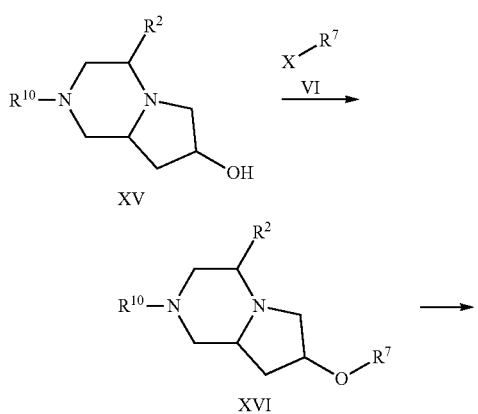

-continued

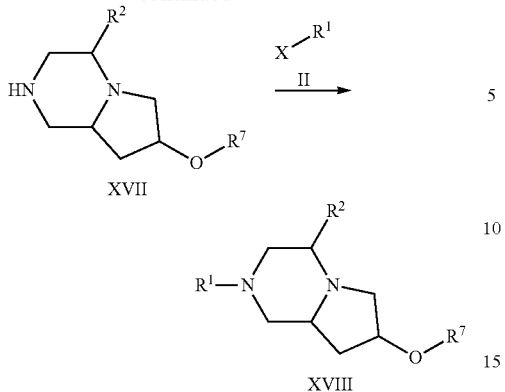

Wherein R[10] is a protecting group, such as benzyl group.

Compound of formula XV can react with halide VI via nucleophilic aromatic substitution in the presence of a base, such as DIEPA, or Pd-catalyzed coupling to afford compound of formula XVI. After R[10] is removed from formula XVI by selective deprotection, such as Pd/C catalyzed hydrogenation, the resulting compound of formula XVII can react with halide II to afford compound of formula XVIII by nucleophilic substitution in the presence of a base, such as DIEPA. In some embodiment, the compound of formula XVII may contain a protecting group, e.g. Boc, on R[12], and the protecting group will be removed before affording the final compound with formula XVIII.

Compounds of formula (Ia) can be synthesized according to Scheme 1, 2 and 3, using chiral starting materials.

Compounds of this invention can be obtained as mixtures of diastereomers or enantiomers, which can be separated by methods well known in the art, e.g. (chiral) HPLC or SFC.

This invention also relates to a process for the preparation of a compound of formula (I) or (Ia) comprising any one of the following steps:

a) Buchwald-Hartwig amination reaction or nucleophilic substitution between compound of formula (V),

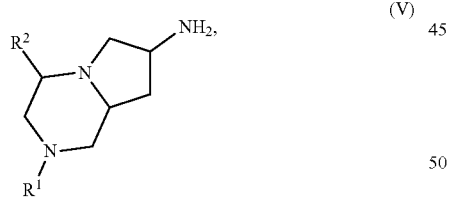

and compound of formula (VI), X—R[7] (VI);

b) reductive amination of compound of formula (VII),

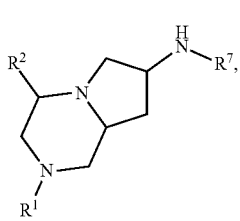

with R[8]—CHO;

c) substitution reactions between compound of formula (XII),

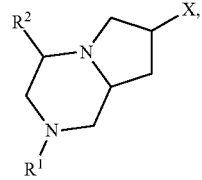

and amine NHR[7]R[8];

d) Buchwald-Hartwig amination reaction or nucleophilic substitution between compound of formula (XIII),

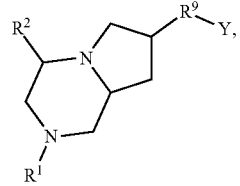

and amine NHR[7]R[8];

e) nucleophilic substitution between compound of formula (XVII),

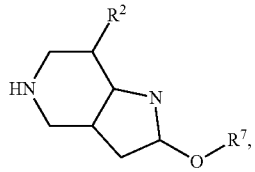

and compound of formula (II), X—R[1] (II);

wherein X is halogen; Y is halogen or leaving group, such as methanesulfonate; R[7] is a 5-7 membered monocyclic aryl or heteroaryl, or a 7-12 membered bicyclic heterocyclyl; R[9] is a 5-7 membered monocyclic aryl or heteroaryl, or a 7-12 membered bicyclic heterocyclyl.

Compound of formula (Ia) can also be synthesized according to Scheme 1, 2 or 3 by using chiral intermediates.

A compound of formula (I) or (Ia) when manufactured according to the above process is also an object of the invention.

Indications and Methods of Treatment

The present invention provides compounds that can be used as TLR7 and/or TLR8 and/or TLR9 antagonist, which inhibits pathway activation through TLR7 and/or TLR8 and/or TLR9 as well as respective downstream biological events including, but not limited to, innate and adaptive immune responses mediated through the production of all types of cytokines and all forms of auto-antibodies. Accordingly, the compounds of the invention are useful for blocking TLR7 and/or TLR8 and/or TLR9 in all types of cells that express such receptor(s) including, but not limited to, plasmacytoid dendritic cell, B cell, T cell, macrophage, monocyte, neutrophil, keratinocyte, epithelial cell. As such, the compounds can be used as a therapeutic or prophylactic agent for systemic lupus erythematosus and lupus nephritis.

The present invention provides methods for treatment or prophylaxis of systemic lupus erythematosus and lupus nephritis in a patient in need thereof.

Another embodiment includes a method of treating or preventing systemic lupus erythematosus and lupus nephritis in a mammal in need of such treatment, wherein the method comprises administering to said mammal a therapeutically effective amount of a compound of formula (I), a stereoisomer, tautomer, prodrug or pharmaceutically acceptable salt thereof.

EXAMPLES

The invention will be more fully understood by reference to the following examples. They should not, however, be construed as limiting the scope of the invention.

ABBREVIATIONS

The invention will be more fully understood by reference to the following examples. They should not, however, be construed as limiting the scope of the invention.

Abbreviations used herein are as follows:
ACN: acetonitrile
DCM: dichloromethane
DCE: dichloroethane
DIPEA or DIEA: N,N-diisopropylethylamine
DMF: N,N-Dimethylformamide
EA or EtOAc: ethyl acetate
FA: formic acid
HATU: 1-[Bis(dimethylamino)methylene]-1H-1,2,3-triazolo[4,5-b]pyridinium 3-oxid hexafluorophosphate
$IC_{50}$: half inhibition concentration
IPA: isopropanol
MS: mass spectrometry
prep-HPLC: preparative high performance liquid chromatography
prep-TLC: preparative thin layer chromatography
RuPhos Pd G2: chloro(2-dicyclohexylphosphino-2',6'-diisopropoxy-1,1'-biphenyl)[2-(2'-amino-1,1'-biphenyl)]palladium(II) 2nd generation
SFC: supercritical fluid chromatography
TEA: trimethylamine
TFA: trifluoroacetic acid
THF: tetrahydrofuran
v/v volume ratio General Experimental Conditions Intermediates and final compounds were purified by flash chromatography using one of the following instruments: i) Biotage SP1 system and the Quad 12/25 Cartridge module. ii) ISCO combi-flash chromatography instrument. Silica gel brand and pore size: i) KP-SIL 60 Å, particle size: 40-60 µm; ii) CAS registry NO: Silica Gel: 63231-67-4, particle size: 47-60 micron silica gel; iii) ZCX from Qingdao Haiyang Chemical Co., Ltd, pore: 200-300 or 300-400.

Intermediates and final compounds were purified by preparative HPLC on reversed phase column using XBridge™ Prep-C18 (5 µm, OBD™ 30×100 mm) column, SunFire™ Prep-C18 (5 µm, OBD™ 30×100 mm) column, Phenomenex Synergi-C18 (10 µm, 25×150 mm) or Phenomenex Gemini-C18 (10 µm, 25×150 mm). Waters AutoP purification System (Sample Manager 2767, Pump 2525, Detector: Micromass ZQ and UV 2487, solvent system: acetonitrile and 0.1% ammonium hydroxide in water; acetonitrile and 0.1% FA in water or acetonitrile and 0.1% TFA in water). Or Gilson-281 purification System (Pump 322, Detector: UV 156, solvent system: acetonitrile and 0.05% ammonium hydroxide in water; acetonitrile and 0.225% FA in water; acetonitrile and 0.05% HCl in water; acetonitrile and 0.075% TFA in water; or acetonitrile and water).

For SFC chiral separation, intermediates were separated by chiral column (Daicel chiralpak IC, 5 µm, 30×250 mm), AS (10 µm, 30×250 mm) or AD (10 µm, 30×250 mm) using Mettler Toledo Multigram III system SFC, Waters 80Q preparative SFC or Thar 80 preparative SFC, solvent system: $CO_2$ and IPA (0.5% TEA in IPA) or $CO_2$ and MeOH (0.1% $NH_3·H_2O$ in MeOH), back pressure 100 bar, detection UV@254 or 220 nm.

LC/MS spectra of compounds were obtained using a LC/MS (Waters™ Alliance 2795-Micromass ZQ, Shimadzu Alliance 2020-Micromass ZQ or Agilent Alliance 6110-Micromass ZQ), LC/MS conditions were as follows (running time 3 or 1.5 mins):

Acidic condition I: A: 0.1% TFA in $H_2O$; B: 0.1% TFA in acetonitrile;

Acidic condition II: A: 0.0375% TFA in $H_2O$; B: 0.01875% TFA in acetonitrile;

Basic condition I: A: 0.1% $NH_3$—$H_2O$ in $H_2O$; B: acetonitrile;

Basic condition II: A: 0.025% $NH_3$—$H_2O$ in $H_2O$; B: acetonitrile;

Neutral condition: A: $H_2O$; B: acetonitrile.

Mass spectra (MS): generally only ions which indicate the parent mass are reported, and unless otherwise stated the mass ion quoted is the positive mass ion $(MH)^+$.

NMR Spectra were obtained using Bruker Avance 400 MHz.

The microwave assisted reactions were carried out in a Biotage Initiator Sixty microwave synthesizer. All reactions involving air-sensitive reagents were performed under an argon or nitrogen atmosphere. Reagents were used as received from commercial suppliers without further purification unless otherwise noted.

Preparative Examples

The following examples are intended to illustrate the meaning of the present invention but should by no means represent a limitation within the meaning of the present invention:

Intermediate A1

5-Fluoroquinoline-8-carbonitrile

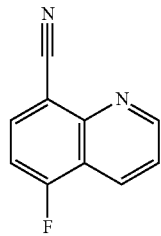

The titled compound was synthesized according to the following scheme:

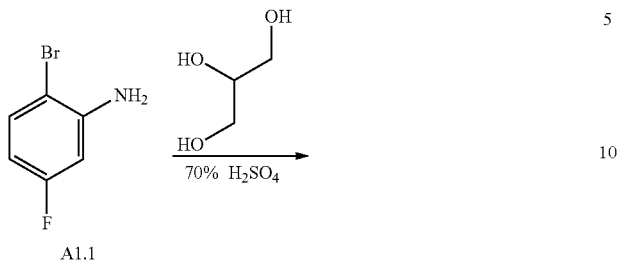

Step 1: Preparation of 8-bromo-5-fluoro-quinoline (Compound A1.2)

In a 100 mL pear-shaped flask, 2-bromo-5-fluoroaniline (compound A1.1, 2.0 g, 10.5 mmol), propane-1,2,3-triol (969 mg, 10.5 mmol) and sodium 3-nitrobenzenesulfonate (2.4 g, 10.5 mmol) were combined with 70% $H_2SO_4$ (20 mL) to afford a dark brown solution, which was heated to 150° C. and stirred for 3 hrs. After being cooled to room temperature, the reaction mixture was poured into ice-water, and neutralized with sodium hydroxide solution. The resultant mixture was filtered. The filter cake was dissolved in EtOAc and filtered. The resultant filtrate was concentrated in vacuo. The crude material was purified by flash chromatography (silica gel, 40 g, 0% to 30% EtOAc in PE) to afford compound A1.2 (2.0 g, 84% yield). MS: calc'd 226 and 228 [(M+H)$^+$], measured 226 and 228 [(M+H)$^+$].

Step 2: Preparation of 5-fluoroquinoline-8-carbonitrile (Intermediate A1)

To a solution of 8-bromo-5-fluoroquinoline (compound A1.2, 4.9 g, 21.7 mmol) in DMF (30 mL) was added dicyanozinc (5.0 g, 43.4 mmol) and RuPhos Pd G2 (CAS: 1375325-68-0, Sigma-Aldrich, Catalog: 753246, 842 mg, 1.1 mmol). The reaction mixture was stirred at 100° C. for 3 hrs, then cooled to room temperature. The reaction mixture was filtered and the filtrate was diluted with water (50 mL), then extracted with EA (80 mL) for three times. The combined organic layer was washed with brine, dried over $Na_2SO_4$, filtered and concentrated in vacuo. The residue was purified by flash chromatography (silica gel, 40 g, 0% to 70% EtOAc in PE) to afford Intermediate A1 (3.0 g, 80% yield). MS: calc'd 173 [(M+H)$^+$], measured 173 [(M+H)$^+$]. $^1$H NMR (400 MHz, METHANOL-$d_4$) δ ppm 9.11 (dd, J=4.28, 1.71 Hz, 1H), 8.64 (dd, J=8.56, 1.71 Hz, 1H), 8.29 (dd, J=8.19, 5.62 Hz, 1H), 7.76 (dd, J=8.56, 4.28 Hz, 1H), 7.49 (dd, J=9.35, 8.25 Hz, 1H).

Intermediate A2

2-Deuterio-5-fluoro-quinoline-8-carbonitrile

The titled compound was synthesized according to the following scheme:

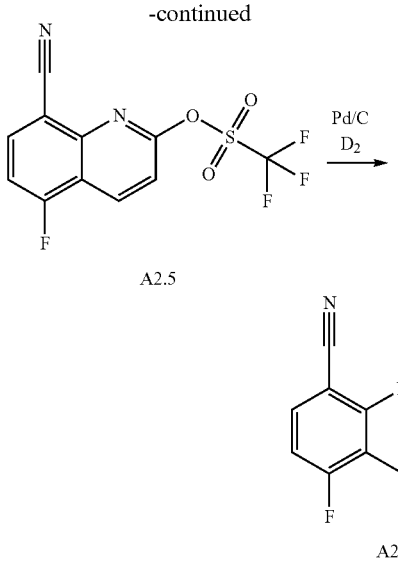

Step 1: Preparation of N-(2-bromo-5-fluoro-phenyl)-3,3-dimethoxy-propanamide (Compound A2.2)

To a solution of 2-bromo-5-fluoroaniline (compound A2.1, 50 g, 263 mmol) and methyl 3,3-dimethoxypropionate, (45 mL, 316 mmol) in THF (150 mL) was added NaHMDS in THF (394 mL, 394 mmol) dropwise at 0° C. The mixture was stirred at the temperature for 10 minutes, and then it was warmed up to 15° C. and stirred for 18 hrs. The reaction was quenched with sat. aqueous solution of NH$_4$Cl and concentrated to about 300 mL. The solution was diluted with water and extracted with EtOAc. The organic layer was dried over Na$_2$SO$_4$ and concentrated to afford compound A2.2 (100 g, 90% yield). MS: calc'd 306 [(M+H)$^+$], measured 306 [(M+H)$^+$].

Step 2: Preparation of 8-bromo-5-fluoro-1H-quinolin-2-one (Compound A2.3)

A solution of N-(2-bromo-5-fluoro-phenyl)-3,3-dimethoxy-propanamide (compound A2.2, 100 g, 238 mmol) in DCM (500 mL) was added to concentrated sulfuric acid (300 mL) at 0° C. The mixture was stirred at 15° C. for 2 hrs, then poured slowly into 2000 mL ice-water, and a yellow precipitate appeared. The mixture was filtered, and the wet-cake was washed with 500 mL water, 200 mL isopropyl alcohol and 300 mL PE. The solid was dried in vacuum to afford compound A2.3 (50 g, 86.5% yield). MS: calc'd 242 [(M+H)$^+$], measured 242 [(M+H)$^+$].

Step 3: Preparation of 5-fluoro-2-oxo-1H-quinoline-8-carbonitrile (Compound A2.4)

A solution of 8-bromo-5-fluoro-1H-quinolin-2-one (compound A2.3, 50 g, 206 mmol), zinc cyanide (4.8 g, 412 mmol), Pd(PPh$_3$)$_4$ (2.4 g, 21 mmol) in DMF was stirred at 120° C. for 5 hrs. The reaction mixture was diluted with water and extracted with DCM. The organic layer was dried and concentrated to give the crude product, which was purified by flash column to afford compound A2.4 (29 g, 74.5% yield). MS: calc'd 189 [(M+H)$^+$], measured 189 [(M+H)$^+$].

Step 4: Preparation of (8-cyano-5-fluoro-2-quinolyl) trifluoromethanesulfonate (Compound A2.5)

To a solution of 5-fluoro-2-oxo-1H-quinoline-8-carbonitrile (compound A2.4, 17 g, 90 mmol) and 2,6-dimethylpyridine (39 g, 361 mmol) in DCM was added trifluoromethanesulfonic anhydride (51 g, 181 mmol) dropwise at 0° C. The mixture was stirred at 0° C. for 1 hr, and then the reaction was diluted with water, extracted with DCM. The organic layer was dried and concentrated. The residue was purified by flash column to give compound A2.5 (23.0 g, 80% yield). MS: calc'd 321 [(M+H)$^+$], measured 321 [(M+H)$^+$].

Step 5: Preparation of 2-deuterio-5-fluoro-quinoline-8-carbonitrile (Intermediate A2)

To a solution of (8-cyano-5-fluoro-2-quinolyl) trifluoromethanesulfonate (compound A2.5, 23 g, 72 mmol) in THF (230 mL) and deuterium oxide (100 mL) was added potassium carbonate (20 g, 144 mmol) and Pd/C (6 g). The mixture was stirred at 40° C. for 5 hrs under deuterium atmosphere (balloon). The mixture was filtered, and the filtrate was concentrated and purified by flash column to afford Intermediate A2 (11 g, 87.8% yield) which was used directly for the next step without further purification. MS: calc'd 174 [(M+H)$^+$], measured 174 [(M+H)$^+$].

Intermediate B (4R,8aS)-2-benzyl-4-methyl-1,3,4,6,8,8a-hexahydropyrrolo[1,2-a]pyrazin-7-one

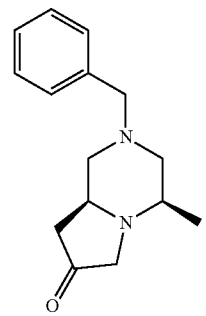 [SMILES: C[C@@H]1CN(Cc2ccccc2)C[C@@H]2CC(=O)CN21]

The titled compound was synthesized according to the following scheme:

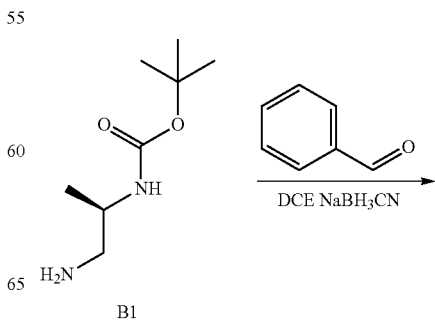

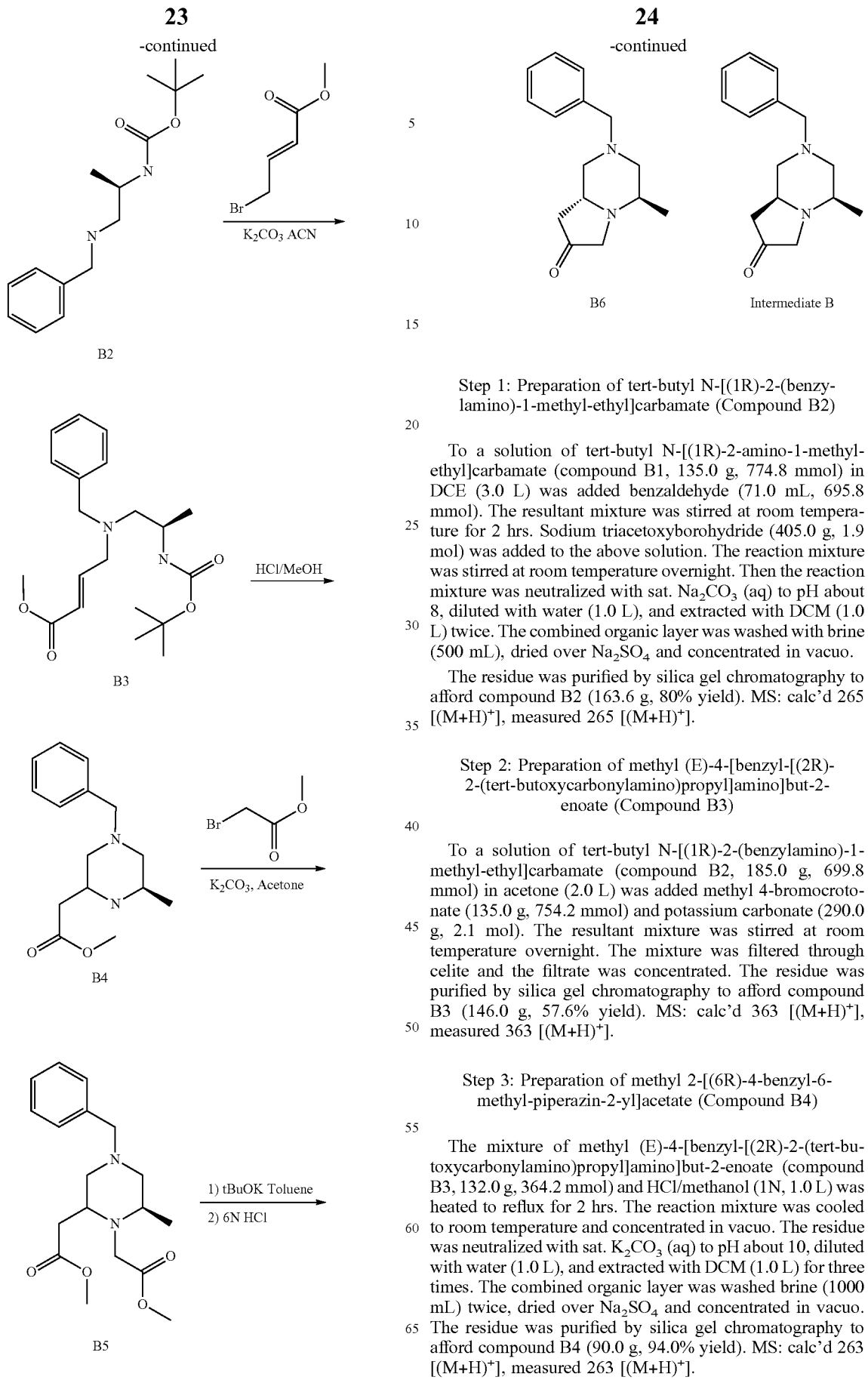

Step 1: Preparation of tert-butyl N-[(1R)-2-(benzylamino)-1-methyl-ethyl]carbamate (Compound B2)

To a solution of tert-butyl N-[(1R)-2-amino-1-methylethyl]carbamate (compound B1, 135.0 g, 774.8 mmol) in DCE (3.0 L) was added benzaldehyde (71.0 mL, 695.8 mmol). The resultant mixture was stirred at room temperature for 2 hrs. Sodium triacetoxyborohydride (405.0 g, 1.9 mol) was added to the above solution. The reaction mixture was stirred at room temperature overnight. Then the reaction mixture was neutralized with sat. $Na_2CO_3$ (aq) to pH about 8, diluted with water (1.0 L), and extracted with DCM (1.0 L) twice. The combined organic layer was washed with brine (500 mL), dried over $Na_2SO_4$ and concentrated in vacuo.

The residue was purified by silica gel chromatography to afford compound B2 (163.6 g, 80% yield). MS: calc'd 265 $[(M+H)^+]$, measured 265 $[(M+H)^+]$.

Step 2: Preparation of methyl (E)-4-[benzyl-[(2R)-2-(tert-butoxycarbonylamino)propyl]amino]but-2-enoate (Compound B3)

To a solution of tert-butyl N-[(1R)-2-(benzylamino)-1-methyl-ethyl]carbamate (compound B2, 185.0 g, 699.8 mmol) in acetone (2.0 L) was added methyl 4-bromocrotonate (135.0 g, 754.2 mmol) and potassium carbonate (290.0 g, 2.1 mol). The resultant mixture was stirred at room temperature overnight. The mixture was filtered through celite and the filtrate was concentrated. The residue was purified by silica gel chromatography to afford compound B3 (146.0 g, 57.6% yield). MS: calc'd 363 $[(M+H)^+]$, measured 363 $[(M+H)^+]$.

Step 3: Preparation of methyl 2-[(6R)-4-benzyl-6-methyl-piperazin-2-yl]acetate (Compound B4)

The mixture of methyl (E)-4-[benzyl-[(2R)-2-(tert-butoxycarbonylamino)propyl]amino]but-2-enoate (compound B3, 132.0 g, 364.2 mmol) and HCl/methanol (1N, 1.0 L) was heated to reflux for 2 hrs. The reaction mixture was cooled to room temperature and concentrated in vacuo. The residue was neutralized with sat. $K_2CO_3$ (aq) to pH about 10, diluted with water (1.0 L), and extracted with DCM (1.0 L) for three times. The combined organic layer was washed brine (1000 mL) twice, dried over $Na_2SO_4$ and concentrated in vacuo. The residue was purified by silica gel chromatography to afford compound B4 (90.0 g, 94.0% yield). MS: calc'd 263 $[(M+H)^+]$, measured 263 $[(M+H)^+]$.

Step 4: Preparation of methyl 2-[(2S,6R)-4-benzyl-1-(2-methoxy-2-oxo-ethyl)-6-methyl-piperazin-2-yl]acetate (compound B5)

To a solution of methyl 2-((6R)-4-benzyl-6-methylpiperazin-2-yl)acetate (compound B4, 90.0 g, 343.1 mmol) in acetone (2.0 L) was added methyl bromoacetate (90.0 g, 588.4 mmol) and potassium carbonate (99.0 g, 716.3 mmol). The resultant mixture was stirred at room temperature overnight. The mixture was filtered through celite and the filtrate was concentrated. The residue was purified by silica gel chromatography to afford compound B5 (50 g, 43.5% yield). MS: calc'd 335 [(M+H)$^+$], measured 335 [(M+H)$^+$].

Step 5: Preparation of (4R,8aS)-2-benzyl-4-methyl-1,3,4,6,8,8a-hexahydropyrrolo[1,2-a]pyrazin-7-one (Intermediate B)

To a suspension of potassium tert-butoxide (34.0 g, 303 mmol) in toluene (900 mL) was added a solution of methyl 2-[(2S,6R)-4-benzyl-1-(2-methoxy-2-oxo-ethyl)-6-methyl-piperazin-2-yl]acetate (compound B5, 50.0 g, 104.7 mmol) in toluene (100 mL) at 0° C. The resultant mixture was stirred at 0° C. for 2 hrs. Then the reaction mixture was extracted with HCl (6 N, 100 mL, aq. solution) twice. The combined aqueous layer was stirred at 100° C. for another 12 hrs. The reaction mixture was re-cooled to 0° C., basified with sat. K$_2$CO$_3$ (aq) to pH about 8, and extracted with EA (100 mL) for five times. The combined organic layer was washed with brine (100 mL), dried over Na$_2$SO$_4$, and concentrated in vacuo. The residue was purified by reversed phase chromatography (ODS-C18, 0% to 100% ACN in Water (contained 0.5% NH$_3$H$_2$O)) to afford to give Intermediate B (faster eluting, 13.4 g, 52.1% yield) and compound B6 (slower eluting, 4.2 g, 16.4% yield).

Intermediate B The stereochemistry was confirmed by NOESY. MS: calc'd 245 [(M+H)$^+$], measured 245 [(M+H)$^+$]. $^1$H NMR (400 MHz, CDCl$_3$) δ ppm 7.25-7.17 (m, 5H), 3.52-3.39 (m, 3H), 2.91 (d, J=10.4 Hz, 1H), 2.76-2.73 (m, 2H), 2.55-2.47 (m, 2H), 2.22 (dd, J=5.6 Hz, 1H), 2.00 (dd, J=8.8 Hz, 1H), 1.96-1.90 (m, 2H), 0.95 (t, J=6.4 Hz, 3H).

Compound B6 The stereochemistry was confirmed by NOESY. MS: calc'd 245 [(M+H)$^+$], measured 245 [(M+H)$^+$]. $^1$H NMR (400 MHz, CDCl$_3$) δ ppm 7.35-7.25 (m, 5H), 3.59-3.47 (m, 2H), 3.37 (dq, J=3.2, 8.0 Hz, 1H), 3.28-3.23 (m, 1H), 3.10-3.06 (m, 1H), 3.05-3.02 (m, 1H), 2.83 (dd, J=3.0, 10.8 Hz, 1H), 2.58-2.46 (m, 2H), 2.31-2.19 (m, 3H), 1.15 (d, J=6.4 Hz, 3H).

Intermediate C

5-[(4R,7R,8aS)-7-amino-4-methyl-3,4,6,7,8,8a-hexahydro-1H-pyrrolo[1,2-a]pyrazin-2-yl]quinoline-8-carbonitrile

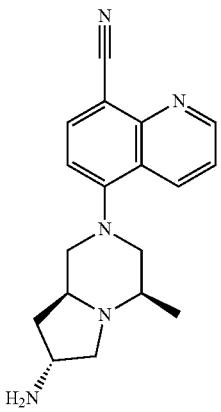

The titled compound was synthesized according to the following scheme:

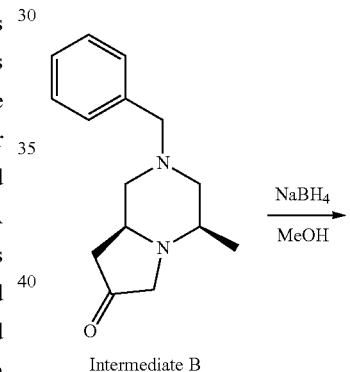

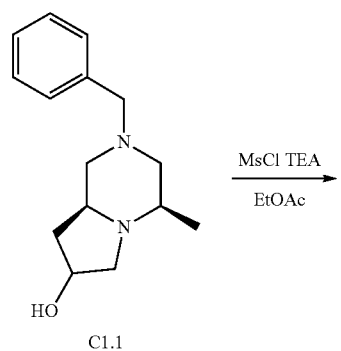

-continued
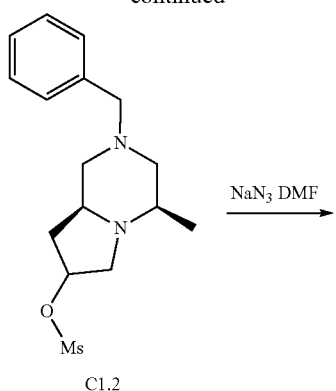
C1.2
NaN₃ DMF →
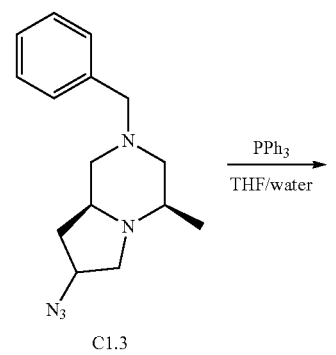
C1.3
PPh₃
THF/water →
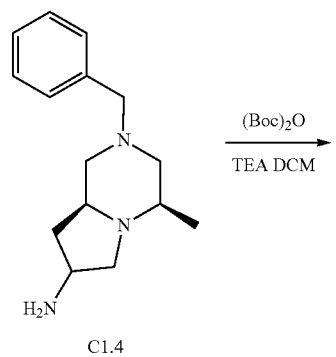
C1.4
(Boc)₂O
TEA DCM →
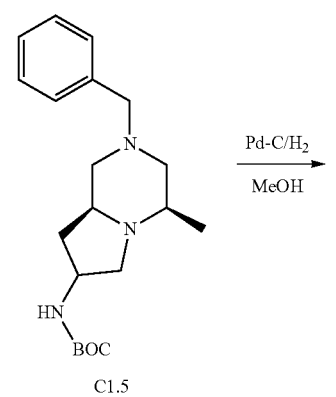
C1.5
Pd-C/H₂
MeOH →
-continued
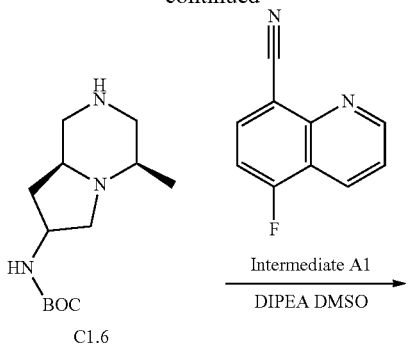
C1.6
Intermediate A1
DIPEA DMSO →
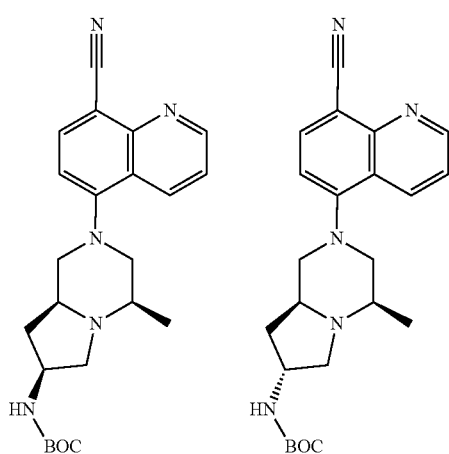
C1.7    C1.8
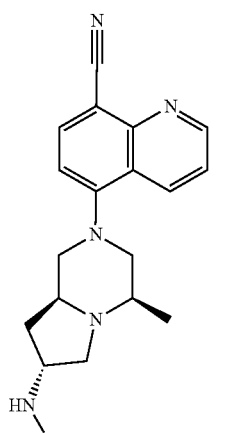
C1.8
HCl/dioxane
DCM →

-continued

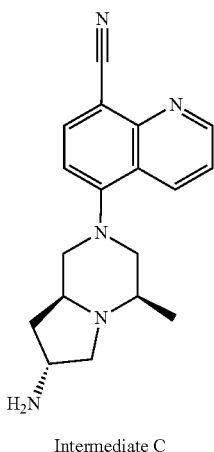

Intermediate C

Step 1: Preparation of (4R,8aS)-2-benzyl-4-methyl-3,4,6,7,8,8a-hexahydro-1H-pyrrolo[1,2-a]pyrazin-7-ol (Compound C1.1)

To a solution of (4R,8aS)-2-benzyl-4-methyl-1,3,4,6,8,8a-hexahydropyrrolo [1,2-a]pyrazin-7-one (Intermediate B, 12.0 g, 49.1 mmol) in methanol (300 mL) was slowly added sodium borohydride (3.72 g, 98.3 mmol) at 0° C. Then the resultant mixture was stirred at room temperature for 2 hrs. The reaction mixture was quenched with HCl (aq.10% solution) until pH was about 4. Then the resultant mixture was basified with aq. $K_2CO_3$ to pH about 8, extracted with EA (100 mL) for three times. The combined organic layer was washed with brine (100 mL), dried over $Na_2SO_4$, and concentrated in vacuo to afford compound C1.1 (11.2 g, 92.6% yield) which was used directly to the next step without further purification. MS: calc'd 247 [(M+H)$^+$], measured 247 [(M+H)$^+$].

Step 2: Preparation of [(4R,8aS)-2-benzyl-4-methyl-3,4,6,7,8,8a-hexahydro-1H-pyrrolo[1,2-a]pyrazin-7-yl]methanesulfonate (Compound C1.2)

To a solution of (4R,8aS)-2-benzyl-4-methyl-3,4,6,7,8,8a-hexahydro-1H-pyrrolo[1,2-a]pyrazin-7-ol (Compound C1.1, 11.2 g, 45.5 mmol) and DIPEA (40 mL, 228.6 mmol) in EtOAc (500 mL) was slowly added methanesulfonyl chloride (11 mL, 136.7 mmol) at 0° C. Then the resultant mixture was stirred at room temperature for 5 hrs. The reaction was quenched with sat. $NaHCO_3$ (aq), and the mixture was extracted with EA (100 mL) twice. The combined organic layer was washed with brine (100 mL), dried over $Na_2SO_4$, and concentrated in vacuo to afford compound C1.2 (13.0 g, 88% yield) which was used directly to the next step without further purification. MS: calc'd 325 [(M+H)$^+$], measured 325 [(M+H)$^+$].

Step 3: Preparation of (4R,8aS)-7-azido-2-benzyl-4-methyl-3,4,6,7,8,8a-hexahydro-1H-pyrrolo[1,2-a]pyrazine (Compound C1.3)

To a solution of [(4R,8aS)-2-benzyl-4-methyl-3,4,6,7,8,8a-hexahydro-1H-pyrrolo[1,2-a]pyrazin-7-yl]methanesulfonate (Compound C1.2, 13.0 g, 40.1 mmol) in DMF (250 mL) was added sodium azide (7.8 g, 120.4 mmol). The resultant mixture was stirred at 80° C. for 3 hrs. The reaction mixture was cooled to room temperature, quenched with sat.$NaHCO_3$ (aq, 100 mL), and extracted with EA (150 mL) twice. The combined organic layer was washed with brine (100 mL), dried over $Na_2SO_4$, and concentrated in vacuo. The residue was purified by silica gel chromatography to afford compound C1.3 (9 g, 82.7% yield). MS: calc'd 272 [(M+H)$^+$], measured 272 [(M+H)$^+$].

Step 4: Preparation of (4R,8aS)-2-benzyl-4-methyl-3,4,6,7,8,8a-hexahydro-1H-pyrrolo[1,2-a]pyrazin-7-amine (Compound C1.4)

To a solution of (4R,8aS)-7-azido-2-benzyl-4-methyl-3,4,6,7,8,8a-hexahydro-1H-pyrrolo[1,2-a]pyrazine (Compound C1.3, 9.0 g, 33.2 mmol) in THF (128 mL) and water (25 mL) was slowly added triphenylphosphine (17.0 g, 66.2 mmol) at 0° C. After the addition was completed, the resultant mixture was heated at reflux for 2 hrs. The reaction mixture was cooled to room temperature, concentrated in vacuo. The residue was mixed with $H_2O$ (200 mL), acidified with 1 N HCl (aq) to pH about 2. The resultant mixture was washed with DCM (300 mL) twice, the aqueous phase was then treated with 6N NaOH to adjust pH to 12. After extraction with DCM (150 mL) for three times, the organic layer was combined and washed with brine (100 mL), dried over $Na_2SO_4$ and concentrated in vacuo to afford compound C1.4 (6 g, 73.6% yield) which was used directly to the next step without further purification. MS: calc'd 246 [(M+H)$^+$], measured 246 [(M+H)$^+$].

Step 5: Preparation of tert-butyl N-[(4R,8aS)-2-benzyl-4-methyl-3,4,6,7,8,8a-hexahydro-1H-pyrrolo[1,2-a]pyrazin-7-yl]carbamate (Compound C1.5)

To a solution of (4R,8aS)-2-benzyl-4-methyl-3,4,6,7,8,8a-hexahydro-1H-pyrrolo[1,2-a]pyrazin-7-amine (Compound C1.4, 6.0 g, 24.5 mmol) and triethylamine (7.0 mL, 50.2 mmol) in DCM (60 mL) was added Di-tert-butyl pyrocarbonate (8.0 g, 36.7 mmol) at 0° C. The resultant mixture was stirred at room temperature overnight. The reaction was quenched with sat. $NaHCO_3$ (aq), and the mixture was extracted with DCM (80 mL) twice. The combined organic layer was washed with brine (100 mL), dried over $Na_2SO_4$, and concentrated in vacuo. The residue was purified by silica gel chromatography to afford compound C1.5 (4.0 g, 47.2% yield). MS: calc'd 346 [(M+H)$^+$], measured 346 [(M+H)$^+$].

Step 6: Preparation of tert-butyl N-[(4R,8aS)-4-methyl-1,2,3,4,6,7,8,8a-octahydro pyrrolo [1,2-a]pyrazin-7-yl]carbamate (Compound $C_{1-6}$)

To a solution of tert-butyl N-[(4R,8aS)-2-benzyl-4-methyl-3,4,6,7,8,8a-hexahydro-1H-pyrrolo[1,2-a]pyrazin-7-yl]carbamate (Compound C1.5, 3.9 g, 11.3 mmol) in 2,2,2-trifluoroethanol (100.0 mL, 1372 mmol) was added wet Pd/C (1.0 g, 10% Palladium on activated carbon, contained 50% of water). The resultant mixture was purged with $H_2$ for 3 times, then stirred at 45° C. under $H_2$ atmosphere overnight. The mixture was filtered through celite and the solid was washed with DCM, and the filtrate was concentrated in vacuo to afford compound C1.6 (2.8 g, 96.7% yield) which was used directly to the next step without further purification. MS: calc'd 256 [(M+H)$^+$], measured 256 [(M+H)$^+$].

Step 7: Preparation of tert-butyl N-[(4R,7R,8aS)-2-(8-cyano-5-quinolyl)-4-methyl-3,4,6,7,8,8a-hexahydro-1H-pyrrolo[1,2-a]pyrazin-7-yl]carbamate (Compound C1.8)

To a solution of tert-butyl N-[(4R,8aS)-4-methyl-1,2,3,4,6,7,8,8a-octahydropyrrolo[1,2-a]pyrazin-7-yl]carbamate (compound C1.6, 1.05 g, 4.1 mmol) in dry DMSO (20 mL) was added 5-fluoroquinoline-8-carbonitrile (Intermediate A1, 0.7 g, 4.1 mmol) and DIPEA (3.6 mL, 20.6 mmol). The resultant mixture was heated at 120° C. for 3 hrs. After being cooled to room temperature, the reaction mixture was diluted with water (60 mL), extracted with EA (100 mL) twice. The combined organic layer was washed with brine (30 mL), dried over $Na_2SO_4$, and concentrated in vacuo. The residue was purified by silica gel chromatography to afford compound C1.7 (faster eluting, 280 mg, 16.7% yield) and compound C1.8 (slower eluting, 1.1 g, 65.6% yield).

Compound C1.7 The stereochemistry was confirmed by NOESY. MS: calc'd 408 [(M+H)+], measured 408 [(M+H)+]. $^1$H NMR (400 MHz, METHANOL-$d_4$) δ ppm 8.97 (dd, J=4.22, 1.65 Hz, 1H), 8.60 (dd, J=8.56, 1.59 Hz, 1H), 8.13 (d, J=8.07 Hz, 1H), 7.63 (dd, J=8.56, 4.28 Hz, 1H), 7.25 (d, J=7.95 Hz, 1H), 4.21-4.09 (m, 1H), 3.65-3.53 (m, 1H), 3.47-3.39 (m, 1H), 3.13 (br d, J=10.03 Hz, 1H), 2.85 (t, J=10.76 Hz, 1H), 2.80-2.73 (m, 1H), 2.73-2.58 (m, 2H), 2.58-2.51 (m, 1H), 2.39 (ddd, J=12.59, 8.68, 5.87 Hz, 1H), 1.56-1.49 (m, 9H), 1.39 (td, J=11.83, 6.30 Hz, 1H), 1.16 (d, J=5.99 Hz, 3H).

Compound C1.8 The stereochemistry was confirmed by NOESY. MS: calc'd 408 [(M+H)+], measured 408 [(M+H)+]. $^1$H NMR (400 MHz, METHANOL-$d_4$) δ ppm 8.97 (dd, J=4.28, 1.71 Hz, 1H), 8.61 (dd, J=8.62, 1.65 Hz, 1H), 8.13 (d, J=8.07 Hz, 1H), 7.63 (dd, J=8.56, 4.28 Hz, 1H), 7.25 (d, J=7.95 Hz, 1H), 4.21-4.14 (m, 1H), 3.69 (dd, J=9.17, 7.82 Hz, 1H), 3.75-3.64 (m, 1H), 3.58 (br d, J=10.88 Hz, 1H), 3.46-3.39 (m, 1H), 2.93-2.75 (m, 1H), 2.82-2.74 (m, 1H), 2.73-2.69 (br d, J=11.37 Hz, 1H), 2.12 (dd, J=9.17, 7.46 Hz, 1H), 1.92 (dt, J=12.87, 10.26 Hz, 1H), 1.77 (ddd, J=12.93, 5.96, 2.51 Hz, 1H), 1.47 (s, 9H), 1.17 (d, J=6.11 Hz, 3H).

Step 8: Preparation of 5-[(4R,7R,8aS)-7-amino-4-methyl-3,4,6,7,8,8a-hexahydro-1H-pyrrolo[1,2-a]pyrazin-2-yl]quinoline-8-carbonitrile (Intermediate C)

To a solution of tert-butyl N-[(4R,7R,8aS)-2-(8-cyano-5-quinolyl)-4-methyl-3,4,6,7,8,8a-hexahydro-1H-pyrrolo[1,2-a]pyrazin-7-yl]carbamate (Compound C1.8, 0.8 g, 2.0 mmol) in DCM (10 mL) was added trifluoroacetic acid (5.0 mL). The resultant mixture was stirred at room temperature for 2 hrs. The reaction mixture was concentrated, the residue was basified with sat. $K_2CO_3$ (aq) to adjust pH to 10, extracted with DCM (50 mL) for five times. The combined organic layer was washed with brine (30 mL), dried over $Na_2SO_4$, and concentrated in vacuo to afford Intermediate C (420 mg, 68% yield). MS: calc'd 308 [(M+H)+], measured 308 [(M+H)+].

Intermediate D (4R,8aS)-2-(8-cyano-5-quinolyl)-4-methyl-3,4,6,7,8,8a-hexahydro-1H-pyrrolo[1,2-a]pyrazin-7-yl]methanesulfonate

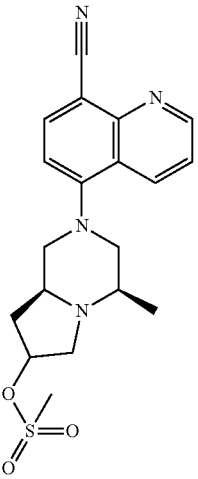

The titled compound was synthesized according to the following scheme:

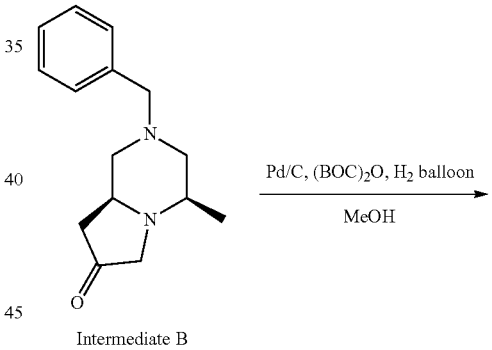

Intermediate B

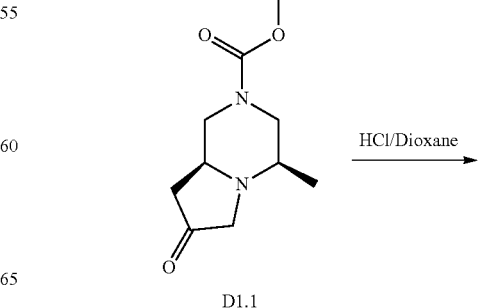

D1.1

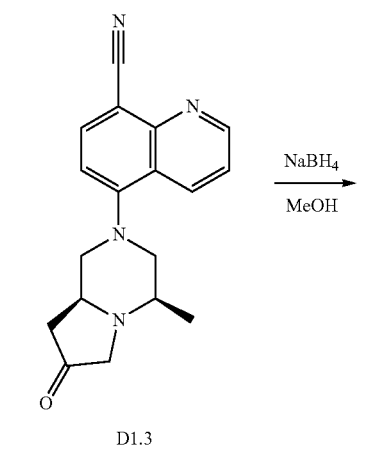

D1.2

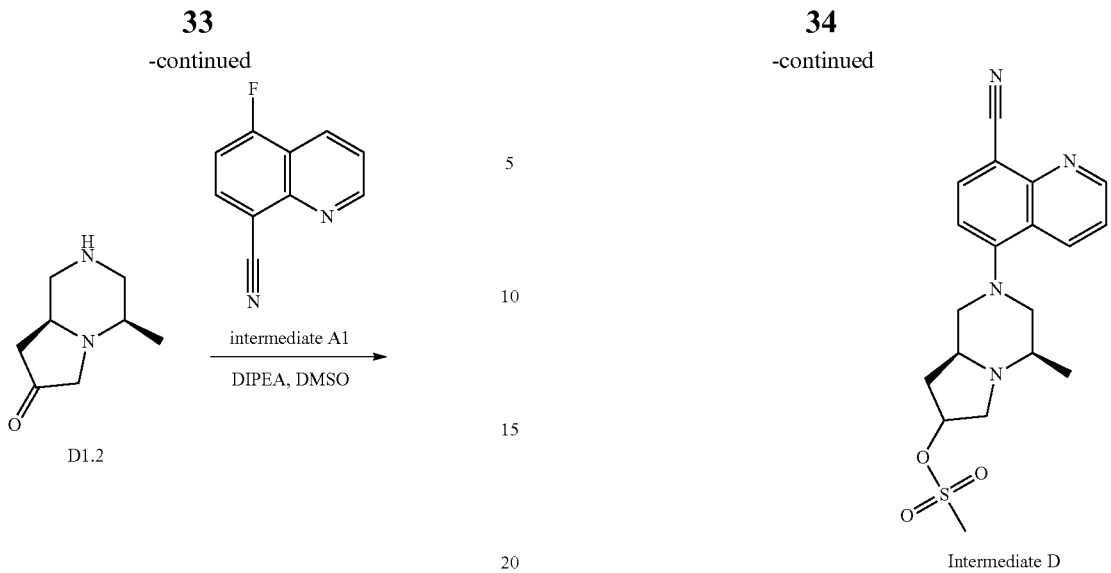

Intermediate D

Step 1: Preparation of tert-butyl (4R,8aS)-4-methyl-7-oxo-1,3,4,6,8,8a-hexahydropyrrolo[1,2-a]pyrazine-2-carboxylate (Compound D1.1)

To a solution of (4R,8aS)-2-benzyl-4-methyl-1,3,4,6,8,8a-hexahydropyrrolo [1,2-a]pyrazin-7-one (Intermediate B, 12.0 g, 49.1 mmol) and di-tert-butyldicarbonate (10.7 g, 49.1 mmol) in methanol (300 mL) was added Pd/C (1.2 g, 4.9 mmol, Palladium on activated carbon, contained 50% of water). The resultant mixture was purged with $H_2$ for 3 times. Then the resultant mixture was stirred at room temperature for 4 hrs. The mixture was filtered through celite with DCM and the filtrate was concentrated in vacuo to afford compound D1.1 (12.4 g, 99.3% yield) which was used directly to the next step without further purification. MS: calc'd 255 [(M+H)$^+$], measured 255 [(M+H)$^+$].

Step 2: Preparation of (4R,8aS)-4-methyl-2,3,4,6,8,8a-hexahydro-1H-pyrrolo[1,2-a]pyrazin-7-one (Compound D1.2)

To a solution of tert-butyl (4R,8aS)-4-methyl-7-oxo-1,3,4,6,8,8a-hexahydropyrrolo[1,2-a]pyrazine-2-carboxylate (compound D1.1, 12.4 g, 48.8 mmol) in DCM (10 mL) was added HCl/dioxane (4N, 12 mL). The reaction mixture was stirred at room temperature for 60 min, then concentrated to afford compound D1.2 (7.1 g, 94.4% yield) which was used directly to the next step without further purification. MS: calc'd 155 [(M+H)$^+$], measured 155 [(M+H)$^+$].

Step 3: Preparation of 5-[(4R,8aS)-4-methyl-7-oxo-1,3,4,6,8,8a-hexahydropyrrolo[1,2-a]pyrazin-2-yl]quinoline-8-carbonitrile (Compound D1.3)

To a solution of (4R,8aS)-4-methyl-2,3,4,6,8,8a-hexahydro-1H-pyrrolo[1,2-a]pyrazin-7-one (compound D1.2, 7.1 g, 46.1 mmol) and 5-fluoroquinoline-8-carbonitrile (intermediate A1, 7.9 g, 46.1 mmol) in DMSO (250 mL) was added DIPEA (24.9 g, 192.4 mmol). The resultant mixture was stirred at 120° C. for 5 hrs. The reaction mixture was cooled to room temperature, quenched with water (aq,100 mL), and extracted with EA (150 mL) twice. The combined organic layer was washed with brine (100 mL), dried over $Na_2SO_4$, and concentrated in vacuo. The residue was puri-

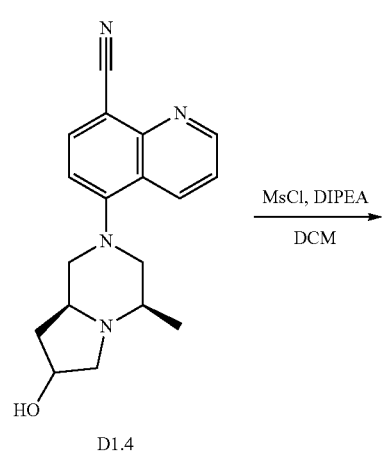

D1.4 fied by silica gel chromatography to afford compound D1.3 (11.4 g, 80.8% yield). MS: calc'd 307 [(M+H)$^+$], measured 307 [(M+H)$^+$].

Step 4: Preparation of 5-[(4R,8aS)-7-hydroxy-4-methyl-3,4,6,7,8,8a-hexahydro-1H-pyrrolo[1,2-a]pyrazin-2-yl]quinoline-8-carbonitrile (Compound D1.4)

To a solution of 5-[(4R,8aS)-4-methyl-7-oxo-1,3,4,6,8,8a-hexahydropyrrolo[1,2-a]pyrazin-2-yl]quinoline-8-carbonitrile (compound D1.3, 11.4 g, 37.2 mmol) in MeOH (100 mL) and was added NaBH$_4$ in portions (2.8 g, 74.4 mmol) at 0° C. After the addition was completed, the resultant mixture was allowed to room temperature and stirred for 2 hrs. The reaction mixture was quenched with water (10 mL) and extracted with EA (100 mL) twice. The combined organic layer was washed with brine, dried over Na$_2$SO$_4$ and concentrated in vacuo to afford compound D1.4 (10.3 g, 90% yield) which was used directly to the next step without further purification. MS: calc'd 309 [(M+H)$^+$], measured 309 [(M+H)$^+$].

Step 5: (4R,8aS)-2-(8-cyano-5-quinolyl)-4-methyl-3,4,6,7,8,8a-hexahydro-1H-pyrrolo[1,2-a]pyrazin-7-yl]methanesulfonate (Intermediate D)

To a solution of 5-[(4R,8aS)-7-hydroxy-4-methyl-3,4,6,7,8,8a-hexahydro-1H-pyrrolo[1,2-a]pyrazin-2-yl]quinoline-8-carbonitrile (compound D1.4, 10.3 g, 33.4 mmol) and DIPEA (10.8 g, 83.8 mmol) in DCM (60 mL) was slowly added MsCl (4.6 g, 40.1 mmol) at 0° C. The resultant mixture was stirred room temperature overnight. The reaction was quenched with sat. NaHCO$_3$ (aq), extracted with DCM (80 mL) twice. The combined organic layer was washed with brine (100 mL), dried over Na$_2$SO$_4$, and concentrated in vacuo to afford intermediate D (12.9 g, 92% yield) which was used directly to the next step without further purification. MS: calc'd 387 [(M+H)$^+$], measured 387 [(M+H)$^+$].

Intermediate E (4R,8aS)-2-(8-cyano-2-deuterio-5-quinolyl)-4-methyl-3,4,6,7,8,8a-hexahydro-1H-pyrrolo[1,2-a]pyrazin-7-yl]methanesulfonate

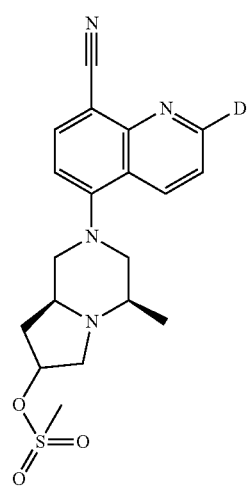

The title compound was prepared in analogy to the preparation of Intermediate D by using 2-deuterio-5-fluoroquinoline-8-carbonitrile (Intermediate A2) instead of 5-fluoroquinoline-8-carbonitrile (Intermediate A1) in step (3). Intermediate E was obtained. MS: calc'd 388 [(M+H)$^+$], measured 388 [(M+H)$^+$].

Intermediate F tert-butyl (5R)-5-methyl-2,4,5,7-tetrahydropyrazolo[3,4-c]pyridine-6-carboxylate

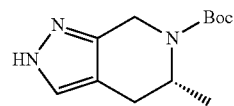 [SMILES: C[C@@H]1Cc2c[nH]nc2CN1C(=O)OC(C)(C)C]

The title compound was prepared according to the following scheme:

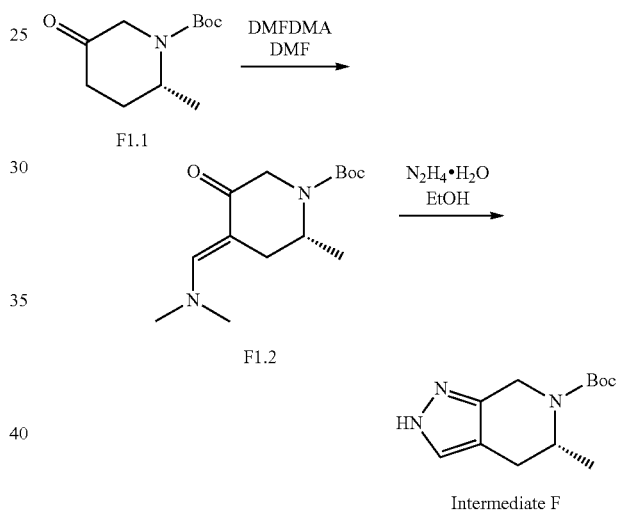

Intermediate F

Step 1: Preparation of tert-butyl 4-(dimethylaminomethylene)-(2R)-2-methyl-5-oxo-piperidine-1-carboxylate (Compound F1.2)

To a solution of tert-butyl (2R)-2-methyl-5-oxo-piperidine-1-carboxylate (compound F1.1, CAS: 2007925-02-0, Pharmablock, Catalog: PBS62487, 5.00 g, 23.44 mmol) in DMF (30 mL) was added N,N-dimethylformamide dimethyl acetal (5.58 g, 46.88 mmol). After being heated at 90° C. for 18 hrs, the mixture was cooled down and concentrated to afford compound F1.2 (6.29 g) as a tangerine liquid which was used in next step without further purification. MS: calc'd 269 [(M+H)$^+$], measured 269 [(M+H)$^+$].

Step 2: Preparation of tert-butyl (5R)-5-methyl-2,4,5,7-tetrahydropyrazolo[3,4-c]pyridine-6-carboxylate (Intermediate F)

To a solution of tert-butyl 4-(dimethylaminomethylene)-(2R)-2-methyl-5-oxo-piperidine-1-carboxylate (compound F1.2, 6.29 g, 23.44 mmol) in ethanol (30 mL) was added hydrazine hydrate (1.76 g, 35.16 mmol). After being stirred at 50° C. for 2 hrs, the mixture was cooled down and diluted with water (100 mL). The mixture was extracted by EA (100 mL) three times. The combined organic phase was dried over Na₂SO₄, filtered and concentrated. The residue was purified by flash column (EA/PE=0 to 60%) to give Intermediate F (1.80 g) as a yellow oil. MS: calc'd 238 [(M+H)⁺], measured 238 [(M+H)⁺].

Intermediate G tert-butyl 4-(5,6,7,8-tetrahydropyrido[3,4-b]pyrazin-3-yl)piperazine-1-carboxylate

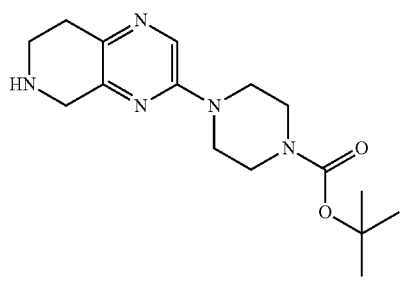 [SMILES: CC(C)(C)OC(=O)N1CCN(c2cnc3c(n2)CNCC3)CC1]

The title compound was prepared according to the following scheme:

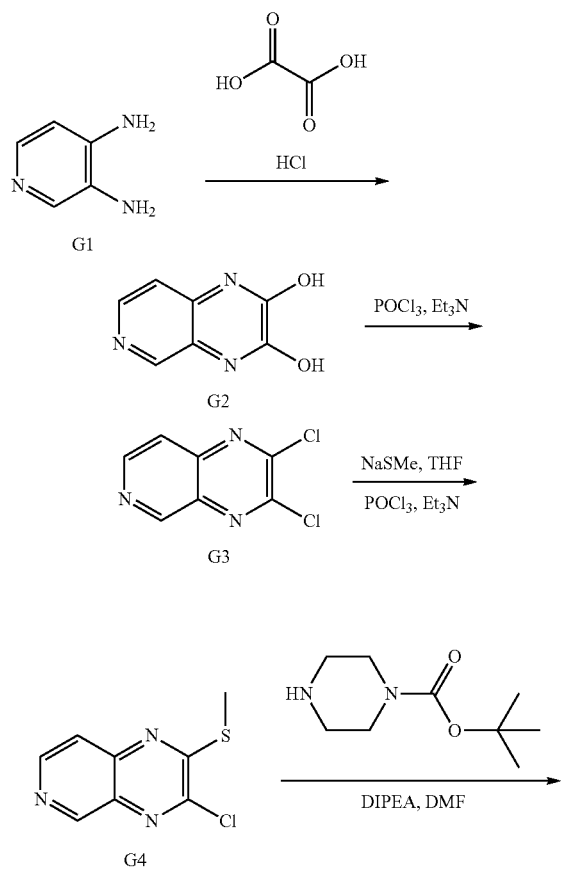

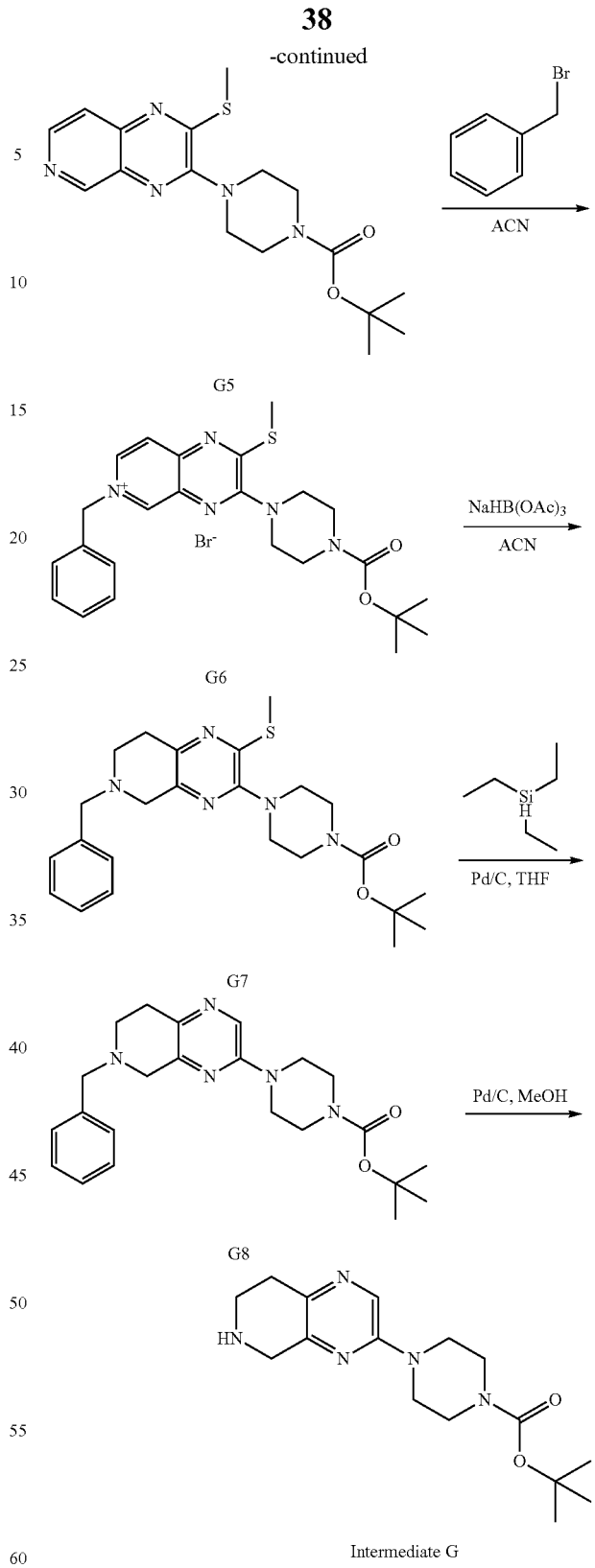

Step 1: Preparation of Pyrido[3,4-b]pyrazine-2,3-diol (Compound G2)

To a solution of 3,4-diaminopyridine (20.0 g, 183.27 mmol, compound G1) in the solvent of hydrogenchloride acid (200.0 mL) was added oxalic acid (19.8 g, 219.92 mmol) and the reaction was stirred at 100° C. for 18 hrs. After the reaction was completed, the mixture was cooled to room temperature and the suspension was then filtered. The filter cake was washed with EtOH (200 ml) and dried under vacuum to afford the crude compound G2 (33.08 g, 110.65% yield) as a white solid, which was used in the next step directly without further purification. MS: calc'd 164 [(M+H)$^+$], measured 164 [(M+H)$^+$].

Step 2: Preparation of 2,3-dichloropyrido[3,4-b]pyrazine (Compound G3)

To a solution of pyrido[3,4-b]pyrazine-2,3-diol (compound G2, 12.0 g, 73.56 mmol) in trichlorophosphate (122.0 mL, 1273 mmol) was added triethylamine (10.25 mL, 73.56 mmol). The reaction was heated at 130° C. for 48 hrs. The mixture was then concentrated in vacuo and the residue was quenched with saturated NaHCO$_3$ solution (200 mL). The resulting suspension was then filtered and the filtrate was extracted with EtOAc (500 mL) twice. The combined organic layer was washed with brine (100 mL), dried over Na$_2$SO$_4$ and then concentrated in vacuo. The residue was purified by flash chromatography (silica gel, 24 g, 0% to 30% EtOAc in PE) to afford compound G3 (900 mg, 6.12% yield) as a white solid. MS: calc'd 200 [(M+H)$^+$], measured 200 [(M+H)$^+$].

Step 3: Preparation of 3-chloro-2-methylsulfanyl-pyrido[3,4-b]pyrazine (Compound G4)

To a solution of 2,3-dichloropyrido[3,4-b]pyrazine (compound G3, 800.0 mg, 4 mmol) in THF (60 mL) was added sodium thiomethoxide (308.36 mg, 4.4 mmol) at 0° C. and the reaction was stirred at 0° C. for 1 hr. After the reaction was completed, the mixture was quenched with 2N NH$_4$Cl solution (40 mL) and the resulting mixture was then extracted with EtOAc (40 mL) three times. The combined organic layer was washed with brine (20 mL), dried over Na$_2$SO$_4$ and concentrated in vacuo. The residue was purified by flash chromatography (silica gel, 24 g, 0% to 30% EtOAc in PE) to afford compound G4 (750 mg, 88.59% yield) as yellow gum. MS: calc'd 212 [(M+H)$^+$], measured 212 [(M+H)$^+$].

Step 4: Preparation of tert-butyl 4-(2-methylsulfanylpyrido[3,4-b]pyrazin-3-yl)piperazine-1-carboxylate (Compound G5)

To a solution of 3-chloro-2-methylsulfanyl-pyrido[3,4-b]pyrazine (compound G4, 750.0 mg, 3.54 mmol) and tert-butyl piperazine-1-carboxylate in N,N-dimethylacetamide (15 mL) was added DIPEA (1.23 mL, 7.09 mmol). The solution was stirred at 50° C. for 4 hrs. After the reaction was completed, the mixture was then diluted with water (30 mL) and extracted with EtOAc (30 mL) three times. The combined organic layer was washed with brine, dried over Na$_2$SO$_4$ and then concentrated in vacuo. The residue was purified by flash chromatography (silica gel, 24 g, 0% to 30% EtOAc in PE) to afford compound G5 (500 mg, 39.04% yield) as yellow gum). MS: calc'd 362 [(M+H)$^+$], measured 362 [(M+H)$^+$].

Step 5: Preparation of tert-butyl 4-(6-benzyl-2-methylsulfanyl-pyrido[3,4-b]pyrazin-6-ium-3-yl)piperazine-1-carboxylate bromide (Compound G6)

To a solution of tert-butyl 4-(2-methylsulfanylpyrido[3,4-b]pyrazin-3-yl)piperazine-1-carboxylate (compound G5, 500.0 mg, 1.38 mmol) in ACN (10 mL) was added benzyl bromide (0.17 mL, 1.46 mmol). The reaction was then stirred at 80° C. for 2 hrs. After the reaction was completed, the mixture was concentrated in vacuo to give the crude compound G6 (730 mg, 99.1% yield) as yellow gum, which was used in the next step without further purification. MS: calc'd 452 [(M+H-Br)*], measured 452 [(M+H-Br)*].

Step 6: Preparation of tert-butyl 4-(6-benzyl-2-methylsulfanyl-7,8-dihydro-5H-pyrido[3,4-b]pyrazin-3-yl)piperazine-1-carboxylate (Compound G7)

To a solution of tert-butyl 4-(6-benzyl-2-methylsulfanyl-pyrido[3,4-b]pyrazin-6-ium-3-yl)piperazine-1-carboxylate bromide (compound G6, 730.0 mg, 1.37 mmol) in ACN (30 mL) was added sodium triacetoxyborohydride (1452.74 mg, 6.85 mmol) at 0° C. The reaction was stirred at 20° C. for 4 hrs. After the reaction was completed, the mixture was concentrated in vacuo. The residue was purified by flash chromatography (silica gel, 24 g, 0% to 5% MeOH in DCM) to afford compound G7 (500 mg, 80.05% yield) as yellow gum. MS: calc'd 456 [(M+H)$^+$], measured 456 [(M+H)$^+$].

Step 7: Preparation of tert-butyl 4-(6-benzyl-7,8-dihydro-5H-pyrido[3,4-b]pyrazin-3-yl)piperazine-1-carboxylate (Compound G8)

To a solution of tert-butyl 4-(6-benzyl-2-methylsulfanyl-7,8-dihydro-5H-pyrido[3,4-b]pyrazin-3-yl)piperazine-1-carboxylate (compound G7, 500.0 mg, 1.1 mmol) in THF (30 mL) was added 10% Pd/C (300.0 mg) and triethylsilane (3000.0 mg, 25.86 mmol) at 0° C. The reaction was stirred at 20° C. for 18 hrs. After the reaction was completed, the mixture was filtered and the filtrate was concentrated in vacuo. The residue was purified by flash chromatography (silica gel, 24 g, 0% to 50% EtOAc in PE) to afford compound G8 (250 mg 55.63% yield) as a yellow solid. MS: calc'd 410 [(M+H)$^+$], measured 410 [(M+H)$^+$].

Step 8: Preparation of tert-butyl 4-(5,6,7,8-tetrahydropyrido[3,4-b]pyrazin-3-yl)piperazine-1-carboxylate (Intermediate G)

To a solution of tert-butyl 4-(6-benzyl-7,8-dihydro-5H-pyrido[3,4-b]pyrazin-3-yl)piperazine-1-carboxylate (compound G8, 250.0 mg, 0.61 mmol) in methanol (20 mL) was added Palladium on activated carbon(10%) (50 mg) and the mixture was then stirred under H$_2$ atmosphere for 18 hrs. After the reaction was completed, the mixture was filtered and the filtrate was concentrated in vacuo. The residue was purified by flash chromatography (silica gel, 24 g, 0% to 50% EtOAc in PE) to afford intermediate G (56 mg, 28.7% yield) as a yellow solid. MS: calc'd 320 [(M+H)$^+$], measured 320 [(M+H)$^+$].

Example 1

5-[(4R,7R,8aS)-4-methyl-7-(5,6,7,8-tetrahydro-1,6-naphthyridin-2-ylamino)-3,4,6,7,8,8a-hexahydro-1H-pyrrolo[1,2-a]pyrazin-2-yl]quinoline-8-carbonitrile

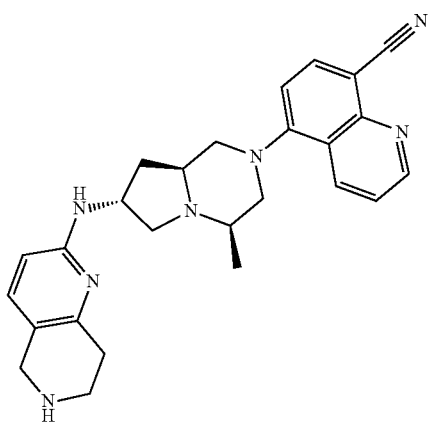 [SMILES: C[C@@H]1CN(c2ccc(C#N)c3ncccc23)C[C@@H]2C[C@@H](Nc3ccc4c(n3)CCNC4)CN21]

The titled compound was synthesized according to the following scheme:

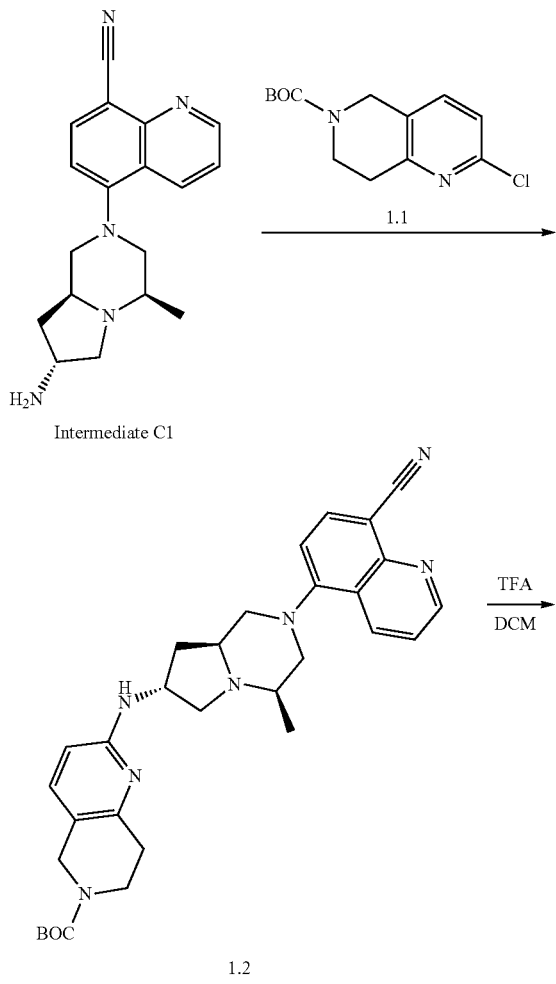

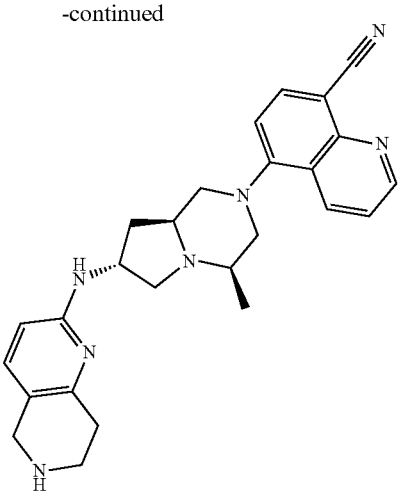

Example 1

Step 1: Preparation of tert-butyl 2-[(4R,7R,8aS)-2-(8-cyano-5-quinolyl)-4-methyl-3,4,6,7,8,8a-hexahydro-1H-pyrrolo[1,2-a]pyrazin-7-yl]amino]-7,8-dihydro-5H-1,6-naphthyridine-6-carboxylate (Compound 1,2)

To a solution of 5-[(4R,8aS)-7-amino-4-methyl-3,4,6,7,8,8a-hexahydro-1H-pyrrolo[1,2-a]pyrazin-2-yl]quinoline-8-carbonitrile (Intermediate C1.70 mg, 228 μmol) in dioxane (8 mL) was added tert-butyl 2-chloro-7,8-dihydro-5H-1,6-naphthyridine-6-carboxylate (compound 1.1, CAS: 1151665-15-4, PharmaBlock, Catalog: PB06675, 61.2 mg, 228 μmol), RuPhos Pd G2 (CAS: 1375325-68-0, Sigma-Aldrich, Catalog: 753246, 17.7 mg, 22.8 μmol) and $Cs_2CO_3$ (223 mg, 683 μmol). The resultant mixture was stirred at 90° C. overnight. After the reaction mixture being cooled to room temperature, diluted with water (30 mL) and extracted with EA (30 mL) for three times. The combined organic layer was washed with brine (30 mL), dried over $Na_2SO_4$, and concentrated in vacuo. The residue was purified by flash chromatography (silica gel, 24 g, 0% to 100% EtOAc in PE) to afford compound 1.2 (38 mg, 30.9% yield). MS: calc'd 540 [(M+H)$^+$], measured 540 [(M+H)$^+$].

Step 2: Preparation of 5-[(4R,7R,8aS)-4-methyl-7-(5,6,7,8-tetrahydro-1,6-naphthyridin-2-ylamino)-3,4,6,7,8,8a-hexahydro-1H-pyrrolo[1,2-a]pyrazin-2-yl]quinoline-8-carbonitrile (Example 1)

To a solution of tert-butyl 2-[(4R,7R,8aS)-2-(8-cyano-5-quinolyl)-4-methyl-3,4,6,7,8,8a-hexahydro-1H-pyrrolo[1,2-a]pyrazin-7-yl]amino]-7,8-dihydro-5H-1,6-naphthyridine-6-carboxylate (compound 1,2, 30 mg, 55.6 μmol)) in DCM (4 mL) was added TFA (1 mL). The reaction mixture was stirred at room temperature for 30 min, then concentrated to afford a crude product which was purified by pre-HPLC to afford Example 1 (15 mg, 61.3% yield). The stereochemistry was confirmed by NOESY. MS: calc'd 440 [(M+H)$^+$], measured 440 [(M+H)$^+$]. $^1$H NMR (400 MHz, METHANOL-d$_4$) δ ppm 9.05-8.94 (m, 1H), 8.67-8.59 (m, 1H), 8.16 (d, J=8.1 Hz, 1H), 7.72-7.60 (m, 1H), 7.28 (d, J=8.1 Hz, 1H), 7.18 (d, J=8.4 Hz, 1H), 6.40 (d, J=8.4 Hz, 1H), 4.48-4.35 (m, 1H), 3.92-3.83 (m, 1H), 3.81 (s, 2H), 3.61 (br d, J=11.1 Hz, 1H), 3.44 (br d, J=11.1 Hz, 1H), 3.12 (t, J=6.1 Hz, 2H), 2.96-2.70 (m, 6H), 2.22-2.12 (m, 1H), 2.07-1.96 (m, 1H), 1.84-1.76 (m, 1H), 1.20 (d, J=5.9 Hz, 3H).

Example 2

5-[(4R,7R,8aS)-4-methyl-7-(5,6,7,8-tetrahydro-2,6-naphthyridin-3-ylamino)-3,4,6,7,8,8a-hexahydro-1H-pyrrolo[1,2-a]pyrazin-2-yl]quinoline-8-carbonitrile

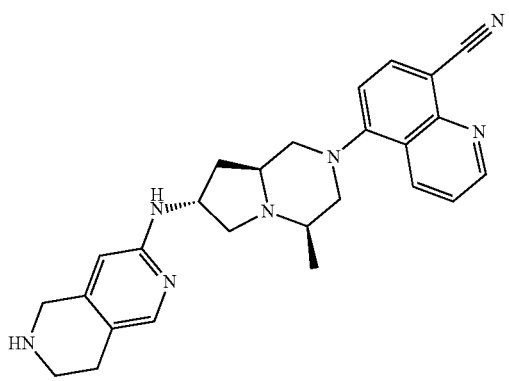 [SMILES: C[C@@H]1CN(c2ccc(C#N)c3ncccc23)C[C@@H]2C[C@@H](Nc3cc4c(cn3)CCNC4)CN21]

The title compound was prepared in analogy to the preparation of Example 1 by using tert-butyl 7-chloro-3,4-dihydro-1H-2,6-naphthyridine-2-carboxylate (CAS: 1060816-50-3, Bide Pharmatech, Catalog: BD748515) instead of tert-butyl 2-chloro-7,8-dihydro-5H-1,6-naphthyridine-6-carboxylate in step 1. Example 2 was obtained. MS: calc'd 440 [(M+H)$^+$], measured 440 [(M+H)$^+$]. $^1$H NMR (400 MHz, METHANOL-d$_4$) δ ppm 9.04-8.95 (m, 1H), 8.67-8.58 (m, 1H), 8.17 (d, J=8.1 Hz, 1H), 7.76 (s, 1H), 7.70-7.63 (m, 1H), 7.29 (d, J=8.1 Hz, 1H), 6.30 (s, 1H), 4.36 (br d, J=7.1 Hz, 1H), 3.89-3.80 (m, 1H), 3.87 (s, 2H), 3.61 (br d, J=10.8 Hz, 1H), 3.44 (br d, J=11.0 Hz, 1H), 3.05 (t, J=6.0 Hz, 2H), 2.98-2.61 (m, 6H), 2.23-2.14 (m, 1H), 2.09-1.97 (m, 1H), 1.84-1.74 (m, 1H), 1.20 (d, J=5.9 Hz, 3H).

Example 3

5-[(4R,7R,8aS)-4-methyl-7-(5,6,7,8-tetrahydro-1,7-naphthyridin-2-ylamino)-3,4,6,7,8,8a-hexahydro-1H-pyrrolo[1,2-a]pyrazin-2-yl]quinoline-8-carbonitrile

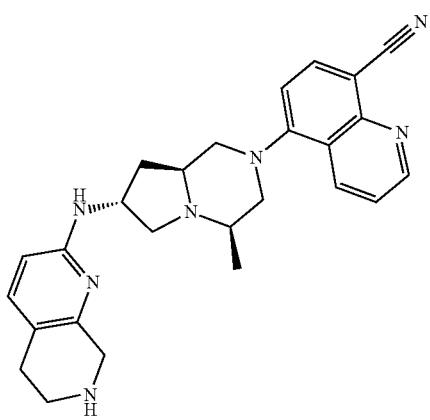 [SMILES: C[C@@H]1CN(c2ccc(C#N)c3ncccc23)C[C@@H]2C[C@@H](Nc3ccc4c(n3)CNCC4)CN21]

The title compound was prepared in analogy to the preparation of Example 1 by using tert-butyl 2-chloro-6,8-dihydro-5H-1,7-naphthyridine-7-carboxylate (CAS: 1211581-54-2, PharmaBlock, Catalog: PBLJ8189) instead of tert-butyl 2-chloro-7,8-dihydro-5H-1,6-naphthyridine-6-carboxylate in step 1. Example 3 was obtained. MS: calc'd 440 [(M+H)$^+$], measured 440 [(M+H)$^+$]. $^1$H NMR (400 MHz, METHANOL-d$_4$) δ ppm 9.10-8.96 (m, 1H), 8.72-8.62 (m, 1H), 8.20 (d, J=8.1 Hz, 1H), 7.74-7.62 (m, 1H), 7.39 (d, J=8.1 Hz, 1H), 7.35 (d, J=8.6 Hz, 1H), 6.57 (d, J=8.6 Hz, 1H), 4.71-4.60 (m, 1H), 4.27-4.15 (m, 1H), 4.23 (s, 2H), 3.91-3.83 (m, 1H), 3.78 (br d, J=12.6 Hz, 1H), 3.65 (br d, J=12.5 Hz, 2H), 3.50 (t, J=6.2 Hz, 2H), 3.22-3.04 (m, 2H), 2.97 (br t, J=6.1 Hz, 3H), 2.33-2.13 (m, 2H), 1.40 (d, J=6.4 Hz, 3H).

Example 4

5-[(4R,7R,8aS)-4-methyl-7-[(6-methyl-7,8-dihydro-5H-1,6-naphthyridin-2-yl)amino]-3,4,6,7,8,8a-hexahydro-1H-pyrrolo[1,2-a]pyrazin-2-yl]quinoline-8-carbonitrile

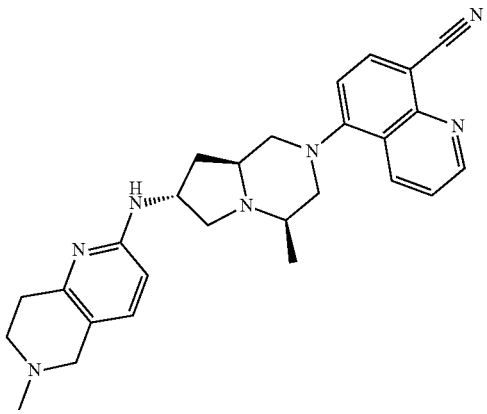 [SMILES: C[C@@H]1CN(c2ccc(C#N)c3ncccc23)C[C@@H]2C[C@@H](Nc3ccc4c(n3)CCN(C)C4)CN21]

The title compound was prepared in analogy to the preparation of Example 1 by using tert-butyl 2-chloro-6-methyl-7,8-dihydro-5H-1,6-naphthyridine instead of tert-butyl 2-chloro-7,8-dihydro-5H-1,6-naphthyridine-6-carboxylate in step 1. Example 4 was obtained. MS: calc'd 454 [(M+H)$^+$], measured 454 [(M+H)$^+$]. $^1$H NMR (400 MHz, METHANOL-d$_4$) δ ppm 8.89-8.79 (m, 1H), 8.56-8.41 (m, 1H), 8.03 (d, J=8.1 Hz, 1H), 7.56-7.46 (m, 1H), 7.16 (d, J=8.1 Hz, 1H), 7.07 (d, J=8.4 Hz, 1H), 6.28 (d, J=8.4 Hz, 1H), 4.30 (br d, J=7.2 Hz, 1H), 3.79-3.70 (m, 1H), 3.49 (br d, J=11.1 Hz, 1H), 3.39 (s, 2H), 3.33 (br d, J=11.2 Hz, 1H), 2.84-2.61 (m, 8H), 2.36 (s, 3H), 2.09-2.03 (m, 1H), 1.96-1.84 (m, 1H), 1.75-1.64 (m, 1H), 1.08 (d, J=6.0 Hz, 3H).

Example 5

5-[(4R,7R,8aS)-4-methyl-7-[methyl(5,6,7,8-tetrahydro-1,6-naphthyridin-2-yl)amino]-3,4,6,7,8,8a-hexahydro-1H-pyrrolo[1,2-a]pyrazin-2-yl]quinoline-8-carbonitrile

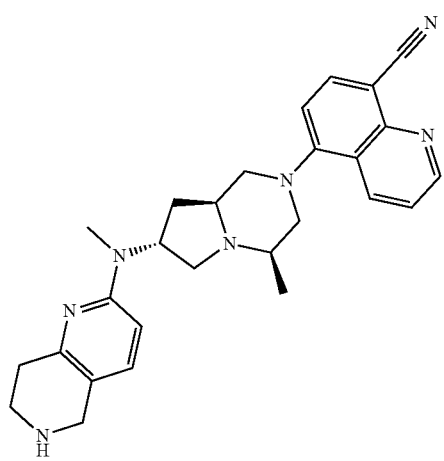 [SMILES: C[C@@H]1CN(c2ccc(C#N)c3ncccc23)C[C@@H]2C[C@@H](N(C)c3ccc4c(n3)CCNC4)CN21]

The title compound was prepared according to the following scheme:

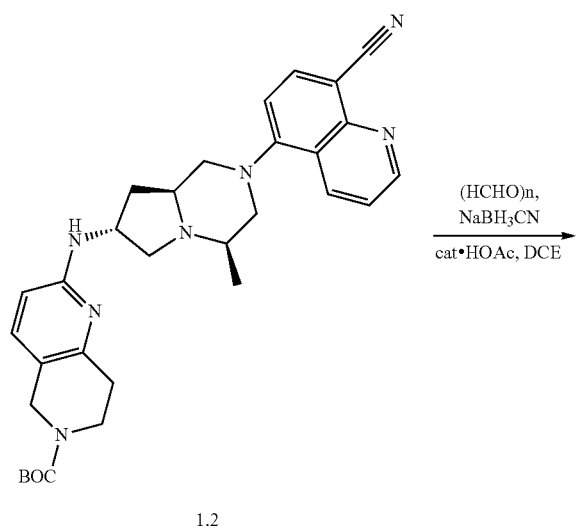

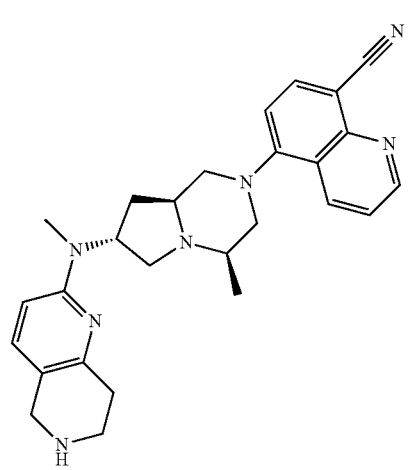

Step 1: Preparation of tert-butyl 2-[methyl-[4R,7R,8aS)-2-(8-cyano-5-quinolyl)-4-methyl-3,4,6,7,8,8a-hexahydro-1H-pyrrolo[1,2-a]pyrazin-7-yl]amino]-7,8-dihydro-5H-1,6-naphthyridine-6-carboxylate (Compound 5.1)

To a solution of tert-butyl 2-[(4R,7R,8aS)-2-(8-cyano-5-quinolyl)-4-methyl-3,4,6,7,8,8a-hexahydro-1H-pyrrolo[1,2-a]pyrazin-7-yl]amino]-7,8-dihydro-5H-1,6-naphthyridine-6-carboxylate (compound 1.2, 36.0 mg, 70 μmol) in DCE (8 mL) was added formaldehyde (22.2 mg, 74 μmol), NaBH₃CN (22.2 mg, 350 μmol) and acetic acid (50 μL, 70 μmol). The resultant mixture was stirred at 50° C. for 2 hrs. The reaction mixture was diluted with water (20 mL), extracted with EA (20 mL) twice. The combined organic layer was washed with brine (20 mL), dried over Na₂SO₄, and concentrated in vacuo. The residue was purified by flash chromatography (silica gel, 12 g, 0% to 100% EtOAc in PE) to afford compound 5.1 (28 mg, 72.2% yield). MS: calc'd 554 [(M+H)⁺], measured 554 [(M+H)⁺].

Step 2: Preparation of 5-[(4R,7R,8aS)-4-methyl-7-[methyl(5,6,7,8-tetrahydro-1,6-naphthyridin-2-yl)amino]-3,4,6,7,8,8a-hexahydro-1H-pyrrolo[1,2-a]pyrazin-2-yl]quinoline-8-carbonitrile (Example 5)

To a solution of tert-butyl 2-[methyl-[4R,7R,8aS)-2-(8-cyano-5-quinolyl)-4-methyl-3,4,6,7,8,8a-hexahydro-1H-pyrrolo[1,2-a]pyrazin-7-yl]amino]-7,8-dihydro-5H-1,6-naphthyridine-6-carboxylate (compound 5.1, 28 mg, 50.6 µmol)) in DCM (4 mL) was added TFA (2 mL). The reaction mixture was stirred at room temperature for 30 min, then concentrated to afford a crude product which was purified by pre-HPLC to afford Example 5 (8.1 mg, 36.1% yield). The stereochemistry was confirmed by NOESY. MS: calc'd 454 [(M+H)+], measured 454 [(M+H)+]. $^1$H NMR (400 MHz, METHANOL-d$_4$) δ ppm 9.09 (d, J=1.6 Hz, 1H), 8.92-8.90 (m, 1H), 8.29 (d, J=8 Hz, 1H), 7.92-7.90 (m, 1H), 7.84-7.81 (m, 1H), 7.53-7.51 (m, 1H), 7.44-7.42 (m, 1H), 5.40-5.38 (m, 1H), 4.40-4.34 (m, 4H), 4.13-3.98 (m, 1H), 3.96-3.77 (m, 2H), 3.76-3.64 (m, 3H), 3.60-3.47 (m, 2H), 3.38-3.35 (m, 5H), 2.70-2.46 (m, 2H), 1.54 (d, J=3.6 Hz, 3H).

Example 6

5-[(4R,7R,8aS)-4-methyl-7-(5,6,7,8-tetrahydro-pyrido[4,3-d]pyrimidin-2-ylamino)-3,4,6,7,8,8a-hexahydro-1H-pyrrolo[1,2-a]pyrazin-2-yl]quinoline-8-carbonitrile

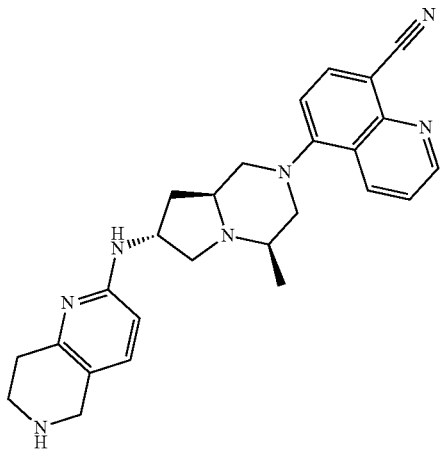 [SMILES: C[C@@H]1CN(c2ccc(C#N)c3ncccc23)C[C@@H]2C[C@@H](Nc3ccc4c(n3)CCNC4)CN21]

The title compound was prepared in analogy to the preparation of Example 1 by using tert-butyl 2-chloro-7,8-dihydro-5H-pyrido[4,3-d]pyrimidine-6-carboxylate (CAS: 1092352-55-0, PharmaBlock, Catalog: PBN2011121) instead of tert-butyl 2-chloro-7,8-dihydro-5H-1,6-naphthyridine-6-carboxylate in step 1. Example 6 was obtained. MS: calc'd 441 [(M+H)+], measured 441 [(M+H)+]. $^1$H NMR (400 MHz, METHANOL-d$_4$) δ ppm 9.09 (d, J=2.8 Hz, 1H), 8.92 (d, J=8 Hz, 1H), 8.46 (s, 1H), 8.30 (d, J=7.6 Hz, 1H), 7.87-7.84 (m, 1H), 7.51 (d, J=8.4 Hz, 1H), 4.87 (s, 1H), 4.38-4.34 (m, 4H), 4.18-3.98 (m, 1H), 3.96 (dd, J=13.2 Hz, 2H), 3.68-3.65 (m, 2H), 3.52-3.47 (m, 2H), 3.31-3.25 (m, 3H), 2.50-2.46 (m, 2H), 1.54 (d, J=3.6 Hz, 3H).

Example 7A and 7B

5-[(4R,7R,8aS)-4-methyl-7-[[(5R)-5-methyl-6,7-dihydro-5H-pyrrolo[3,4-b]pyridin-2-yl]amino]-3,4,6,7,8,8a-hexahydro-1H-pyrrolo[1,2-a]pyrazin-2-yl]quinoline-8-carbonitrile and 5-[(4R,7R,8aS)-4-methyl-7-[[(5S)-5-methyl-6,7-dihydro-5H-pyrrolo[3,4-b]pyridin-2-yl]amino]-3,4,6,7,8,8a-hexahydro-1H-pyrrolo[1,2-a]pyrazin-2-yl]quinoline-8-carbonitrile

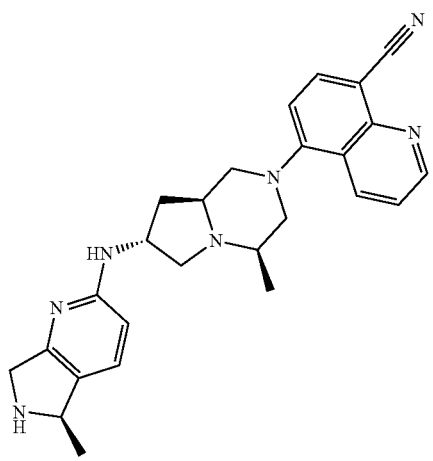

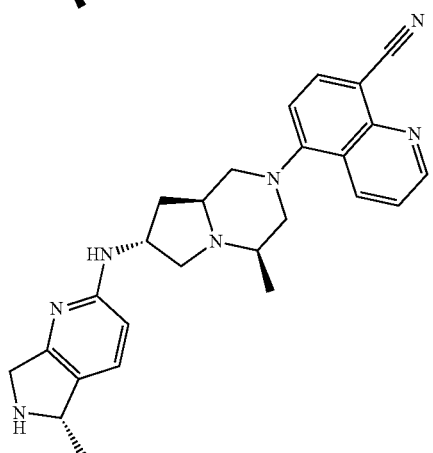

The title compounds were prepared according to the following scheme:

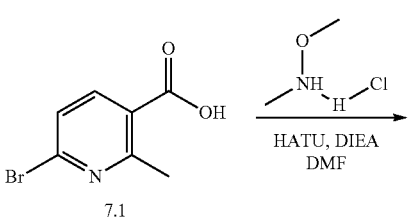

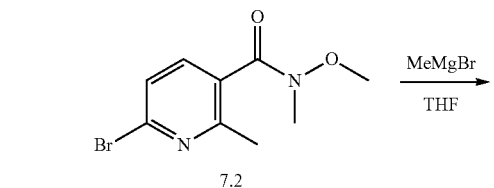

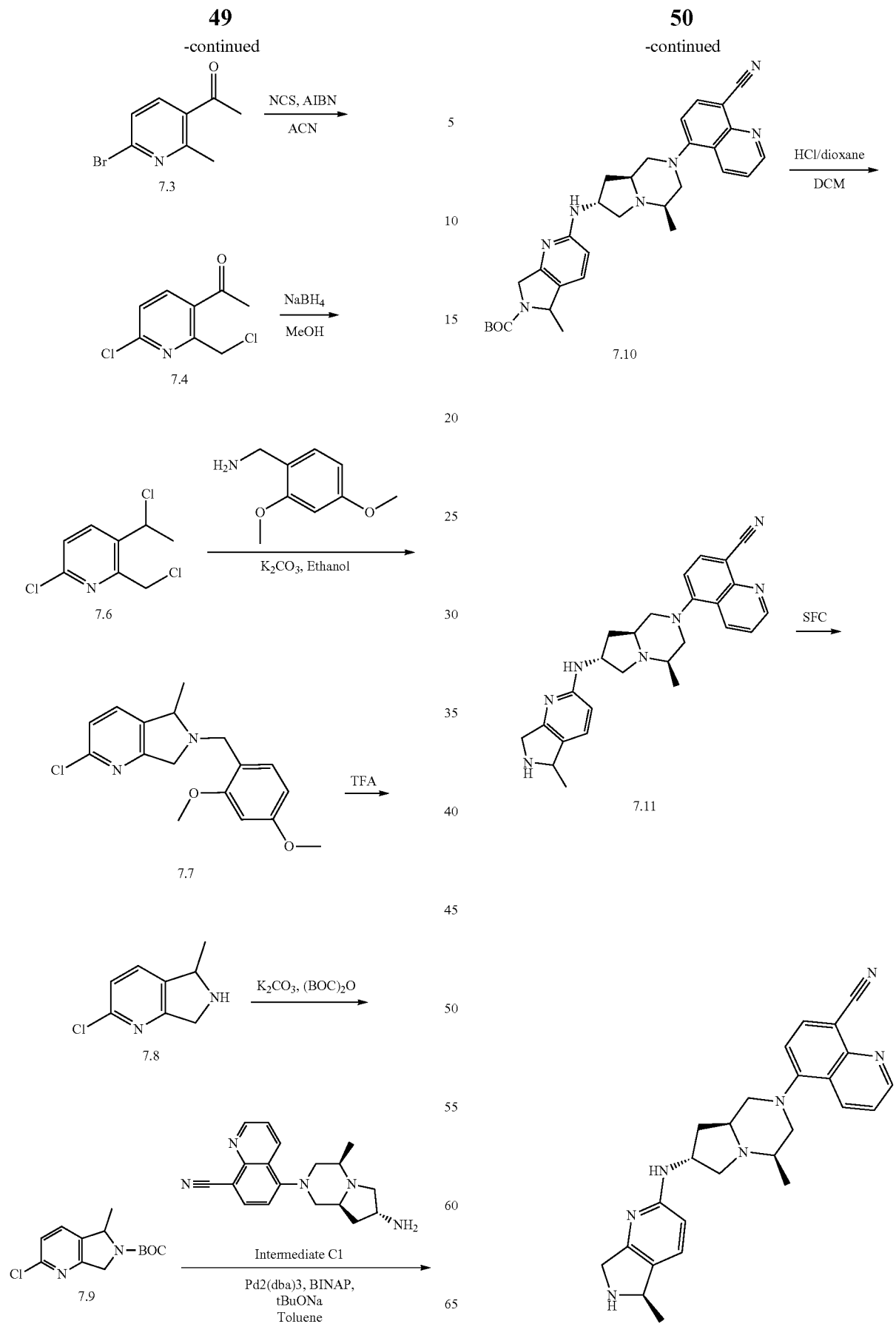

-continued

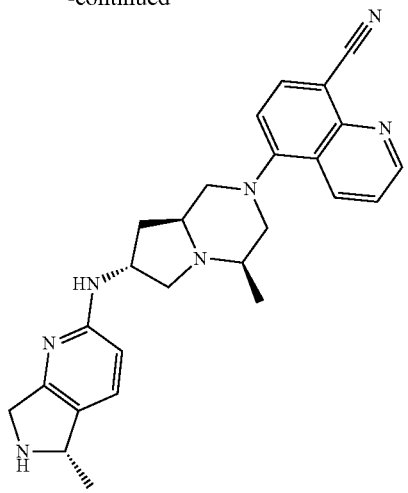

Step 1: Preparation of 6-bromo-N-methoxy-N,2-dimethyl-pyridine-3-carboxamide (Compound 7.2)

To a solution of 6-bromo-2-methyl-pyridine-3-carboxylic acid (compound 7.1, 10.0 g, 46.3 mmol) in DMF (300 mL) was added DIPEA (23.9 g, 185.2 mmol), HATU (21.1 g, 55.5 mmol) and O,N-dimethylhydroxylamine HCl (9.0 g, 92.6 mmol). The resultant mixture was stirred at room temperature overnight. The reaction was quenched with water (1 L), and extracted with EtOAc (400 mL) for three times. The combined organic layer was washed with brine (100 mL), dried over $Na_2SO_4$, and concentrated in vacuo. The residue was purified by silica gel chromatography column to afford compound 7.2 (11.5 g, 91.1% yield). MS: calc'd 259 [(M+H)$^+$], measured 259 [(M+H)$^+$].

Step 2: Preparation of 1-(6-bromo-2-methyl-3-pyridyl)ethanone (Compound 7.3)

To a solution of 6-bromo-N-methoxy-N,2-dimethyl-pyridine-3-carboxamide (compound 7.2, 11.5 g, 42.2 mmol) in THF (200 mL) was added dropwise methylmagnesium bromide (28.1 mL, 84.3 mmol) at 0° C. The resultant mixture was stirred at 15° C. for 1 h. The reaction was quenched with saturated NH$_4$Cl (aq, 100 mL), extracted with EtOAc (300 mL) for three times. The combined organic layer was washed with water (200 mL) and brine (200 mL), dried over Na$_2$SO$_4$, and concentrated in vacuo. The residue was purified by silica gel chromatography column to afford compound 7.3 (9.0 g, 98.4% yield). MS: calc'd 214 [(M+H)$^+$], measured 214 [(M+H)$^+$].

Step 3: Preparation of 1-(6-chloro-2-(chloromethyl) pyridin-3-yl)ethanone (Compound 7.4)

A solution of 1-(6-bromo-2-methyl-3-pyridyl)ethanone (compound 7.3, 4.0 g, 18.4 mmol), NCS (4.9 g, 36.9 mmol) and AIBN (454.3 mg, 2.8 mmol) in acetonitrile (120 mL) was stirred at 80° C. for 16 hrs. The reaction was diluted with water (400 mL), extracted with EtOAc (200 mL) for twice. The combined organic layer was washed with water (200 mL) and brine (200 mL), dried over Na$_2$SO$_4$, and concentrated in vacuo. The residue was purified by silica gel chromatography column to afford compound 7.4 (1.8 g, 38.2% yield). MS: calc'd 204 [(M+H)$^+$], measured 204 [(M+H)$^+$].

Step 4: Preparation of 1-(6-chloro-2-(chloromethyl) pyridin-3-yl)ethanol (Compound 7.5)

To a solution of 1-(6-chloro-2-(chloromethyl)pyridin-3-yl)ethanone (compound 7.4, 4.0 g, 15.6 mmol) in methanol (100 mL) was added sodium borohydride (1.2 g, 31.3 mmol) at 0° C. and stirred at same temperature for 1 h. The reaction mixture was quenched with HCl (aq.10% solution) until pH was about 4. Then the resultant mixture was basified with aq. K$_2$CO$_3$ to pH about 8, extracted with EA (100 mL) for three times. The combined organic layer was washed with brine (100 mL), dried over Na$_2$SO$_4$, and concentrated in vacuo to afford compound 7.5 (4.3 g, 82.9% yield) which was used directly to the next step without further purification.

Step 5: Preparation of 6-chloro-3-(1-chloroethyl)-2-(chloromethyl)pyridine (Compound 7.6)

To a solution of 1-(6-chloro-2-(chloromethyl)pyridin-3-yl)ethanol (compound 7.5, 4.3 g, 13.1 mmol) in DCM (50 mL) was added SOCl$_2$ (7.8 g, 65.4 mmol) at 0° C. The resultant mixture was stirred at room temperature for 3 hrs. The reaction was quenched with saturated NaHCO$_3$ (100 mL), extracted with DCM (200 mL) twice. The combined organic layer was washed with water brine (200 mL), dried over Na$_2$SO$_4$, and concentrated in vacuo. The residue was purified by silica gel chromatography column to afford compound 7.6 (4.0 g, 81.3% yield). MS: calc'd 224 [(M+H)$^+$], measured 224 [(M+H)$^+$].

Step 6: Preparation of 2-chloro-6-[(2,4-dimethoxyphenyl)methyl]-5-methyl-5,7-dihydropyrrolo[3,4-b] pyridine (Compound 7.7)

To a solution of 6-chloro-3-(1-chloroethyl)-2-(chloromethyl)pyridine (compound 7.6, 3.8 g, 16.9 mmol) in ethanol (50.78 mL) was added K$_2$CO$_3$ (4.7 g, 33.8 mmol) and 2,4-dimethoxybenzylamine (2.8 mL, 18.6 mmol) and stirred at 65° C. for 18 hrs. The reaction mixture was cooled to room temperature, filtered through celite with EA (50 mL), and the filtrate was concentrated. The residue was purified by silica gel chromatography column to afford compound 7.7 (3.9 g, 72.3% yield). MS: calc'd 319 [(M+H)$^+$], measured 319 [(M+H)$^+$].

Step 7: Preparation of 2-chloro-5-methyl-6,7-dihydro-5H-pyrrolo[3,4-b]pyridine (Compound 7.8)

The solution of 2-chloro-6-[(2,4-dimethoxyphenyl) methyl]-5-methyl-5,7-dihydropyrrolo [3,4-b]pyridine (compound 7.7, 1.0 g, 3.1 mmol) in TFA (20.0 mL) was heated at 80° C. for 5 hrs. The solvent was removed in vacuo to afford the crude product compound 7.8 (0.9 g, crude) which was used for the next step without purification. MS: calc'd 169 [(M+H)$^+$], measured 169 [(M+H)$^+$].

Step 8: Preparation of tert-butyl 2-chloro-5-methyl-5,7-dihydropyrrolo[3,4-b]pyridine-6-carboxylate (Compound 7.9)

To a solution of 2-chloro-5-methyl-6,7-dihydro-5H-pyrrolo[3,4-b]pyridine; 2,2,2-trifluoroacetic acid (compound 7.8, 0.9 g, 3.2 mmol) in methanol (20 mL) was added potassium carbonate (2.6 g, 19.1 mmol), and di-tert-butyl pyrocarbonate (1.4 g, 6.4 mmol). The resultant mixture was stirred at room temperature overnight. The reaction mixture was cooled to room temperature, filtered through celite with DCM (20 mL), and the filtrate was concentrated. The residue was purified by silica gel chromatography to afford compound 7.9 (554 mg, two step 64.7% yield). MS: calc'd 269 [(M+H)$^+$], measured 269 [(M+H)$^+$].

Step 9: Preparation of tert-butyl 2-[[(4R,7R,8aS)-2-(8-cyano-5-quinolyl)-4-methyl-3,4,6,7,8,8a-hexahydro-1H-pyrrolo[1,2-a]pyrazin-7-yl]amino]-5-methyl-5,7-dihydropyrrolo[3,4-b]pyridine-6-carboxylate (Compound 7.10)

A mixture of tert-butyl 2-chloro-5-methyl-5,7-dihydropyrrolo[3,4-b]pyridine-6-carboxylate (compound 7.9, 141 mg, 0.5 mmol), 5-[(4R,7R,8aS)-7-amino-4-methyl-3,4,6,7,8,8a-hexahydro-1H-pyrrolo[1,2-a]pyrazin-2-yl]quinoline-8-carbonitrile (Intermediate C1, 154 mg, 0.5 mmol), tris(dibenzylideneacetone)dipalladium (87 mg, 0.1 mmol), BINAP (119 mg, 0.2 mmol) and tBuONa (92 mg, 960 μmol) in toluene (2 mL). The resultant mixture was stirred at 100° C. for 16 h. After being cooled to room temperature, the reaction mixture was diluted with water (30 mL) and extracted with EA (30 mL) for three times. The combined organic layer was washed with brine (30 mL), dried over Na$_2$SO$_4$, and concentrated in vacuo. The residue was purified by flash chromatography (silica gel, 24 g, 0% to 100% EtOAc in PE) to afford compound 7.10 (80 mg, 27.5% yield). MS: calc'd 540 [(M+H)$^+$], measured 540 [(M+H)$^+$].

Step 10: Preparation of 5-[(4R,7R,8aS)-4-methyl-7-[(5-methyl-6,7-dihydro-5H-pyrrolo[3,4-b]pyridin-2-yl)amino]-3,4,6,7,8,8a-hexahydro-1H-pyrrolo[1,2-a]pyrazin-2-yl]quinoline-8-carbonitrile (Compound 7.11)

To a solution of tert-butyl 2-[[(4R,7R,8aS)-2-(8-cyano-5-quinolyl)-4-methyl-3,4,6,7,8,8a-hexahydro-1H-pyrrolo[1,2-a]pyrazin-7-yl]amino]-5-methyl-5,7-dihydropyrrolo[3,4-b]pyridine-6-carboxylate (compound 7.10, 80 mg, 150 μmol) in DCM (5 mL) was added HCl/dioxane (4N,1.5 mL). The reaction mixture was stirred at room temperature for 60 min, then concentrated to afford a crude product which was purified by pre-HPLC to afford compound 7.11 (50 mg, 75.9%) as a yellow solid. MS: calc'd 440 [(M+H)$^+$], measured 440 [(M+H)$^+$].

Step 11: Preparation of 5-[(4R,7R,8aS)-4-methyl-7-[[(5R)-5-methyl-6,7-dihydro-5H-pyrrolo[3,4-b]pyridin-2-yl]amino]-3,4,6,7,8,8a-hexahydro-1H-pyrrolo[1,2-a]pyrazin-2-yl]quinoline-8-carbonitrile and 5-[(4R,7R,8aS)-4-methyl-7-[[(5S)-5-methyl-6,7-dihydro-5H-pyrrolo[3,4-b]pyridin-2-yl]amino]-3,4,6,7,8,8a-hexahydro-1H-pyrrolo[1,2-a]pyrazin-2-yl]quinoline-8-carbonitrile (Example 7A and 7B)

Compound 7.11 (50 mg) was resolved by SFC to give two single isomers: Example 7A (faster eluting, 10.8 mg). MS: calc'd 440 [(M+H)$^+$], measured 440 [(M+H)$^+$]; and Example 7B (slower eluting, 11.8 mg). MS: calc'd 440 [(M+H)$^+$], measured 440 [(M+H)$^+$], with 30% Methanol (0.1% NH$_3$H$_2$O)/CO$_2$ on DAICEL CHIRALPAK AD (10 μm, 250×30 mm) column. Example 7A $^1$H NMR (400 MHz, DMSO-d$_6$) δ ppm 9.03 (dd, J=4.0, 1.2 Hz, 1H), 8.48-8.53 (m, 1H), 8.21 (d, J=8.0 Hz, 1H), 7.66 (dd, J=8.4, 4.0 Hz, 1H), 7.26 (d, J=8.4 Hz, 1H), 7.21 (d, J=8.0 Hz, 1H), 6.64 (d, J=5.6 Hz, 1H), 6.33 (d, J=8.4 Hz, 1H), 4.26-4.37 (m, 2H), 3.94 (s, 2H), 3.68 (t, J=8.0 Hz, 1H), 3.52 (d, J=8.4 Hz, 2H), 2.73 (d, J=6.4 Hz, 2H), 2.65 (d, J=6.4 Hz, 2H), 2.03 (t, J=7.8 Hz, 1H), 1.75-1.84 (m, 1H), 1.64-1.72 (m, 1H), 1.27 (d, J=6.4 Hz, 3H), 1.22 (s, 1H), 1.06 (d, J=5.6 Hz, 3H). Example 7B $^1$H NMR (400 MHz, DMSO-d$_6$) δ ppm 9.03 (dd, J=4.0, 1.2 Hz, 1H), 8.50 (dd, J=8.4, 1.2 Hz, 1H), 8.21 (d, J=8.4 Hz, 1H), 7.66 (dd, J=8.4, 4.0 Hz, 1H), 7.32 (d, J=8.4 Hz, 1H), 7.21 (d, J=8.4 Hz, 1H), 6.84 (d, J=3.6 Hz, 1H), 6.40 (d, J=8.4 Hz, 1H), 4.53 (d, J=5.6 Hz, 1H), 4.29 (s, 1H), 4.08 (s, 2H), 3.67 (s, 1H), 3.37 (d, J=7.6 Hz, 2H), 2.73 (d, J=7.6 Hz, 2H), 2.65 (d, J=6.4 Hz, 2H), 2.01-2.07 (m, 1H), 1.75-1.85 (m, 1H), 1.69 (d, J=10.0 Hz, 1H), 1.38 (d, J=6.4 Hz, 3H), 1.22 (s, 1H), 1.06 (d, J=5.6 Hz, 3H).

Example 8A and 8B

5-[(4R,7R,8aS)-4-methyl-7-[[(7S)-7-methyl-5,6,7,8-tetrahydro-1,6-naphthyridin-2-yl]amino]-3,4,6,7,8,8a-hexahydro-1H-pyrrolo[1,2-a]pyrazin-2-yl]quinoline-8-carbonitrile and 5-[(4R,7R,8aS)-4-methyl-7-[[(7R)-7-methyl-5,6,7,8-tetrahydro-1,6-naphthyridin-2-yl]amino]-3,4,6,7,8,8a-hexahydro-1H-pyrrolo[1,2-a]pyrazin-2-yl]quinoline-8-carbonitrile

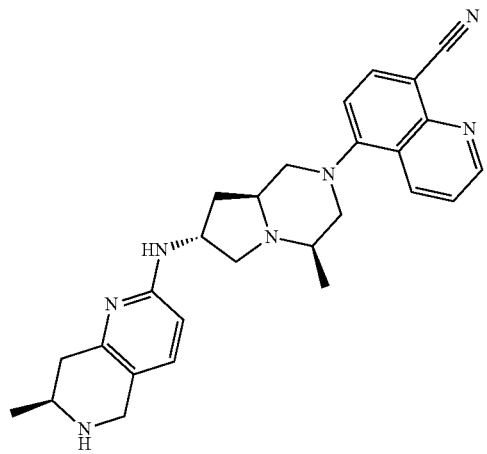

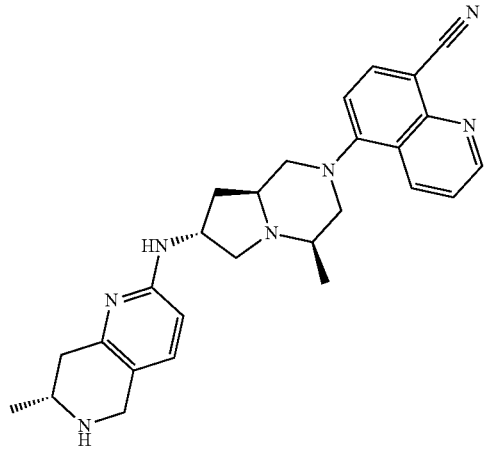

The title compounds were prepared according to the following scheme:

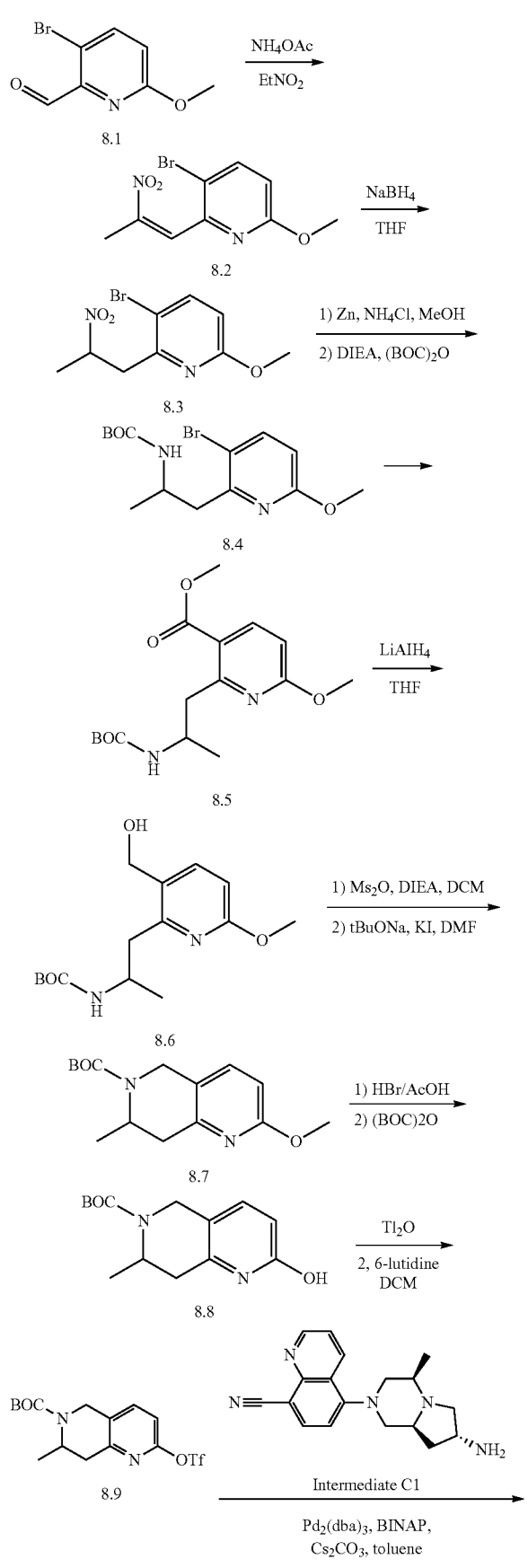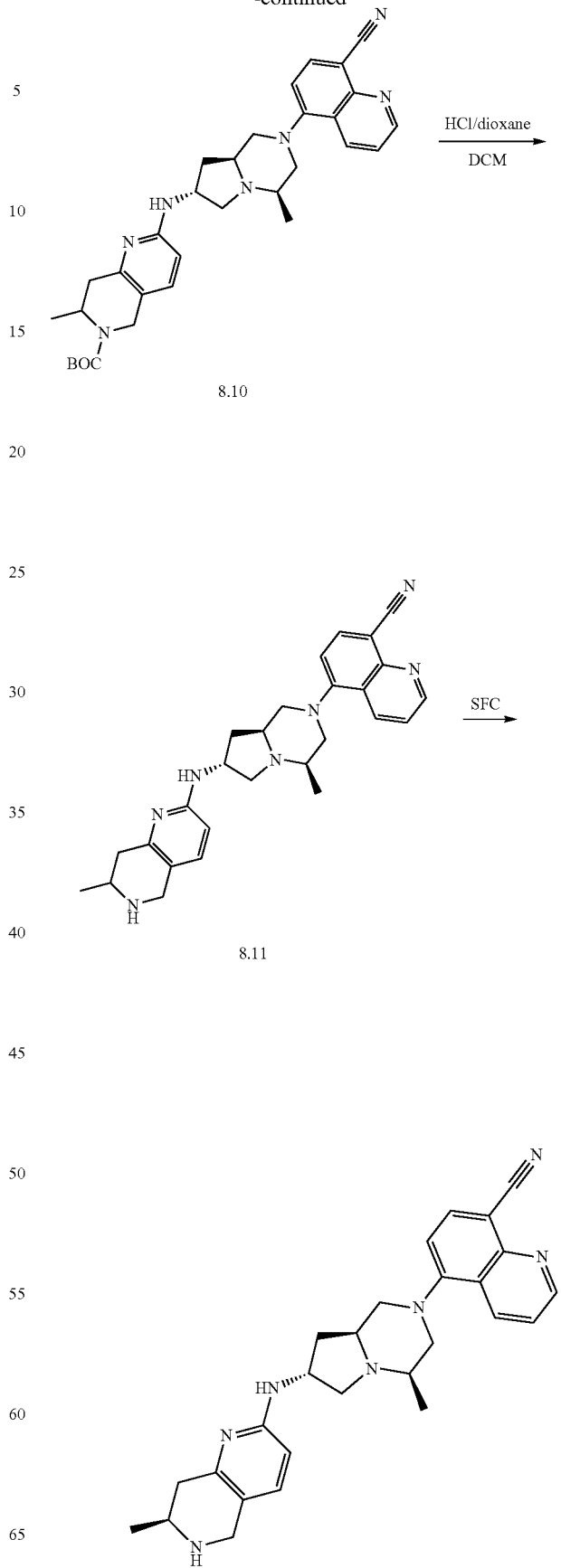

-continued

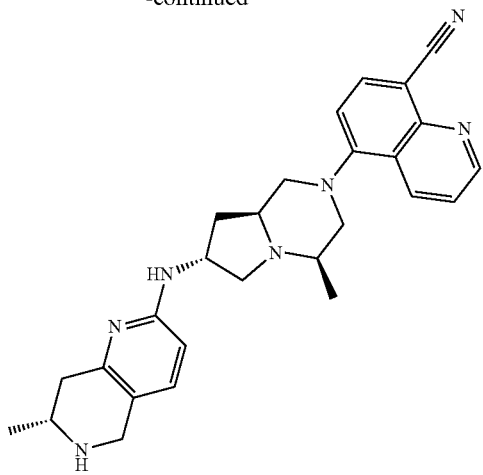

Step 1: Preparation of 3-bromo-6-methoxy-2-[(Z)-2-nitroprop-1-enyl]pyridine (Compound 8.2)

A solution of 3-bromo-6-methoxy-pyridine-2-carbaldehyde (compound 8.1, 5.0 g, 23.1 mmol) and NH$_4$OAc(890 mg, 11.6 mmol) in nitroethane (30.0 ML) was stirred at 100° C. for 16 hrs. The reaction mixture was concentrated in vacuo. The residue was purified by silica gel chromatography to afford compound 8.2 (2.6 g, 41.2% yield).MS calc'd 273 and 275 [(M+H)$^+$]; measured 273 and 275 [(M+H)$^+$].

Step 2: Preparation of 3-bromo-6-methoxy-2-(2-nitropropyl)pyridine (Compound 8.3)

To a solution of 3-bromo-6-methoxy-2-[(Z)-2-nitroprop-1-enyl]pyridine (compound 8.2, 2.5 g, 7.8 mmol) in THF (75 mL) was added sodium borohydride (588 mg, 15.6 mmol) at 0° C. The resultant mixture was stirred at same temperature for 1 h, then quenched with HCl (aq.10% solution) until pH was about 4. Then the resultant mixture was basified with aq. K$_2$CO$_3$ to pH about 8, extracted with EA (50 mL) for three times. The combined organic layer was washed with brine (30 mL), dried over Na$_2$SO$_4$, and concentrated in vacuo. The residue was purified by silica gel chromatography to afford compound 8.3 (1.2 g, 55.9% yield). MS calc'd 275 and 277 [(M+H)$^+$]; measured 275 and 277 [(M+H)$^+$].

Step 3: Preparation of tert-butyl N-[2-(3-bromo-6-methoxy-2-pyridyl)-1-methyl-ethyl]carbamate (Compound 8.4)

To a solution of 3-bromo-6-methoxy-2-(2-nitropropyl)pyridine (compound 8.3, 1.2 g, 4.3 mmol), NH$_4$Cl (2.47 g, 46.2 mmol) in methanol (40 mL) and water (3 mL) was added Zinc (1.51 g, 23.1 mmol). The resultant mixture was stirred at room temperature overnight, then filtered. The filtrated was added DIPEA (1340 µL, 7.7 mmol), di-tert-butyl pyrocarbonate (1261 mg, 5.8 mmol) and the mixture was stirred at room temperature for another 4 hrs. Then the reaction mixture was diluted with water (100 mL), extracted with EA (60 mL) for three times. The combined organic layer was washed with brine (40 mL), dried over Na$_2$SO$_4$, and concentrated in vacuo. The residue was purified by silica gel chromatography to afford compound 8.4 (1.4 g, 94% yield). MS calc'd 345 and 347 [(M+H)$^+$]; measured 345 and 347 [(M+H)$^+$].

Step 4: preparation of methyl 2-[2-(tert-butoxycarbonylamino)propyl]-6-methoxy-pyridine-3-carboxylate (Compound 8.5)

The mixture of tert-butyl N-[2-(3-bromo-6-methoxy-2-pyridyl)-1-methyl-ethyl]carbamate (compound 8.4, 1.4 g, 3.6 mmol), 1,3-bis(diphenylphosphino)propane (595 mg, 1.4 mmol), triethylamine (2.5 mL, 18.1 mmol), palladium (II) acetate (162 mg, 0.7 mmol) in methanol (34 mL) was stirred at 100° C. for 20 hrs under CO atmosphere. The reaction was diluted with water (100 mL), extracted with EA (50 mL) for three times. The combined organic layer was washed with brine (40 mL), dried over Na$_2$SO$_4$, and concentrated in vacuo. The residue was purified by silica gel chromatography to afford compound 8.5 (440 mg, 37.7% yield). MS calc'd 325 [(M+H)$^+$]; measured 325 [(M+H)$^+$].

Step 5: Preparation of tert-butyl N-[2-[3-(hydroxymethyl)-6-methoxy-2-pyridyl]-1-methyl-ethyl]carbamate (Compound 8.6)

To a solution of 2-[2-(tert-butoxycarbonylamino)propyl]-6-methoxy-pyridine-3-carboxylate (compound 8.5, 420.0 mg, 1.1 mmol) in THF (10 mL) was added lithium borohydride (94 mg, 4.3 mmol) at 0° C. The resultant mixture was stirred at room temperature overnight. The reaction was quenched by sat. NH$_4$Cl (aq, 10 mL), diluted with water (40 mL), and extracted with EA (20 mL) for three times. The combined organic layer was washed with brine (20 mL), dried over Na$_2$SO$_4$ and concentrated in vacuo. The residue was purified by silica gel chromatography to afford compound 8.6 (270 mg, 0.910 mmol). MS calc'd 297 [(M+H)$^+$]; measured 297 [(M+H)$^+$].

Step 6: Preparation of tert-butyl 2-methoxy-7-methyl-7,8-dihydro-5H-1,6-naphthyridine-6-carboxylate (Compound 8.7)

To a solution of tert-butyl N-[2-[3-(hydroxymethyl)-6-methoxy-2-pyridyl]-1-methyl-ethyl]carbamate (compound 8.6, 270.0 mg, 850 µmol), DIPEA (440 µL, 2.5 mmol) in DCM (8 mL) was added methanesulfonic anhydride (295 mg, 1.7 mmol) at 0° C. and stirred at room temperature overnight. The reaction was quenched by sat.NaHCO$_3$ (aq, 10 mL), extracted with DCM (20 mL) for three times. The combined organic layer was washed with water (30 mL) and brine (20 mL), dried over Na$_2$SO$_4$, and concentrated in vacuo. The residue was dissolved with DMF (10 mL), then tBuONa (245 mg, 2.6 mmol) and KI (70.5 mg, 425 µmol) was added. The reaction mixture was stirred at 100° C. for 20 min. After being cooled to room temperature, the reaction mixture was diluted with water (20 mL), extracted with DCM (30 mL) twice. The combined organic layer was washed with brine (10 mL), dried over Na$_2$SO$_4$, and concentrated in vacuo. The residue was purified by silica gel chromatography column to afford compound 8.7 (190 mg, 80.0% yield). MS calc'd 279 [(M+H)$^+$]; measured 279 [(M+H)$^+$]. $^1$H NMR (400 MHz, CDCl$_3$) δ ppm 7.30 (d, J=8.4 Hz, 1H), 6.60 (d, J=8.4 Hz, 1H), 4.78-4.74 (m, 1H), 4.18 (d, J=16.8 Hz, 1H), 3.93 (s, 3H), 3.16-3.11 (m, 1H), 2.64 (d, J=16.8 Hz, 1H), 1.51 (s, 9H), 1.13 (d, J=6.8 Hz, 3H).

Step 7: Preparation of tert-butyl 2-hydroxy-7-methyl-7,8-dihydro-5H-1,6-naphthyridine-6-carboxylate (Compound 8.8)

The mixture of tert-butyl 2-methoxy-7-methyl-7,8-dihydro-5H-1,6-naphthyridine-6-carboxylate (compound 8.7, 190.0 mg, 680 µmol) and hydrogen bromide (5.0 mL, 33% w/w (45% w/v) soln. in acetic acid) was stirred at 100° C. for 18 hrs. The mixture was concentrated in vacuo, re-dissolved in methanol (10 mL), basified with $K_2CO_3$ to pH about 8. Then di-tert-butyl pyrocarbonate (223 mg, 1.0 mmol) was added to the above mixture. The resultant mixture was stirred at room temperature for another 2 hrs. The reaction mixture was concentrated in vacuo. The residue was purified by prep-TLC (DCM:MeOH=10:1) to afford compound 8.8 (160 mg, 89.7% yield). MS calc'd 265 [(M+H)$^+$]; measured 265 [(M+H)$^+$].

Step 8: Preparation of tert-butyl 7-methyl-2-(trifluoromethylsulfonyloxy)-7,8-dihydro-5H-1,6-naphthyridine-6-carboxylate (Compound 8.9)

To a solution of tert-butyl 2-hydroxy-7-methyl-7,8-dihydro-5H-1,6-naphthyridine-6-carboxylate (compound 8.8, 140.0 mg, 530 µmol) and 2,6-dimethylpyridine (340 mg, 3.2 mmol) in DCM (10 mL) was added dropwise trifluoromethanesulfonic anhydride (448 mg, 1.6 mmol) at 0° C. The resultant mixture was stirred at 0° C. for 30 min. The reaction was quenched by sat. $NaHCO_3$ (aq, 20 mL), extracted with DCM (30 mL) for three times. The combined organic layer was washed with brine (20 mL), dried over $Na_2SO_4$, and concentrated in vacuo to afford compound 8.9 (200 mg, crude) which was used directly to the next step without further purification. MS calc'd 397 [(M+H)$^+$]; measured 397 [(M+H)$^+$].

Step 9: Preparation of tert-butyl 2-[[(4R,7R,8aS)-2-(8-cyano-5-quinolyl)-4-methyl-3,4,6,7,8,8a-hexahydro-1H-pyrrolo[1,2-a]pyrazin-7-yl]amino]-7-methyl-7,8-dihydro-5H-1,6-naphthyridine-6-carboxylate (Compound 8.10)

To a solution of tert-butyl 7-methyl-2-(trifluoromethylsulfonyloxy)-7,8-dihydro-5H-1,6-naphthyridine-6-carboxylate (compound 8.9, 120.0 mg, 0.3 mmol) in toluene (18 mL) was added 5-[(4R,7R,8aS)-7-amino-4-methyl-3,4,6,7,8,8a-hexahydro-1H-pyrrolo[1,2-a]pyrazin-2-yl]quinoline-8-carbonitrile (Intermediate C1, 180.0 mg, 580 µmol), BINAP (72.1 mg, 116 µmol), cesium carbonate (552 mg, 1.7 mmol) and tris(dibenzylideneacetone)dipalladium (73.0 mg, 80 µmol). The reaction mixture was stirred at 100° C. for 18 hrs. After being cooled to room temperature, the reaction mixture was diluted with water (20 mL), extracted with DCM (20 mL) for three times. The combined organic layer was washed with brine (20 mL), dried over $Na_2SO_4$, and concentrated in vacuo. The residue was purified by prep-TLC (EA) to afford compound 8.10 (50 mg, 75.0% yield). MS calc'd 554 [(M+H)$^+$]; measured 554 [(M+H)$^+$].

Step 10: Preparation of 5-[(4R,7R,8aS)-4-methyl-7-[(7-methyl-5,6,7,8-tetrahydro-1,6-naphthyridin-2-yl)amino]-3,4,6,7,8,8a-hexahydro-1H-pyrrolo[1,2-a]pyrazin-2-yl]quinoline-8-carbonitrile (Compound 8.11)

To a solution of tert-butyl 2-[[(4R,7R,8aS)-2-(8-cyano-5-quinolyl)-4-methyl-3,4,6,7,8,8a-hexahydro-1H-pyrrolo[1,2-a]pyrazin-7-yl]amino]-7-methyl-7,8-dihydro-5H-1,6-naphthyridine-6-carboxylate (compound 8.10, 50.0 mg, 90 µmol) in DCM (5.0 mL) was added HCl/dioxane (4N, 1.0 mL). The reaction mixture was stirred at room temperature for 60 min, then concentrated to afford a crude product which was purified by pre-HPLC to afford compound 8.11 (30 mg, 73.6% yield). MS calc'd 454 [(M+H)$^+$]; measured 454 [(M+H)$^+$].

Step 11: Preparation of 5-[(4R,7R,8aS)-4-methyl-7-[[(7S)-7-methyl-5,6,7,8-tetrahydro-1,6-naphthyridin-2-yl]amino]-3,4,6,7,8,8a-hexahydro-1H-pyrrolo[1,2-a]pyrazin-2-yl]quino line-8-carbonitrile and 5-[(4R,7R,8aS)-4-methyl-7-[[(7R)-7-methyl-5,6,7,8-tetrahydro-1,6-naphthyridin-2-yl]amino]-3,4,6,7,8,8a-hexahydro-1H-pyrrolo[1,2-a]pyrazin-2-yl]quinoline-8-carbonitrile (Example 8A and 8B)

Compound 8.11 (30 mg) was resolved by SFC to give two single isomers: Example 8A (faster eluting, 15.2 mg). MS: calc'd 454 (M+H)$^+$, measured 454 (M+H)*; and Example 8B (slower eluting, 11.2 mg) MS: calc'd 454 (M+H)$^+$, measured 454 (M+H)*, with 30% Methanol (0.1% $NH_3H_2O)/CO_2$ on DAICEL CHIRALPAK AD (10 µm, 250×30 mm) column. Example 8A $^1$H NMR (400 MHz, CDCl$_3$) δ=9.06 (d, J=5 Hz, 1H), 8.46 (d, J=6.8 Hz, 1H), 8.02 (d, J=8 Hz, 1H), 7.51-7.49 (m, 1H), 7.15 (d, J=8.4 Hz, 1H), 7.08 (d, J=8 Hz, 1H), 6.23 (d, J=8.4 Hz, 1H), 4.57 (d, J=6.8 Hz, 1H), 4.35-4.25 (m, 1H), 3.96-3.87 (m, 3H), 3.52-3.50 (m, 1H), 3.38-3.35 (m, 1H), 3.15-3.08 (m, 1H), 2.80-2.71 (m, 5H), 2.55-2.43 (m, 1H), 2.09-2.02 (m, 1H), 2.01-1.90 (m, 2H), 1.85-1.75 (m, 1H), 1.26 (d, J=6.4 Hz, 3H), 1.17 (d, J=5.6 Hz, 3H). Example 8B $^1$H NMR (400 MHz, CDCl$_3$) δ=9.06 (d, J=5 Hz, 1H), 8.46 (d, J=6.8 Hz, 1H), 8.02 (d, J=8 Hz, 1H), 7.51-7.48 (m, 1H), 7.15 (d, J=8.4 Hz, 1H), 7.08 (d, J=8 Hz, 1H), 6.23 (d, J=8.4 Hz, 1H), 4.57 (d, J=7.2 Hz, 1H), 4.35-4.25 (m, 1H), 3.96-3.87 (m, 3H), 3.51 (d, J=10.4 Hz, 1H), 3.38-3.35 (m, 1H), 3.15-3.08 (m, 1H), 2.80-2.71 (m, 5H), 2.55-2.43 (m, 1H), 2.09-1.99 (m, 2H), 1.26 (d, J=6.4 Hz, 3H), 1.17 (d, J=5.6 Hz, 3H).

Example 9A and 9B

5-[(4R,7R,8aS)-4-methyl-7-[[(5S)-5-methyl-5,6,7,8-tetrahydro-2,6-naphthyridin-3-yl]amino]-3,4,6,7,8,8a-hexahydro-1H-pyrrolo[1,2-a]pyrazin-2-yl]quinoline-8-carbonitrile and 5-[(4R,7R,8aS)-4-methyl-7-[[(5R)-5-methyl-5,6,7,8-tetrahydro-2,6-naphthyridin-3-yl]amino]-3,4,6,7,8,8a-hexahydro-1H-pyrrolo[1,2-a]pyrazin-2-yl]quinoline-8-carbonitrile

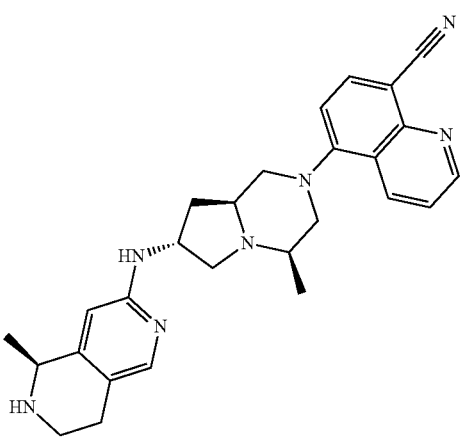

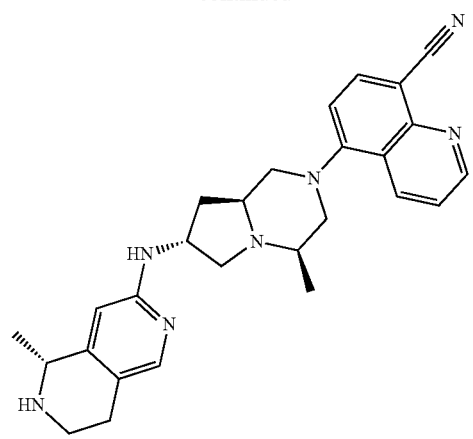
The title compound was prepared according to the following scheme:
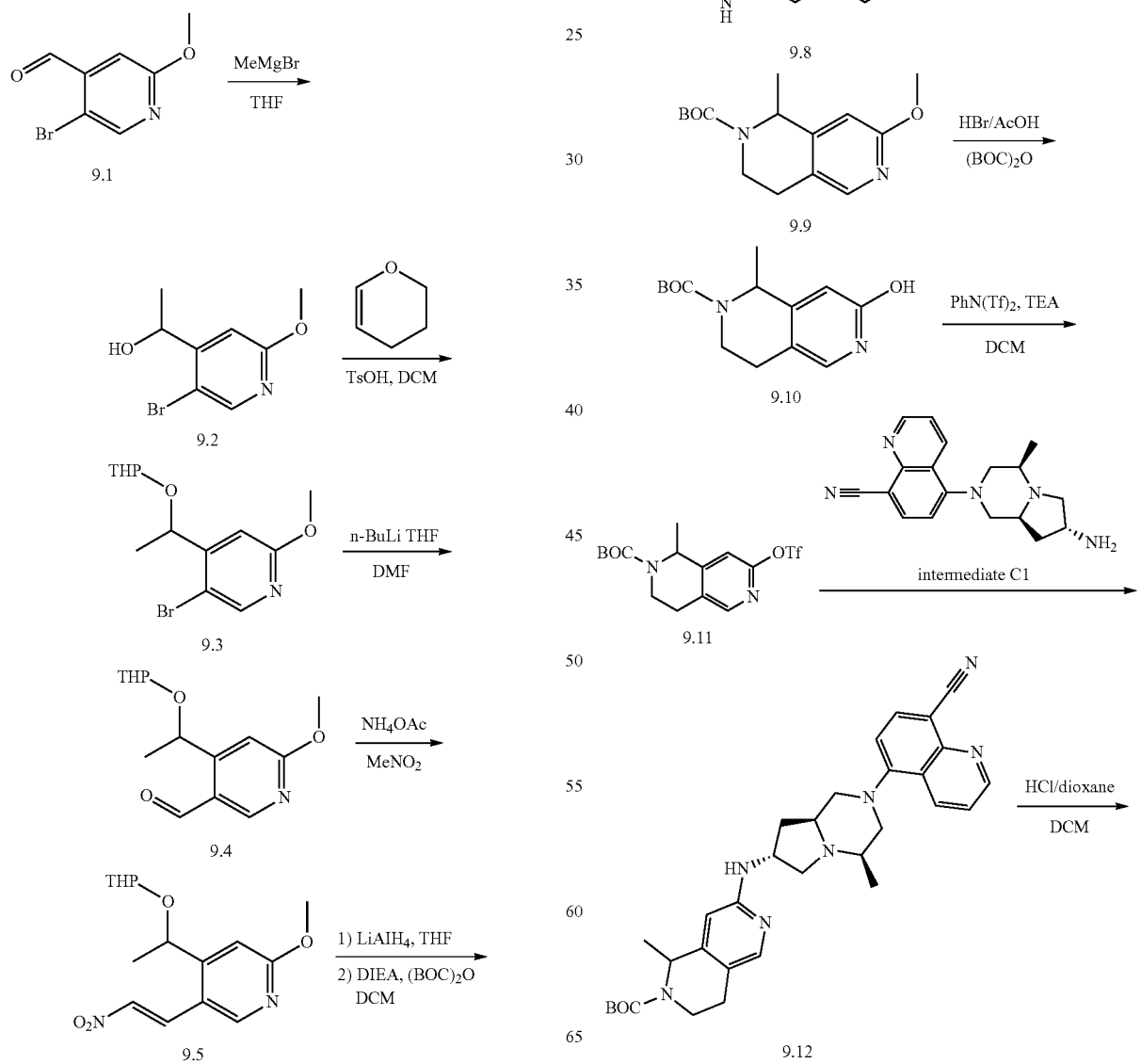

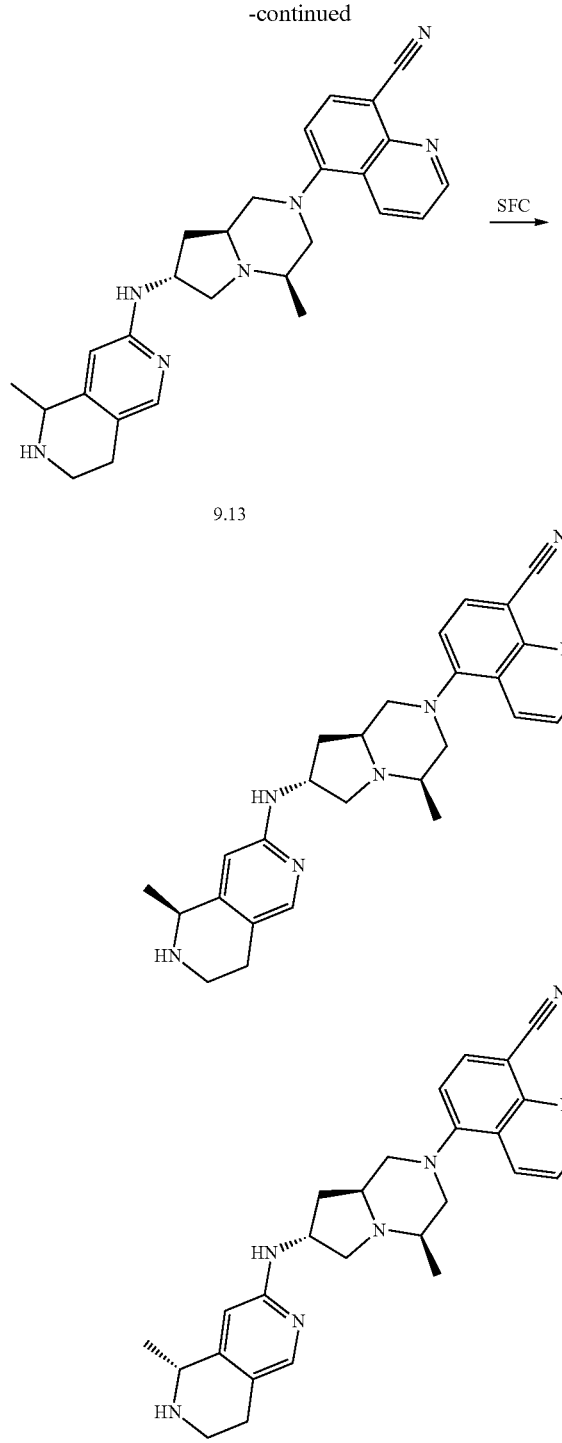

9.13

Step 1: Preparation of
1-(5-bromo-2-methoxy-4-pyridyl)ethanol
(Compound 9.2)

To a solution of 5-bromo-2-methoxy-pyridine-4-carbaldehyde (compound 9.1, 25.0 g, 115.7 mmol) in THF (250 mL) was added dropwise methylmagnesium bromide (3 M in 2-methyltetrahydrofuran, 50.1 mL, 150.4 mmol) at −78° C. over 30 min. The resultant mixture was stirred at −78° C. for 30 min. Then the mixture was warmed to room temperature, quenched with saturated $NH_4Cl$ (aq, 100 mL), extracted with EtOAc (150 mL) for three times. The combined organic layer was washed with brine (100 mL), dried over $Na_2SO_4$, and concentrated in vacuo to afford compound 9.2 (27 g, crude). MS calc'd 232 and 234 [(M+H)$^+$]; measured 232 and 234 [(M+H)$^+$].

Step 2: Preparation of 5-bromo-2-methoxy-4-(1-tetrahydropyran-2-yloxyethyl)pyridine (Compound 9.3)

To a solution of 1-(5-bromo-2-methoxy-4-pyridyl)ethanol (compound 9.2, crude) and dihydropyran (12.3 mL, 134.3 mmol) in DCM (300 mL) was added p-TsOH (1.8 g, 10.4 mmol). The resultant mixture was stirred at room temperature overnight. The reaction was quenched with saturated $NaHCO_3$ (aq, 200 mL), extracted with DCM (150 mL) for three times. The combined organic layer was washed with brine (100 mL), dried over $Na_2SO_4$, and concentrated in vacuo. The residue was purified by chromatography column to afford compound 9.3 (30 g, two-steps 83.57% yield). MS calc'd 316 and 318 [(M+H)$^+$]; measured 316 and 318 [(M+H)$^+$].

Step 3: Preparation of 6-methoxy-4-(1-tetrahydropyran-2-yloxyethyl)pyridine-3-carbaldehyde (Compound 9.4)

To a solution of 5-bromo-2-methoxy-4-(1-tetrahydropyran-2-yloxyethyl)pyridine (compound 9.3, 30.0 g, 86.3 mmol) in THF (300 mL) was added dropwise n-butyllithium solution (2.5 M in hexane, 51.8 mL, 129.5 mmol) over 30 min, and stirred for 0.5 h at −60° C. Then dimethylformamide (20.1 mL, 259.0 mmol) was added to the above mixture, and stirred at −60° C. for another 1 h. The reaction mixture was warmed to room temperature, and quenched with saturated $NH_4Cl$ (aq, 50 mL), diluted with water (500 mL), extracted with EtOAc (200 mL) for three times. The combined organic layer was washed with brine (200 mL), dried over $Na_2SO_4$, and concentrated in vacuo. The residue was purified by silica gel chromatography column to afford compound 9.4 (16 g, 69.3% yield). MS calc'd 266 [(M+H)$^+$]; measured 266 [(M+H)$^+$].

Step 4: Preparation of 2-methoxy-5-[(E)-2-nitrovinyl]-4-(1-tetrahydropyran-2-yloxyethyl)pyridine (Compound 9.5)

The mixture of 6-methoxy-4-(1-tetrahydropyran-2-yloxyethyl)pyridine-3-carbaldehyde (compound 9.4, 15.5 mg, 58.4 mmol), $NH_4OAc$ (2249.3 mg, 29.2 mmol) in nitromethane (300.0 mL) was stirred at 70° C. for 12 hrs. The reaction mixture was concentrated in vacuo. The residue was purified by silica gel chromatography column to afford compound 9.5 (10.0 g, 48.1% yield) MS calc'd 309 [(M+H)$^+$]; measured 309 [(M+H)$^+$].

Step 5: Preparation of tert-butyl N-[2-[6-methoxy-4-(1-tetrahydropyran-2-yloxyethyl)-3-pyridyl]ethyl] carbamate (Compound 9.6)

To a solution of 2-methoxy-5-[(E)-2-nitrovinyl]-4-(1-tetrahydropyran-2-yloxyethyl)pyridine (compound 9.5, 9.0 g, 24.99 mmol) in THF (225 mL) was added lithium aluminum hydride (2845.0 mg, 75.0 mmol) at 0° C. The resultant mixture was at room temperature stirred for 2 hr. Then 1 N $K_2CO_3$(aq, 20 mL) was added to the above mixture at 0° C., stirred for 10 min. The mixture was filtered through celite DCM/MeOH (20/1, 300 mL) and the filtrate was concentrated. The residue was dissolved in DCM (200 mL), then DIPEA (13.1 mL, 75.0 mmol) and di-tert-butyldicarbonate (10.9 g, 50.0 mmol) was added. The reaction mixture was stirred at room temperature for another 2 hrs, then diluted with water (300 mL), extracted with DCM (100 mL) twice. The combined organic layer was washed with brine (100 mL), dried over $Na_2SO_4$, and concentrated in vacuo. The residue was purified by chromatography column to afford compound 9.6 (4.0 g, 42.1% yield). MS calc'd 381 [(M+H)$^+$]; measured 381 [(M+H)$^+$].

Step 6: Preparation of tert-butyl N-[2-[4-(1-hydroxyethyl)-6-methoxy-3-pyridyl]ethyl]carbamate (Compound 9.7)

To a solution of tert-butyl N-[2-[6-methoxy-4-(1-tetrahydropyran-2-yloxyethyl)-3-pyridyl]ethyl]carbamate (compound 9.6, 4.5 g, 10.1 mmol) in methanol (80 mL) was added p-TsOH (2.874 g, 15.1 mmol). The resultant mixture was stirred at room temperature for 2 hrs. The mixture was quenched with sat.NaHCO$_3$ (aq, 80 mL), extracted with EtOAc (100 mL) twice. The organic layer was washed with brine (60 mL), dried over $Na_2SO_4$, and concentrated in vacuo to afford compound 9.7 (3500 mg, crude). MS calc'd 297 [(M+H)$^+$]; measured 297 [(M+H)$^+$].

Step 7: Preparation of 1-[5-[2-(tert-butoxycarbonylamino)ethyl]-2-methoxy-4-pyridyl]ethyl methanesulfonate (Compound 9.8)

To a solution of tert-butyl N-[2-[4-(1-hydroxyethyl)-6-methoxy-3-pyridyl]ethyl]carbamate (compound 9.7, 3.5 g, 10.4 mmol) and DIPEA (5.4 mL, 31.2 mmol) in DCM (70 mL) was added methanesulfonic anhydride (3.6 g, 20.8 mmol) at 0° C. The resultant mixture was stirred at room temperature for 2 hrs. The reaction was quenched with saturated NaHCO$_3$(aq), extracted with DCM (80 mL) for three times. The combined organic layer was washed with brine (80 mL), dried over $Na_2SO_4$, and concentrated in vacuo to afford compound 9.8 (4.3 g, crude). MS calc'd 375 [(M+H)$^+$]; measured 375 [(M+H)$^+$].

Step 8: Preparation of tert-butyl 7-methoxy-1-methyl-3,4-dihydro-1H-2,6-naphthyridine-2-carboxylate (Compound 9.9)

To a solution of 1-[5-[2-(tert-butoxycarbonylamino)ethyl]-2-methoxy-4-pyridyl]ethyl methanesulfonate (compound 9.8, 4.3 g, crude), tBuONa (2781.1 mg, 28.9 mmol), KI (0.26 mL, 4.82 mmol) in DMF (60 mL) was stirred at 100° C. for 20 min. After being cooled to room temperature, the reaction mixture was diluted with water (200 mL), extracted with EtOAc (80 mL) for three times. The combined organic layer was washed with brine (40 mL), dried over $Na_2SO_4$, and concentrated in vacuo. The residue was purified by chromatography column to afford compound 9.9 (2.4 g, three-steps 85.4% yield). MS calc'd 279 [(M+H)$^+$]; measured 279 [(M+H)$^+$].

Step 9: Preparation of tert-butyl 7-hydroxy-1-methyl-3,4-dihydro-1H-2,6-naphthyridine-2-carboxylate (Compound 9.10)

The mixture of tert-butyl 7-methoxy-1-methyl-3,4-dihydro-1H-2,6-naphthyridine-2-carboxylate (compound 9.9, 2.4 g, 8.6 mmol) in hydrogen bromide (20.0 mL, 33% w/w (45% w/v) solution in acetic acid) was stirred at 100° C. for 18 hrs. The reaction mixture was concentrated in vacuo, re-dissolved in methanol (30 mL), basified with $K_2CO_3$ to pH about 8. Di-tert-butyldicarbonate (2.8 g, 12.9 mmol) was added to the above mixture, and stirred at room temperature for another 2 hrs. The reaction mixture was concentrated in vacuo. The residue was purified by chromatography column to afford compound 9.10 (1.7 g, 74.6% yield). MS calc'd 265 [(M+H)$^+$]; measured 265 [(M+H)$^+$].

Step 10: Preparation of tert-butyl 1-methyl-7-(trifluoromethylsulfonyloxy)-3,4-dihydro-1H-2,6-naphthyridine-2-carboxylate (Compound 9.11)

To a solution of tert-butyl 7-hydroxy-1-methyl-3,4-dihydro-1H-2,6-naphthyridine-2-carboxylate (compound 9.10, 250 mg, 950 µ) in DCM (3 mL) was added triethylamine (192 mg, 1.9 mmol) and N,N-bis(trifluoromethylsulfonyl)aniline (676 mg, 1.9 mmol) at 0° C. The resultant mixture was stirred at this temperature for 3 hrs. The reaction was quenched by sat. NaHCO$_3$ (aq, 20 mL), extracted with DCM (30 mL) for three times. The combined organic layer was washed with brine (20 mL), dried over $Na_2SO_4$, and concentrated in vacuo. The residue was purified by Prep-TLC (PE:EA=5:1) to afford compound 9.11 (200 mg, 53.3% yield). MS calc'd 397 [(M+H)$^+$]; measured 397 [(M+H)$^+$].

Step 11: Preparation of tert-butyl 7-[[(4R,7R,8aS)-2-(8-cyano-5-quinolyl)-4-methyl-3,4,6,7,8,8a-hexahydro-1H-pyrrolo[1,2-a]pyrazin-7-yl]amino]-1-methyl-3,4-dihydro-1H-2,6-naphthyridine-2-carboxylate (Compound 9.12)

To a solution of 5-[(4R,7R,8aS)-7-amino-4-methyl-3,4,6,7,8,8a-hexahydro-1H-pyrrolo[1,2-a]pyrazin-2-yl]quinoline-8-carbonitrile (Intermediate C1, 200 mg, 0.65 mmol) in dioxane (15 mL) was added tert-butyl 1-methyl-7-(trifluoromethylsulfonyloxy)-3,4-dihydro-1H-2,6-naphthyridine-2-carboxylate (compound 9.11, 258 mg, 0.65 mmol), BrettPhos Pd G3 (177 mg, 0.2 mmol) and cesium carbonate (424 mg, 1.3 mmol). The resultant mixture was stirred at 100° C. for 16 hrs. After being cooled to room temperature, the reaction mixture was diluted with water (20 mL), extracted with DCM (20 mL) for three times. The combined organic layer was washed with brine (20 mL), dried over $Na_2SO_4$, and concentrated in vacuo. The residue was purified by prep-TLC (PE:EA=1:3) to afford compound 9.12 (90 mg, 20.2% yield). MS calc'd 554 [(M+H)$^+$]; measured 554 [(M+H)$^+$].

Step 12: Preparation of 5-[(4R,7R,8aS)-4-methyl-7-[(5-methyl-5,6,7,8-tetrahydro-2,6-naphthyridin-3-yl)amino]-3,4,6,7,8,8a-hexahydro-1H-pyrrolo[1,2-a]pyrazin-2-yl]quinoline-8-carbonitrile (Compound 9.13)

To a solution of tert-butyl 7-[[(4R,7R,8aS)-2-(8-cyano-5-quinolyl)-4-methyl-3,4,6,7,8,8a-hexahydro-1H-pyrrolo[1,2-a]pyrazin-7-yl]amino]-1-methyl-3,4-dihydro-1H-2,6-naphthyridine-2-carboxylate (compound 9.12, 90 mg, 160 µmol) in DCM (5.0 mL) was added HC/dioxane (4N, 1.5 mL). The reaction mixture was stirred at room temperature for 60 min, then concentrated to afford a crude product which was purified by pre-HPLC to afford compound 9.13 (52 mg, 68.2% yield). MS calc'd 454 [(M+H)+]; measured 454 [(M+H)+].

Step 13: Preparation of 5-[(4R,7R,8aS)-4-methyl-7-[[(5S)-5-methyl-5,6,7,8-tetrahydro-2,6-naphthyridin-3-yl]amino]-3,4,6,7,8,8a-hexahydro-1H-pyrrolo[1,2-a]pyrazin-2-yl]quinoline-8-carbonitrile and 5-[(4R,7R,8aS)-4-methyl-7-[[(5R)-5-methyl-5,6,7,8-tetrahydro-2,6-naphthyridin-3-yl]amino]-3,4,6,7,8,8a-hexahydro-1H-pyrrolo[1,2-a]pyrazin-2-yl]quinoline-8-carbonitrile (Example 9A and 9B)

Compound 9.13 (52 mg) was resolved by SFC to give two single isomers: Example 9A (faster eluting, 6 mg). MS: calc'd 454 (M+H)+, measured 454 (M+H)*; and Example 9B (slower eluting, 8.7 mg) MS: calc'd 454 (M+H)+, measured 454 (M+H)*, with 30% IPA (0.1% $NH_3H_2O$)/$CO_2$ on DAICEL CHIRALPAK AD (10 μm, 250×30 mm) column. Example 9A $^1$H NMR (400 MHz, DMSO-$d_6$) δ ppm 9.91-10.17 (m, 1H), 9.47-9.74 (m, 1H), 9.08 (d, J=4.0 Hz, 1H), 8.58 (d, J=8.8 Hz, 1H), 8.29 (d, J=8.0 Hz, 1H), 7.98 (s, 1H), 7.71 (dd, J=8.8, 4.0 Hz, 1H), 7.38 (d, J=7.8 Hz, 1H), 6.83-6.92 (m, 1H), 4.54-4.67 (m, 2H), 4.19-4.26 (m, 1H), 3.97-4.07 (m, 2H), 3.85-3.92 (m, 2H), 3.49-3.53 (m, 1H), 3.40-3.48 (m, 2H), 3.32 (s, 1H), 3.24-3.30 (m, 2H), 2.90-3.03 (m, 2H), 2.13-2.23 (m, 1H), 1.61 (d, J=6.8 Hz, 3H), 1.38 (d, J=6.4 Hz, 3H). Example 9B $^1$H NMR (400 MHz, DMSO-$d_6$) δ ppm 9.96-10.08 (m, 1H), 9.53-9.71 (m, 1H), 9.05-9.11 (m, 1H), 8.58 (d, J=8.0 Hz, 1H), 8.26-8.32 (m, 1H), 7.98 (s, 1H), 7.71 (dd, J=8.4, 4.0 Hz, 1H), 7.35-7.41 (m, 1H), 6.82-6.96 (m, 1H), 4.56-4.70 (m, 2H), 4.22-4.26 (m, 1H), 3.96-4.07 (m, 2H), 3.85-3.88 (m, 2H), 3.49-3.53 (m, 1H), 3.39-3.47 (m, 2H), 3.31-3.36 (m, 1H), 3.24-3.30 (m, 2H), 2.89-3.02 (m, 2H), 2.11-2.21 (m, 1H), 1.60 (d, J=6.8 Hz, 3H), 1.39 (d, J=6.4 Hz, 3H).

Example 10

5-[(4R,7S,8aS)-4-methyl-7-(6-piperazin-1-yl-3,4-dihydro-1H-isoquinolin-2-yl)-3,4,6,7,8,8a-hexahydro-1H-pyrrolo[1,2-a]pyrazin-2-yl]quinoline-8-carbonitrile The titled compound was synthesized according to the following scheme:

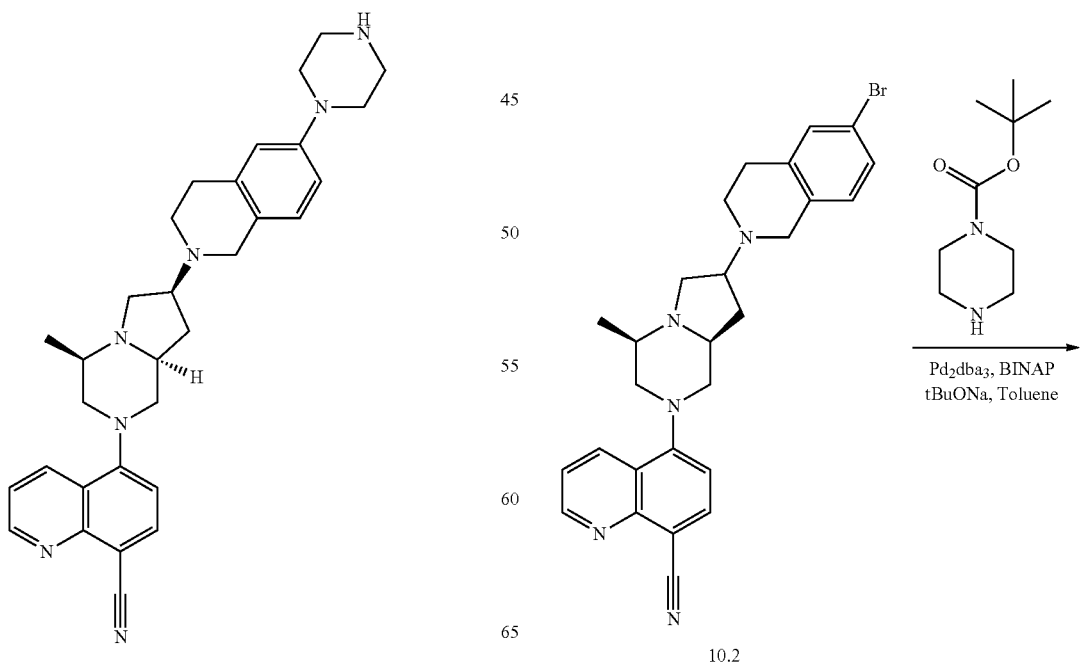

-continued

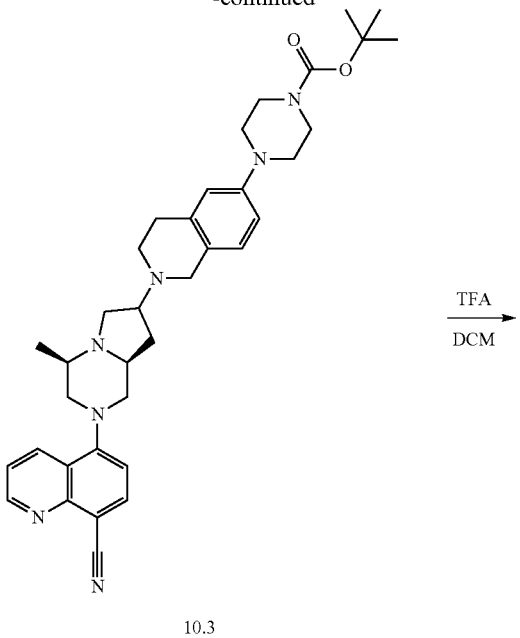

10.3

TFA
DCM
→

-continued

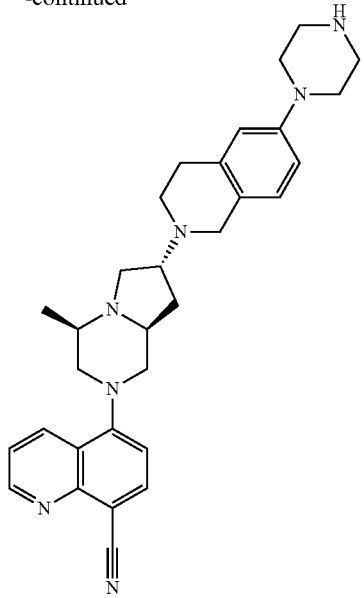

10.4

Step 1: 5-[(4R,8aS)-7-(6-bromo-3,4-dihydro-1H-isoquinolin-2-yl)-4-methyl-3,4,6,7,8,8a-hexahydro-1H-pyrrolo[1,2-a]pyrazin-2-yl]quinoline-8-carbonitrile (Compound 10.2)

A sealed tube was charged with (4R,8aS)-2-(8-cyano-5-quinolyl)-4-methyl-3,4,6,7,8,8a-hexahydro-1H-pyrrolo[1,2-a]pyrazin-7-yl]methanesulfonate (Intermediate D, 80 mg, 207 μmol), 6-bromo-1,2,3,4-tetrahydroisoquinoline (compound 10.1, CAS: 226942-29-6, BePharm, Catalog: BD26419, 175.6 mg, 828 μmol), KI (34.4 mg, 207 μmol) and K₂CO₃ (85.7 mg, 621 μmol) and MeCN (5 mL). The resultant mixture was stirred at 110° C. overnight. After being cooled to room temperature, the reaction mixture was diluted with water (10 mL) and extracted with EA (10 mL) for three times. The combined organic layer was washed with brine (20 mL), dried over Na₂SO₄, and concentrated in vacuo. The residue was purified by flash chromatography (silica gel, 24 g, 0% to 100% EtOAc in PE) to afford compound 10.2 (52 mg, 50% yield). MS: calc'd 502 [(M+H)⁺], measured 502 [(M+H)⁺]. The residue was purified by reversed phase chromatography (ODS-C18, 0% to 100% ACN in Water (contained 0.5% NH₃H₂O)) to afford to give Intermediate B (faster eluting, 13.4 g, 52.1% yield) and compound B6 (slower eluting, 4.2 g, 16.4% yield).

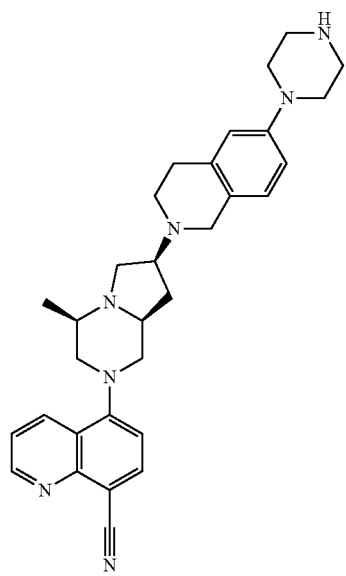 [SMILES: C[C@@H]1CN(c2ccc(C#N)c3ncccc23)C[C@@H]2C[C@H](N3CCc4cc(N5CCNCC5)ccc4C3)CN21]

Example 10

Step 2: Preparation of tert-butyl 4-[2-[(4R,8aS)-2-(8-cyano-5-quinolyl)-4-methyl-3,4,6,7,8,8a-hexahydro-1H-pyrrolo[1,2-a]pyrazin-7-yl]-3,4-dihydro-1H-isoquinolin-6-yl]piperazine-1-carboxylate (Compound 10.3)

To a solution of 5-[(4R,8aS)-7-(6-bromo-3,4-dihydro-1H-isoquinolin-2-yl)-4-methyl-3,4,6,7,8,8a-hexahydro-1H-pyrrolo[1,2-a]pyrazin-2-yl]quinoline-8-carbonitrile (compound 10.2, 52 mg, 103.5 μmol) and tert-butyl piperazine-1-carboxylate in Toluene (4 mL) was added Pd₂(dba)₃ (4.7 mg, 5.2 μmol), BINAP (6.5 mg, 10.4 μmol) and NaOtBu (24.9 mg, 258.8 μmol). The reaction mixture was stirred at 100° C. overnight. After the reaction mixture being cooled to room temperature, diluted with water (10 mL) and extracted with EA (10 mL) for three times. The combined organic layer was washed with brine (20 mL), dried over Na₂SO₄, and concentrated in vacuo. The residue was purified by flash chromatography (silica gel, 24 g, 0% to 100% EtOAc in PE) to afford compound 10.3 (27 mg, 43% yield).

Step 3: Preparation of 5-[(4R,7S,8aS)-4-methyl-7-(6-piperazin-1-yl-3,4-dihydro-1H-isoquinolin-2-yl)-3,4,6,7,8,8a-hexahydro-1H-pyrrolo[1,2-a]pyrazin-2-yl]quinoline-8-carbonitrile (Example 10)

To a solution of tert-butyl 4-[2-[(4R,8aS)-2-(8-cyano-5-quinolyl)-4-methyl-3,4,6,7,8,8a-hexahydro-1H-pyrrolo[1,2-a]pyrazin-7-yl]-3,4-dihydro-1H-isoquinolin-6-yl]piperazine-1-carboxylate (compound 10.3, 27 mg, 44.4 μmol) in DCM (3 mL) was added TFA (1 mL). The reaction mixture was stirred at room temperature for 30 min, then concentrated to afford a crude product which was purified by pre-HPLC to afford example 10 (13.7 mg, 61%) and compound 10.4 (2.3 mg, 10%). The stereochemistry was confirmed by NOESY.

Example 10 MS: calc'd 508 [(M+H)⁺], measured 508 [(M+H)⁺]. ¹H NMR (METHANOL-d₄, 400 MHz) δ 9.0-9.1 (m, 1H), 8.64 (dd, 1H, J=1.5, 8.7 Hz), 8.1-8.3 (m, 1H), 7.67 (ddd, 1H, J=1.2, 4.3, 8.5 Hz), 7.34 (dd, 1H, J=4.1, 7.9 Hz), 7.20 (d, 1H, J=8.7 Hz), 7.02 (dd, 1H, J=2.5, 8.6 Hz), 6.94 (d, 1H, J=2.2 Hz), 4.4-4.6 (m, 2H), 3.9-4.3 (m, 2H), 3.7-3.8 (m, 2H), 3.5-3.6 (m, 2H), 3.4-3.5 (m, 9H), 3.2-3.3 (m, 2H), 2.8-3.1 (m, 3H), 2.4-2.6 (m, 1H), 2.1-2.3 (m, 1H), 1.3-1.4 (m, 3H).

Compound 10.3 MS: calc'd 508 [(M+H)⁺], measured 508 [(M+H)⁺]. ¹H NMR (METHANOL-d₄, 400 MHz) δ 8.9-9.1 (m, 1H), 8.64 (dd, 1H, J=1.5, 8.7 Hz), 8.1-8.3 (m, 1H), 7.67 (ddd, 1H, J=1.2, 4.3, 8.5 Hz), 7.34 (dd, 1H, J=4.1, 7.9 Hz), 7.20 (d, 1H, J=8.7 Hz), 7.02 (dd, 1H, J=2.5, 8.6 Hz), 6.94 (d, 1H, J=2.2 Hz), 4.3-4.6 (m, 2H), 4.0-4.2 (m, 2H), 3.5-3.8 (m, 5H), 3.4-3.5 (m, 9H), 2.8-3.2 (m, 4H), 2.4-2.6 (m, 1H), 2.2-2.3 (m, 1H), 1.3-1.4 (m, 3H).

Example 11

5-[(4R,7S,8aS)-7-[2-[(3R,4R)-3-amino-4-methoxy-pyrrolidin-1-yl]-7,8-dihydro-5H-1,6-naphthyridin-6-yl]-4-methyl-3,4,6,7,8,8a-hexahydro-1H-pyrrolo[1,2-a]pyrazin-2-yl]quinoline-8-carbonitrile

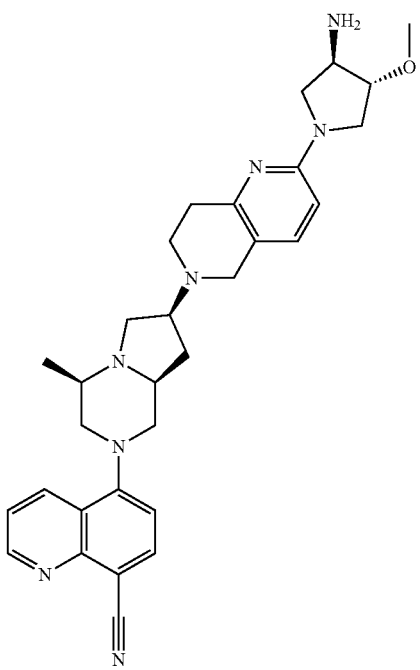 [SMILES: CO[C@@H]1CN(c2ccc3c(n2)CCN([C@H]2C[C@H]4CN(c5ccc(C#N)c6ncccc56)C[C@@H](C)N4C2)C3)C[C@H]1N]

The title compound was prepared in analogy to the preparation of Example 10 by using 2-chloro-5,6,7,8-tetrahydro-1,6-naphthyridine (CAS: 210539-05-2, BePharm, Catalog: BD55087) instead of 6-bromo-1,2,3,4-tetrahydroisoquinoline in step 1 and tert-butyl N-[(3R,4R)-4-methoxypyrrolidin-3-yl]carbamate (CAS: 1932066-52-8, PharmaBlock, Catalog: PBZ4728) instead of tert-butyl piperazine-1-carboxylate in step 2. Example 11 was obtained. MS: calc'd 539 [(M+H)⁺], measured 539 [(M+H)⁺]. ¹H NMR (METHANOL-d₄, 400 MHz) δ 8.94 (dd, 1H, J=1.4, 4.2 Hz), 8.61 (br d, 1H, J=8.9 Hz), 8.13 (d, 1H, J=7.9 Hz), 7.7-7.8 (m, 1H), 7.6-7.7 (m, 1H), 7.35 (d, 1H, J=8.1 Hz), 6.96 (br t, 1H, J=7.8 Hz), 4.1-4.4 (m, 5H), 3.9-4.1 (m, 4H), 3.5-3.9 (m, 10H), 3.41 (s, 3H), 3.2-3.3 (m, 2H), 2.7-2.9 (m, 1H), 2.2-2.4 (m, 1H), 1.44 (br d, 3H, J=6.4 Hz).

Example 12

5-[(4R,7S,8aS)-7-[7-[(3R,4R)-3-amino-4-methoxypyrrolidin-1-yl]-3,4-dihydro-1H-2,6-naphthyridin-2-yl]-4-methyl-3,4,6,7,8,8a-hexahydro-1H-pyrrolo[1,2-a]pyrazin-2-yl]quinoline-8-carbonitrile

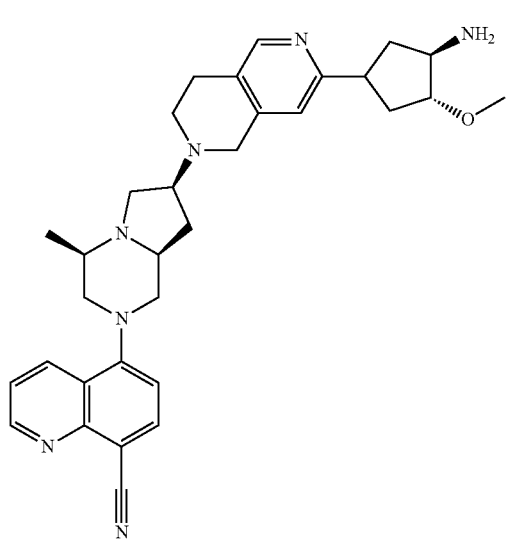 [SMILES: CO[C@@H]1CC(c2cc3c(cn2)CCN([C@H]2C[C@H]4CN(c5ccc(C#N)c6ncccc56)C[C@@H](C)N4C2)C3)C[C@H]1N]

The title compound was prepared in analogy to the preparation of Example 10 by using 7-chloro-1,2,3,4-tetrahydro-2,6-naphthyridine (CAS: 1060816-44-5, BePharm, Catalog: BD222578) instead of 6-bromo-1,2,3,4-tetrahydroisoquinoline in step 1 and tert-butyl N-[(3R,4R)-4-methoxypyrrolidin-3-yl]carbamate (CAS: 1932066-52-8, PharmaBlock, Catalog: PBZ4728) instead of tert-butyl piperazine-1-carboxylate in step 2. Example 12 was obtained. MS: calc'd 539 [(M+H)$^+$], measured 539 [(M+H)$^+$]. $^1$H NMR (METHANOL-d$_4$, 400 MHz) δ 9.07 (d, 1H, J=3.3 Hz), 8.78 (br d, 1H, J=6.1 Hz), 8.26 (br d, 1H, J=7.8 Hz), 8.0-8.2 (m, 1H), 7.78 (br s, 1H), 7.49 (br d, 1H, J=7.8 Hz), 7.21 (br s, 1H), 4.5-4.8 (m, 4H), 4.3-4.4 (m, 1H), 3.7-4.2 (m, 16H), 3.62 (s, 1H), 3.53 (m, 4H), 2.9-3.1 (m, 1H), 2.5-2.6 (m, 1H), 1.59 (br s, 3H).

Example 13

5-[(4R,7R,8aS)-4-methyl-7-[4-(5,6,7,8-tetrahydro-2,6-naphthyridin-3-yl)piperazin-1-yl]-3,4,6,7,8,8a-hexahydro-1H-pyrrolo[1,2-a]pyrazin-2-yl]quinoline-8-carbonitrile

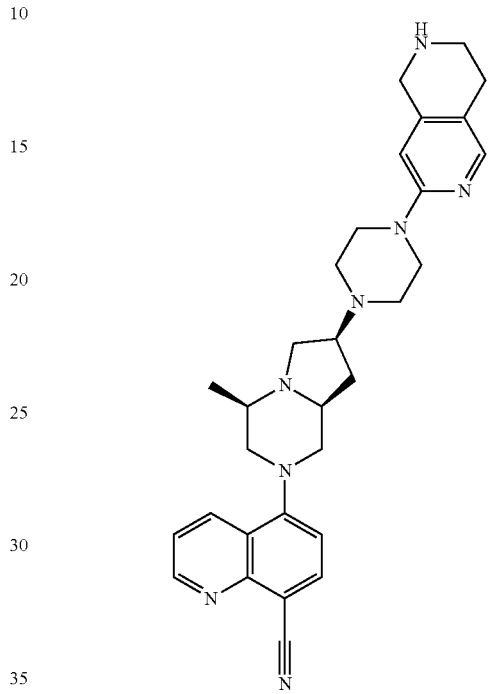

The title compound was prepared in analogy to the preparation of Example 10 by using piperazine instead of 6-bromo-1,2,3,4-tetrahydroisoquinoline in step 1 and tert-butyl 7-chloro-3,4-dihydro-1H-2,6-naphthyridine-2-carboxylate (CAS: 1060816-50-3, BePharm, Catalog: BD748515) instead of tert-butyl piperazine-1-carboxylate in step 2. Example 14 was obtained. MS: calc'd 509 [(M+H)$^+$], measured 509 [(M+H)$^+$]. $^1$H NMR (METHANOL-d$_4$, 400 MHz) δ 9.14 (dd, 1H, J=1.3, 4.7 Hz), 8.99 (br d, 1H, J=8.7 Hz), 8.36 (d, 1H, J=7.9 Hz), 8.14 (s, 1H), 7.8-8.0 (m, 1H), 7.4-7.6 (m, 2H), 4.5-4.7 (m, 4H), 3.6-4.3 (m, 16H), 3.40 (dd, 1H, J=11.0, 13.7 Hz), 3.17 (t, 2H, J=6.2 Hz), 2.98 (ddd, 1H, J=5.8, 7.9, 13.8 Hz), 2.5-2.6 (m, 1H), 1.59 (d, 3H, J=6.5 Hz).

Example 14

5-[(4R,8aS)-4-methyl-7-(5,6,7,8-tetrahydro-1,6-naphthyridin-2-yloxy)-3,4,6,7,8,8a-hexahydro-1H-pyrrolo[1,2-a]pyrazin-2-yl]quinoline-8-carbonitrile

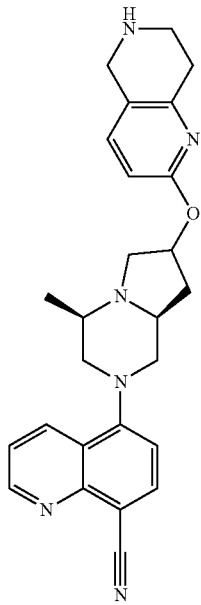

The titled compound was synthesized according to the following scheme:

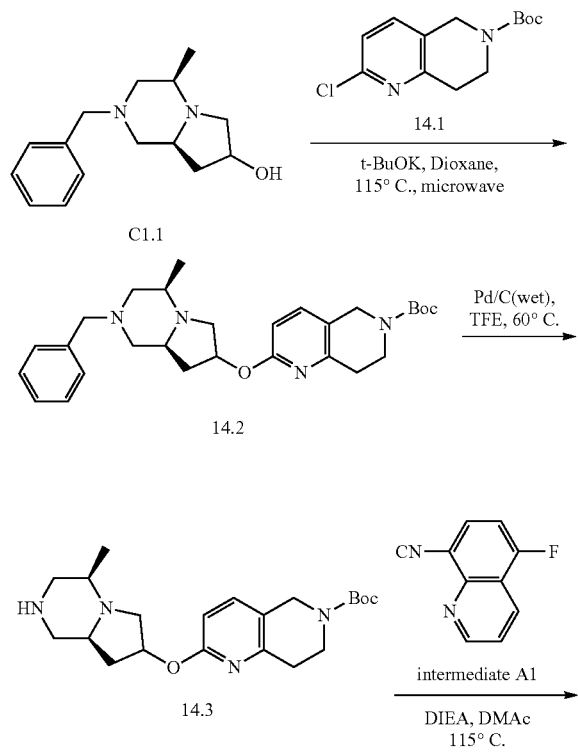

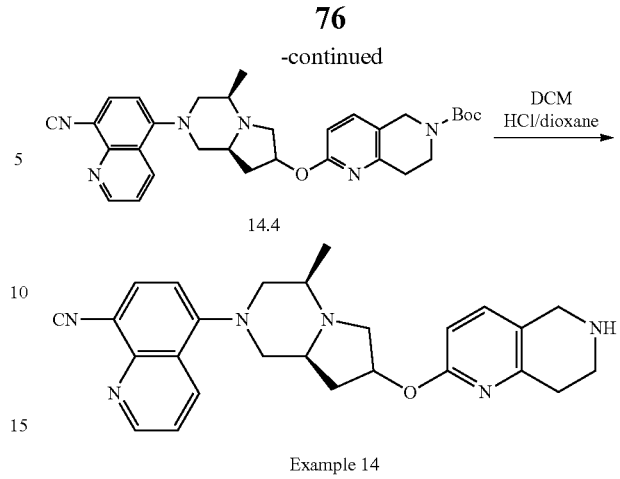

Step 1: Preparation of tert-butyl 2-[[(4R,8aS)-2-benzyl-4-methyl-3,4,6,7,8,8a-hexahydro-1H-pyrrolo[1,2-a]pyrazin-7-yl]oxy]-7,8-dihydro-5H-1,6-naphthyridine-6-carboxylate (Compound 14.2)

The mixture of (4R,8aS)-2-benzyl-4-methyl-3,4,6,7,8,8a-hexahydro-1H-pyrrolo[1,2-a]pyrazin-7-ol (Compound C1.1, 500.0 mg, 2.03 mmol) and tert-butyl 2-chloro-7,8-dihydro-5H-1,6-naphthyridine-6-carboxylate (Compound C14.1, CAS: 1151665-15-4, PharmaBlock, Catalog: PB06675, 550.0 mg, 2.05 mmol) and Potassium tert-butylate (600.0 mg, 5.35 mmol) in 1,4-dioxane (10 mL) was heated to 115° C. under the irradiation of microwave. The mixture was concentrated in vacuo to dryness and 30 mL water was added. Then the mixture was extracted with DCM (30 mL) three times. The combined organic phase was washed with brine (50 mL), dried over $Na_2SO_4$, concentrated in vacuo. The residue was purified by prep-TLC (DCM/MeOH=10:1) to afford compound 14.2 (140 mg, 14.4% yield) as a crude. MS: calc'd 479 [(M+H)$^+$]; measured 479 [(M+H)$^+$].

Step 2: Preparation of tert-butyl 2-[[(4R,8aS)-4-methyl-1,2,3,4,6,7,8,8a-octahydropyrrolo[1,2-a]pyrazin-7-yl]oxy]-7,8-dihydro-5H-1,6-naphthyridine-6-carboxylate (Compound 14.3)

To the mixture of tert-butyl 2-[[(4R,8aS)-2-benzyl-4-methyl-3,4,6,7,8,8a-hexahydro-1H-pyrrolo[1,2-a]pyrazin-7-yl]oxy]-7,8-dihydro-5H-1,6-naphthyridine-6-carboxylate (compound 14.2, 110.0 mg, 0.230 mmol), Pd/C (wet) (200.0 mg, 0.230 mmol) in 2,2,2-Trifluoroethanol (5.0 mL) was hydrogenated under $H_2$ balloon at 60° C. for 2 h. The Pd/C was filtered off via a pad of celite and washed with MeOH (10 mL). The combined organic phase was concentrated in vacuo to afford compound 14.3 (50 mg, 56% yield) as a crude. MS: calc'd 389 [(M+H)$^+$]; measured 389 [(M+H)$^+$].

Step 3: Preparation of tert-butyl 2-[[(4R,8aS)-4-methyl-1,2,3,4,6,7,8,8a-octahydropyrrolo[1,2-a]pyrazin-7-yl]oxy]-7,8-dihydro-5H-1,6-naphthyridine-6-carboxylate (Compound 14.4)

To a solution of tert-butyl 2-[[(4R,8aS)-4-methyl-1,2,3,4,6,7,8,8a-octahydropyrrolo[1,2-a]pyrazin-7-yl]oxy]-7,8-dihydro-5H-1,6-naphthyridine-6-carboxylate (compound 14.3, 110.0 mg, 0.280 mmol) and N,N-diisopropylethylamine (0.15 mL, 0.850 mmol) in DMA (5 mL) was added 5-fluoroquinoline-8-carbonitrile (intermediate A1, 110.0 mg, 0.640 mmol). Then the mixture was stirred at 120° C. for 16 h. 25 mL water was added to quench the reaction, then 30 mL EA was added to the mixture. Then the mixture was washed with sat. brine (10 mL) three times. Then the organic phase was dried over Na$_2$SO$_4$, filtered, concentrated in vacuo. The residue was purified by prep-TLC (EA) to afford compound 14.4 (75 mg, 48.99% yield). MS: calc'd 541 [(M+H)$^+$]; measured 541 [(M+H)$^+$].

Step 4: Preparation of 5-[(4R,8aS)-4-methyl-7-(5,6,7,8-tetrahydro-1,6-naphthyridin-2-yloxy)-3,4,6,7,8,8a-hexahydro-1H-pyrrolo[1,2-a]pyrazin-2-yl]quinoline-8-carbonitrile Example 14

To the solution of tert-butyl 2-[[(4R,8aS)-2-(8-cyano-5-quinolyl)-4-methyl-3,4,6,7,8,8a-hexahydro-1H-pyrrolo[1,2-a]pyrazin-7-yl]oxy]-7,8-dihydro-5H-1,6-naphthyridine-6-carboxylate (compound 14.4, 75.0 mg, 0.140 mmol) in DCM (5 mL) was added HCl/dioxane (4N, 20.0 mL, mmol). Then the mixture was stirred at room temperature for 2 h. The mixture was then concentrated to afford a crude product which was purified by pre-HPLC to afford Example 14 (43 mg, 62.6% yield). MS: calc'd 441 [(M+H)$^+$]; measured 441 [(M+H)$^+$]. $^1$H NMR (400 MHz, METHANOL-d$_4$) δ 9.20-9.16 (m, 1H), 9.13 (d, J=8.4 Hz, 1H), 8.40 (d, J=8.0 Hz, 1H), 8.00 (dd, J=4.8, 8.4 Hz, 1H), 7.65 (d, J=8.8 Hz, 1H), 7.59 (d, J=8.0 Hz, 1H), 6.88 (d, J=8.4 Hz, 1H), 5.80 (q, J=6.8 Hz, 1H), 4.36 (s, 2H), 4.13-3.89 (m, 4H), 3.87-3.77 (m, 2H), 3.64-3.57 (m, 2H), 3.51 (dd, J=11.2, 12.8 Hz, 1H), 3.36 (br dd, J=10.8, 13.6 Hz, 1H), 3.21-3.14 (m, 2H), 3.14-3.03 (m, 1H), 2.12 (dt, J=5.6, 13.2 Hz, 1H), 1.49 (d, J=6.4 Hz, 3H).

Example 15

5-[(4R,7S,8aS)-4-methyl-7-piperazin-1-yl-3,4,6,7,8,8a-hexahydro-1H-pyrrolo[1,2-a]pyrazin-2-yl]-2-deuterio-quinoline-8-carbonitrile

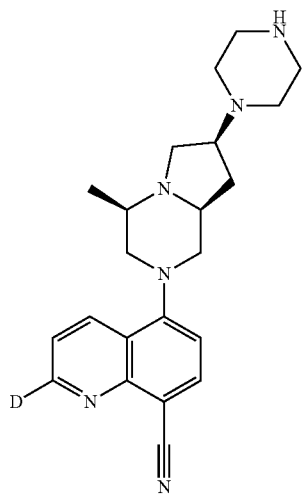 [SMILES: [2H]c1ccc2c(N3C[C@@H]4C[C@H](N5CCNCC5)CN4[C@H](C)C3)ccc(C#N)c2n1]

The title compound was prepared in analogy to the preparation of Example 10 by using tert-butyl piperazine-1-carboxylate instead of 6-bromo-1,2,3,4-tetrahydroisoquinoline in step 1. MS: calc'd 378 [(M+H)$^+$], measured 378 [(M+H)$^+$]. $^1$H NMR (400 MHz, METHANOL-d$_4$) δ ppm 8.62 (d, J=8.7 Hz, 1H), 8.17 (d, J=8.1 Hz, 1H), 7.66 (d, J=8.7 Hz, 1H), 7.34 (d, J=8.1 Hz, 1H), 3.76 (br s, 1H), 3.7-3.8 (m, 1H), 3.4-3.6 (m, 3H), 3.3-3.4 (m, 1H), 3.2-3.3 (m, 4H), 3.1-3.2 (m, 1H), 3.17 (s, 1H), 3.04 (dd, J=10.6, 13.0 Hz, 1H), 2.80 (br d, J=4.4 Hz, 4H), 2.40 (ddd, J=5.2, 7.6, 12.6 Hz, 1H), 1.80 (dt, J=8.2, 12.2 Hz, 1H), 1.38 (d, J=6.5 Hz, 3H).

Example 16

2-Deuterio-5-[(4R,7S,8aS)-7-(3,8-diazabicyclo[3.2.1]octan-3-yl)-4-methyl-3,4,6,7,8,8a-hexahydro-1H-pyrrolo[1,2-a]pyrazin-2-yl]quinoline-8-carbonitrile

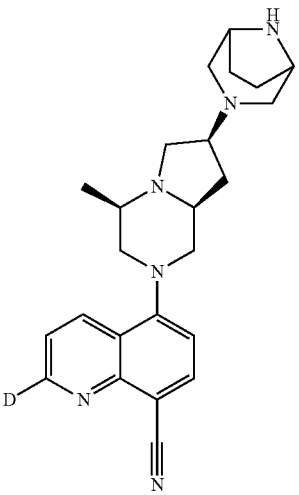 [SMILES: [2H]c1ccc2c(N3C[C@@H]4C[C@H](N5CC6CCC(C5)N6)CN4[C@H](C)C3)ccc(C#N)c2n1]

The title compound was prepared in analogy to the preparation of Example 10 by using tert-butyl 3,8-diazabicyclo[3.2.1]octane-8-carboxylate (CAS: 149771-44-8, PharmaBlock, Catalog: PBN20120001) instead of 6-bromo-1,2,3,4-tetrahydroisoquinoline in step 1. MS: calc'd 404 [(M+H)$^+$], measured 404 [(M+H)$^+$]. $^1$H NMR (METHANOL-d$_4$, 400 MHz) δ 8.66 (d, 1H, J=8.6 Hz), 8.22 (d, 1H, J=8.1 Hz), 7.71 (d, 1H, J=8.6 Hz), 7.41 (d, 1H, J=7.9 Hz), 4.08 (br s, 2H), 3.8-4.0 (m, 3H), 3.4-3.6 (m, 2H), 2.9-3.2 (m, 3H), 2.52 (br t, 3H, J=13.1 Hz), 2.0-2.3 (m, 4H), 1.8-2.0 (m, 1H), 1.49 (d, 3H, J=6.6 Hz).

Example 17

5-[(4R,7S,8aS)-7-(3-amino-3-methyl-azetidin-1-yl)-4-methyl-3,4,6,7,8,8a-hexahydro-1H-pyrrolo[1,2-a]pyrazin-2-yl]-2-deuterio-quinoline-8-carbonitrile

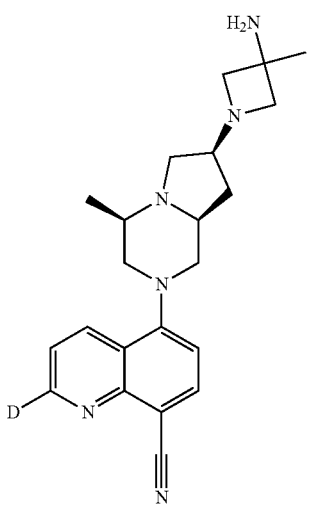 [SMILES: [2H]c1ccc2c(N3C[C@@H]4C[C@H](N5CC(C)(N)C5)CN4[C@H](C)C3)ccc(C#N)c2n1]

The title compound was prepared in analogy to the preparation of Example 10 by using tert-butyl N-(3-methylazetidin-3-yl)carbamate (CAS: 1018443-01-0, PharmaBlock, Catalog: PB03046) instead of 6-bromo-1,2,3,4-tetrahydroisoquinoline in step 1. MS: calc'd 378 [(M+H)$^+$], measured 378 [(M+H)$^+$]. $^1$H NMR (METHANOL-d$_4$, 400 MHz) δ 8.65 (d, 1H, J=8.6 Hz), 8.22 (d, 1H, J=7.9 Hz), 7.70 (d, 1H, J=8.6 Hz), 7.39 (d, 1H, J=8.1 Hz), 3.5-3.9 (m, 10H), 3.2-3.3 (m, 2H), 3.1-3.2 (m, 1H), 2.5-2.7 (m, 1H), 1.66 (s, 4H), 1.45 (d, 3H, J=6.5 Hz).

Example 18

5-[(4R,7S,8aS)-7-(4-amino-4-methyl-1-piperidyl)-4-methyl-3,4,6,7,8,8a-hexahydro-1H-pyrrolo[1,2-a]pyrazin-2-yl]-2-deuterio-quinoline-8-carbonitrile

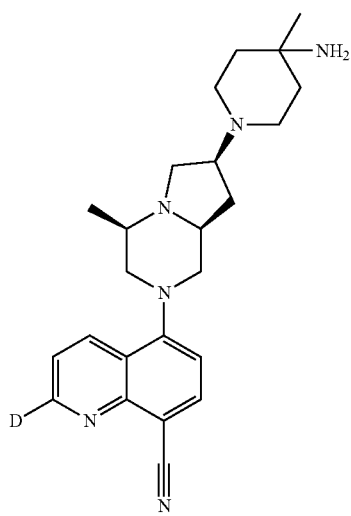 [SMILES: [2H]c1ccc2c(N3C[C@@H]4C[C@H](N5CCC(C)(N)CC5)CN4[C@H](C)C3)ccc(C#N)c2n1]

The title compound was prepared in analogy to the preparation of Example 10 by using tert-butyl N-(4-methyl-4-piperidyl)carbamate (CAS: 163271-08-7, PharmaBlock, Catalog: PB02909) instead of 6-bromo-1,2,3,4-tetrahydroisoquinoline in step 1. MS: calc'd 406 [(M+H)$^+$], measured 406 [(M+H)$^+$]. $^1$H NMR (METHANOL-d$_4$, 400 MHz) δ 8.65 (d, 1H, J=8.6 Hz), 8.21 (d, 1H, J=7.9 Hz), 7.69 (d, 1H, J=8.6 Hz), 7.37 (d, 1H, J=7.9 Hz), 3.9-4.1 (m, 2H), 3.81 (br d, 1H, J=12.2 Hz), 3.64 (br d, 1H, J=12.3 Hz), 3.4-3.6 (m, 4H), 2.9-3.3 (m, 5H), 2.63 (ddd, 1H, J=5.4, 7.5, 13.2 Hz), 1.9-2.2 (m, 5H), 1.52 (s, 3H), 1.39 (d, 3H, J=6.4 Hz).

Example 19

2-Deuterio-5-[(4R,7S,8aS)-7-(3-amino-3-methyl-pyrrolidin-1-yl)-4-methyl-3,4,6,7,8,8a-hexahydro-1H-pyrrolo[1,2-a]pyrazin-2-yl]quinoline-8-carbonitrile

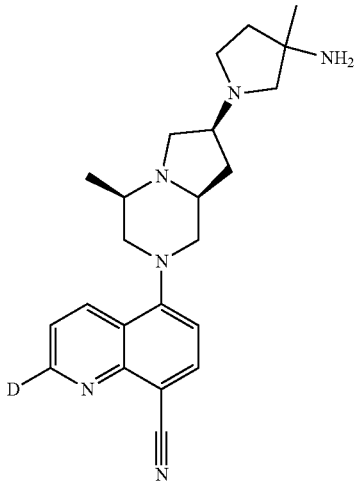 [SMILES: [2H]c1ccc2c(N3C[C@@H]4C[C@H](N5CCC(C)(N)C5)CN4[C@H](C)C3)ccc(C#N)c2n1]

The title compound was prepared in analogy to the preparation of Example 10 by using tert-butyl N-(3-methylpyrrolidin-3-yl)carbamate (CAS: 147459-52-7, PharmaBlock, Catalog: PB03048) instead of 6-bromo-1,2,3,4-tetrahydroisoquinoline in step 1. MS: calc'd 392 [(M+H)$^+$], measured 392 [(M+H)$^+$]. $^1$H NMR (METHANOL-d$_4$, 400 MHz) δ 8.66 (d, 1H, J=8.7 Hz), 8.21 (d, 1H, J=7.9 Hz), 7.70 (d, 1H, J=8.6 Hz), 7.41 (d, 1H, J=8.1 Hz), 3.6-4.0 (m, 6H), 3.4-3.6 (m, 1H), 3.37 (s, 1H), 3.2-3.3 (m, 2H), 2.9-3.1 (m, 2H), 2.68 (ddd, 1H, J=5.6, 7.8, 13.1 Hz), 2.1-2.3 (m, 2H), 1.9-2.1 (m, 2H), 1.57 (s, 3H), 1.47 (d, 3H, J=6.5 Hz).

Example 20

5-[(4R,7S,8aS)-7-[4-(dimethylamino)-1-piperidyl]-4-methyl-3,4,6,7,8,8a-hexahydro-1H-pyrrolo[1,2-a]pyrazin-2-yl]-2-deuterio-quinoline-8-carbonitrile

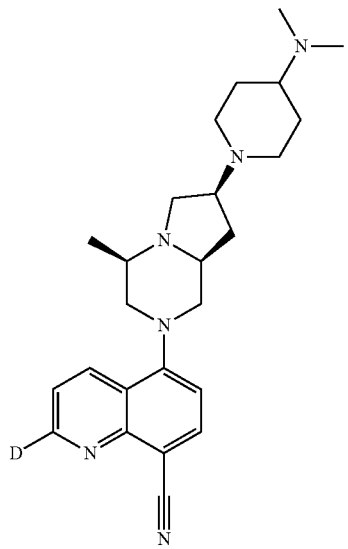 [SMILES: [2H]c1ccc2c(N3C[C@@H]4C[C@H](N5CCC(N(C)C)CC5)CN4[C@H](C)C3)ccc(C#N)c2n1]

The title compound was prepared in analogy to the preparation of Example 10 by using N,N-dimethylpiperidin-4-amine (CAS: 50533-97-6, BePharm, Catalog: BD21065) instead of 6-bromo-1,2,3,4-tetrahydroisoquinoline in step 1. MS: calc'd 420 [(M+H)$^+$], measured 420 [(M+H)$^+$]. $^1$H NMR (METHANOL-d$_4$, 400 MHz) δ 8.63 (d, 1H, J=8.6 Hz), 8.18 (d, 1H, J=7.9 Hz), 7.67 (d, 1H, J=8.6 Hz), 7.38 (d, 1H, J=7.9 Hz), 4.0-4.3 (m, 2H), 3.4-3.9 (m, 8H), 3.0-3.3 (m, 4H), 2.93 (s, 6H), 2.75 (ddd, 1H, J=5.4, 8.2, 13.3 Hz), 2.41 (br dd, 2H, J=2.4, 13.5 Hz), 1.9-2.2 (m, 3H), 1.42 (d, 3H, J=6.4 Hz). $^1$H NMR (METHANOL-d$_4$, 400 MHz) δ 8.61 (d, 1H, J=8.6 Hz), 8.16 (d, 1H, J=7.9 Hz), 7.65 (d, 1H, J=8.6 Hz), 7.2-7.4 (m, 1H), 3.6-4.2 (m, 3H), 3.3-3.6 (m, 4H), 2.8-3.2 (m, 9H), 2.5-2.7 (m, 1H), 1.7-2.1 (m, 9H), 1.2-1.4 (m, 3H)

Example 21

2-Deuterio-5-[(4R,7S,8aS)-7-(2,9-diazaspiro[5.5]undecan-9-yl)-4-methyl-3,4,6,7,8,8a-hexahydro-1H-pyrrolo[1,2-a]pyrazin-2-yl]quinoline-8-carbonitrile

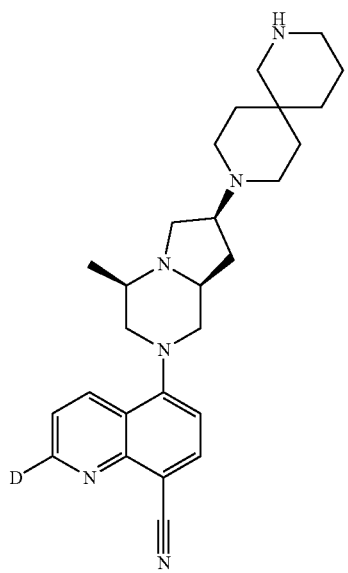 [SMILES: [2H]c1ccc2c(N3C[C@@H]4C[C@H](N5CCC6(CCCNC6)CC5)CN4[C@H](C)C3)ccc(C#N)c2n1]

The title compound was prepared in analogy to the preparation of Example 10 by using tert-butyl 2,9-diazaspiro[5.5]undecane-2-carboxylate (CAS: 189333-03-7, BePharm, Catalog: BD157859) instead of 6-bromo-1,2,3,4-tetrahydroisoquinoline in step 1. MS: calc'd 446 [(M+H)$^+$], measured 446 [(M+H)$^+$]. $^1$H NMR (METHANOL-d$_4$, 400 MHz) δ 8.61 (d, 1H, J=8.6 Hz), 8.16 (d, 1H, J=7.9 Hz), 7.65 (d, 1H, J=8.6 Hz), 7.2-7.4 (m, 1H), 3.6-4.2 (m, 3H), 3.3-3.6 (m, 4H), 2.8-3.2 (m, 8H), 2.5-2.7 (m, 1H), 1.7-2.1 (m, 9H), 1.2-1.4 (m, 3H).

Example 22A and Example 22B

5-[(4R,7S,8aS)-4-methyl-7-[3-[(5R)-5-methyl-4,5,6,7-tetrahydropyrazolo[3,4-c]pyridin-1-yl]azetidin-1-yl]-3,4,6,7,8,8a-hexahydro-1H-pyrrolo[1,2-a]pyrazin-2-yl]-2-deuterio-quinoline-8-carbonitrile and 5-[(4R,7S,8aS)-4-methyl-7-[3-[(5R)-5-methyl-4,5,6,7-tetrahydropyrazolo[3,4-c]pyridin-2-yl]azetidin-1-yl]-3,4,6,7,8,8a-hexahydro-1H-pyrrolo[1,2-a]pyrazin-2-yl]-2-deuterio-quinoline-8-carbonitrile

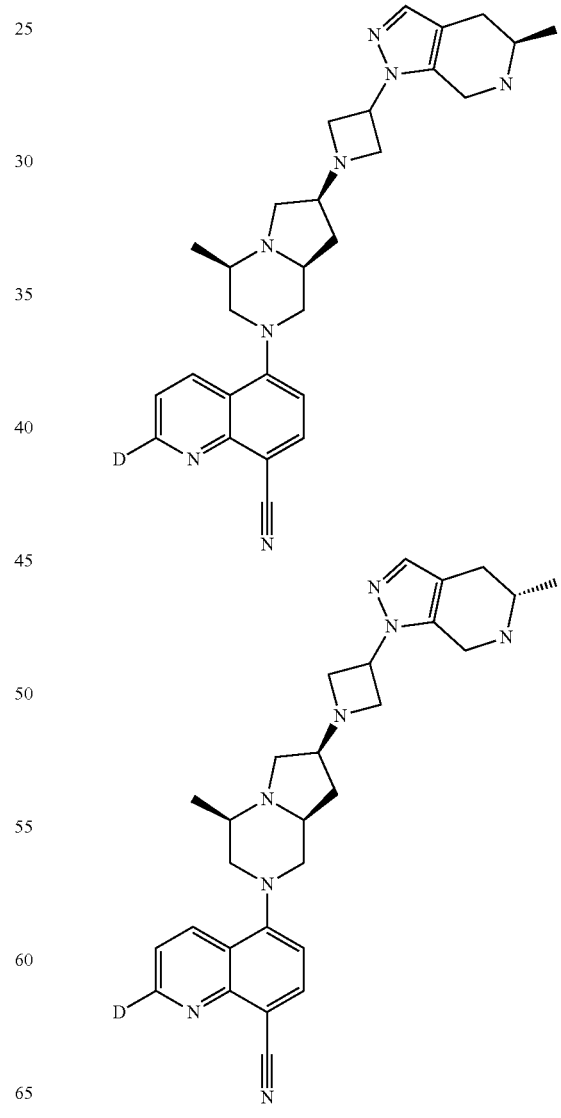

83

The title compounds were prepared according to the following scheme:

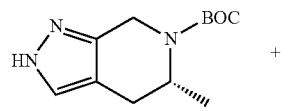

intermediate F

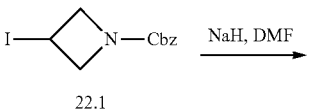

22.1

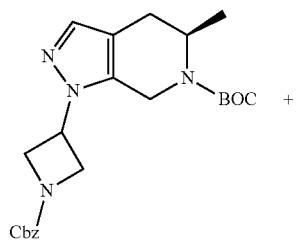

22.2

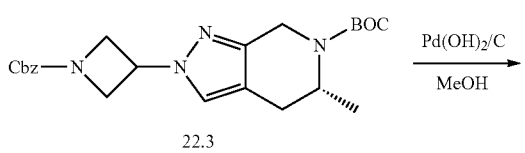

22.3

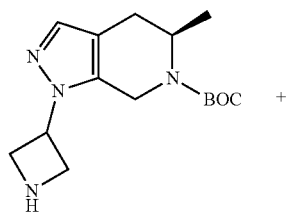

22.4

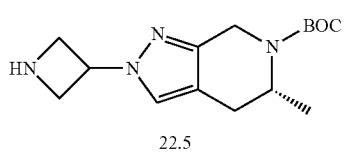

22.5

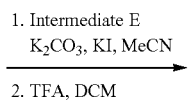

1. Intermediate E
K₂CO₃, KI, MeCN

2. TFA, DCM

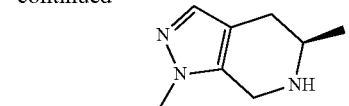

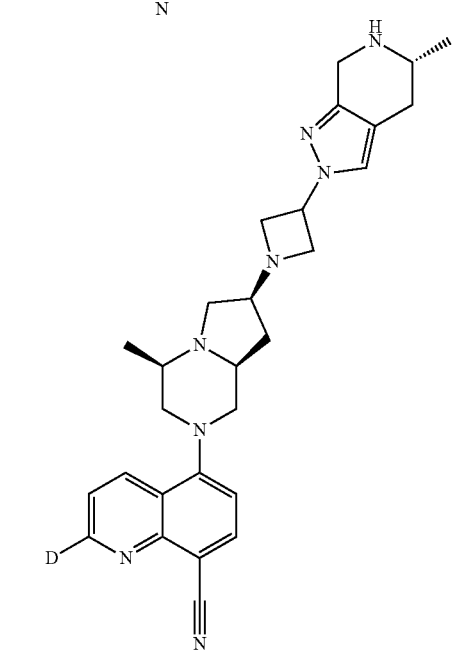

Step 1: Preparation of tert-butyl (5R)-1-(1-benzyloxycarbonylazetidin-3-yl)-5-methyl-5,7-dihydro-4H-pyrazolo[3,4-c]pyridine-6-carboxylate (compound 22.2) and tert-butyl (5R)-2-(1-benzyloxycarbonylazetidin-3-yl)-5-methyl-5,7-dihydro-4H-pyrazolo[3,4-c]pyridine-6-carboxylate (Compound 22.3)

To a flask was added tert-butyl (5R)-5-methyl-2,4,5,7-tetrahydropyrazolo[3,4-c]pyridine-6-carboxylate (Intermediate F, 212.6 mg, 896 µmol) and DMF (2 mL), the suspension was bubbled with N₂ for 5 mins and NaH (60% in mineral oil, 107 mg, 2.69 mmol) was added. After the mixture was stirred at rt for 0.5 h, benzyl 3-iodoazetidine-1-carboxylate (compound 22.1, CAS: 939759-26-9, PharmaBlock, Catalog: PB00431, 284 mg, 896 µmol) was added and the mixture was stirred at 60° C. for 2 hrs. After being cooled down, the reaction was quenched by addition of water (10 mL). The mixture was extracted by EA (10 mL) 3 times, and the organic phase was washed by brine (20 mL) twice, dried over $Na_2SO_4$, filtered and concentrated to give a light yellow oil which was purified by flash column (EA/PE=0 to 70%) to afford compound 22.2 and 22.3 (65 mg). The two products cannot be separated. MS: calc'd 427 [(M+H)$^+$], measured 427 [(M+H)$^+$].

Step 2: Preparation of tert-butyl (5R)-1-(azetidin-3-yl)-5-methyl-5,7-dihydro-4H-pyrazolo[3,4-c]pyridine-6-carboxylate (Compound 22.4) and tert-butyl (5R)-2-(azetidin-3-yl)-5-methyl-5,7-dihydro-4H-pyrazolo[3,4-c]pyridine-6-carboxylate (Compound 22.5)

To the flask containing tert-butyl (5R)-1-(1-benzyloxycarbonylazetidin-3-yl)-5-methyl-5,7-dihydro-4H-pyrazolo[3,4-c]pyridine-6-carboxylate (compound 22.2) and tert-butyl (5R)-2-(1-benzyloxycarbonylazetidin-3-yl)-5-methyl-5,7-dihydro-4H-pyrazolo[3,4-c]pyridine-6-carboxylate (compound 22.3) (65 mg, 152 μmol) was added MeOH (5 mL) and Pd(OH)$_2$/C (10 wt. %, 6 mg, 39 μmol). After being stirred under hydrogen balloon at rt for 2 hrs, the reaction mixture was filtered and concentrated to give compound 22.4 and 22.5 (44 mg) which was used in next step without further purification. MS: calc'd 293 [(M+H)$^+$], measured 293 [(M+H)$^+$].

Step 3: Preparation of 5-[(4R,7S,8aS)-4-methyl-7-[3-[(5R)-5-methyl-4,5,6,7-tetrahydropyrazolo[3,4-c]pyridin-1-yl]azetidin-1-yl]-3,4,6,7,8,8a-hexahydro-1H-pyrrolo[1,2-a]pyrazin-2-yl]-2-deuterio-quinoline-8-carbonitrile and 5-[(4R,7S,8aS)-4-methyl-7-[3-[(5R)-5-methyl-4,5,6,7-tetrahydropyrazolo[3,4-c]pyridin-2-yl]azetidin-1-yl]-3,4,6,7,8,8a-hexahydro-1H-pyrrolo[1,2-a]pyrazin-2-yl]-2-deuterio-quinoline-8-carbonitrile Example 22A and 22B To a sealed tube was added (4R,8aS)-2-(8-cyano-2-deuterio-5-quinolyl)-4-methyl-3,4,6,7,8,8a-hexahydro-1H-pyrrolo[1,2-a]pyrazin-7-yl]methanesulfonate (Intermediate E, 60.5 mg, 156 μmol), tert-butyl (5R)-1-(azetidin-3-yl)-5-methyl-5,7-dihydro-4H-pyrazolo[3,4-c]pyridine-6-carboxylate (compound 22.4) and tert-butyl (5R)-2-(azetidin-3-yl)-5-methyl-5,7-dihydro-4H-pyrazolo[3,4-c]pyridine-6-carboxylate (compound 22.5) (44 mg, 150 μmol), potassium carbonate (65 mg, 469 μmol), potassium iodide (24.9 mg, 150 μmol) and MeCN (5 mL), the mixture was stirred at 110° C. overnight. After being cooled down, the mixture was filtered through celite and concentrated to afford a yellow oil which was dissolved in DCM (5 mL) and TFA (1 mL). The mixture was stirred at rt for 2 hrs and then concentrated to give an oil which was purified by prep-HPLC (ODS-C18, acetonitrile and 0.1% TFA in water) to give Example 22A (slower eluting, 10 mg) and Example 22B (faster eluting, 14 mg).

Example 22A: MS: calc'd 484 [(M+H)$^+$], measured 484 [(M+H)$^+$]. $^1$H NMR (METHANOL-d$_4$, 400 MHz) δ 8.65 (d, 1H, J=8.6 Hz), 8.1-8.2 (m, 1H), 7.6-7.8 (m, 1H), 7.52 (d, 1H, J=6.6 Hz), 7.41 (d, 1H, J=8.1 Hz), 4.5-4.8 (m, 4H), 4.4-4.5 (m, 1H), 4.3-4.3 (m, 1H), 4.1-4.2 (m, 1H), 3.5-4.0 (m, 9H), 2.5-3.3 (m, 5H), 1.3-1.6 (m, 6H).

Example 22B: MS: calc'd 484 [(M+H)$^+$], measured 484 [(M+H)$^+$]. $^1$H NMR (METHANOL-d$_4$, 400 MHz) δ 8.65 (br d, 1H, J=8.4 Hz), 8.19 (dd, 1H, J=2.8, 7.9 Hz), 7.6-7.8 (m, 2H), 7.38 (br d, 1H, J=8.2 Hz), 5.3-5.5 (m, 1H), 4.6-4.8 (m, 3H), 4.1-4.5 (m, 4H), 3.4-4.0 (m, 8H), 3.0-3.3 (m, 3H), 2.8-2.9 (m, 1H), 2.70 (br dd, 1H, J=10.6, 16.3 Hz), 1.51 (br d, 3H, J=6.4 Hz), 1.43 (br dd, 3H, J=6.2, 16.1 Hz).

Example 23A and Example 23B

2-Deuterio-5-[(4R,7S,8aS)-4-methyl-7-(4,5,6,7-tetrahydropyrazolo[3,4-c]pyridin-1-yl)-3,4,6,7,8,8a-hexahydro-1H-pyrrolo[1,2-a]pyrazin-2-yl]quinoline-8-carbonitrile and 2-deuterio-5-[(4R,7S,8aS)-4-methyl-7-(4,5,6,7-tetrahydropyrazolo[3,4-c]pyridin-2-yl)-3,4,6,7,8,8a-hexahydro-1H-pyrrolo[1,2-a]pyrazin-2-yl]quinoline-8-carbonitrile (Example 23A and 23B)

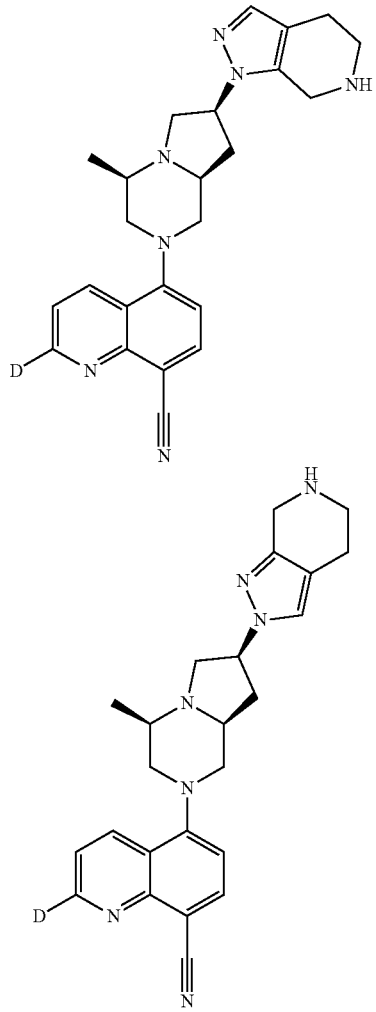

The title compound was prepared in analogy to the preparation of Example 22 by using tert-butyl 2,4,5,7-tetrahydropyrazolo[3,4-c]pyridine-6-carboxylate (CAS: 871726-73-7, BePharm Catalog: BD208989) instead of 6-bromo-1,2,3,4-tetrahydroisoquinoline in step 1). Example 23A and Example 23B were separated by prep-HPLC (ODS-C18, acetonitrile and 0.1% TFA in water).

Example 23A (faster eluting) MS: calc'd 415 [(M+H)$^+$], measured 415 [(M+H)$^+$]. $^1$H NMR (400 MHz, CDCl$_3$) δ

8.51 (d, J=8.4 Hz, 1H), 8.03 (d, J=8.0 Hz, 1H), 7.53-7.49 (m, 1H), 7.23 (s, 1H), 7.10 (d, J=8.0 Hz, 1H), 4.89-4.82 (m, 1H), 4.02 (s, 2H), 3.78 (t, J=8.4 Hz, 1H), 3.59 (d, J=11.2 Hz, 1H), 3.34 (d, J=11.2 Hz, 1H), 3.18-3.11 (m, 1H), 3.08 (t, J=5.6 Hz, 1H), 2.85-2.38 (m, 1H), 2.79-2.74 (m, 2H), 2.69 (t, J=8.4 Hz, 1H), 2.62 (t, J=5.6 Hz, 1H), 2.31-2.25 (m, 1H), 2.13-2.04 (m, 1H), 1.17 (d, J=6.2 Hz, 3H).

Example 23B (slower eluting) MS: calc'd 415 [(M+H)$^+$], measured 415 [(M+H)$^+$]. $^1$H NMR (METHANOL-d$_4$, 400 MHz) δ 8.69 (dd, 1H, J=2.4, 8.6 Hz), 8.22 (d, 1H, J=7.9 Hz), 7.6-7.8 (m, 2H), 7.44 (dd, 1H, J=1.8, 8.0 Hz), 5.3-5.5 (m, 1H), 4.29 (d, 2H, J=12.0 Hz), 4.0-4.2 (m, 2H), 3.8-4.0 (m, 3H), 3.76 (br d, 1H, J=12.8 Hz), 3.4-3.6 (m, 3H), 3.2-3.3 (m, 1H), 3.1-3.2 (m, 1H), 3.07 (t, 1H, J=6.3 Hz), 2.96 (ddd, 1H, J=5.6, 8.3, 13.7 Hz), 2.3-2.5 (m, 1H), 1.51 (dd, 3H, J=3.5, 6.5 Hz).

Example 24

2-Deuterio-5-[(4R,7S,8aS)-7-(2,9-diazaspiro[5.5] undecan-9-yl)-4-methyl-3,4,6,7,8,8a-hexahydro-1H-pyrrolo[1,2-a]pyrazin-2-yl]quinoline-8-carbonitrile

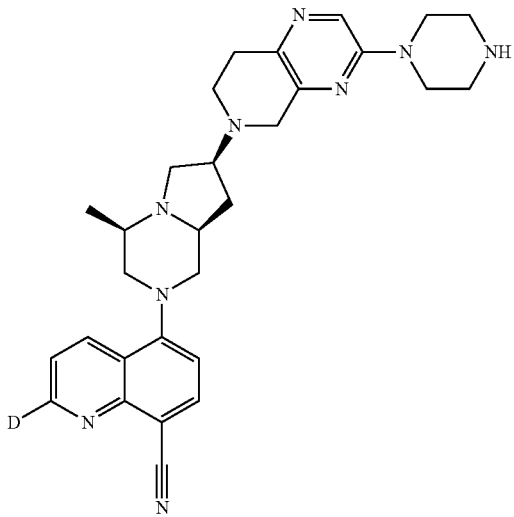 [SMILES: [2H]c1ccc2c(N3C[C@@H]4C[C@H](N5CCc6ncc(N7CCNCC7)nc6C5)CN4[C@H](C)C3)ccc(C#N)c2n1]

The title compound was prepared in analogy to the preparation of Example 10 by using tert-butyl 4-(5,6,7,8-tetrahydropyrido[3,4-b]pyrazin-3-yl)piperazine-1-carboxylate (Intermediate G) instead of 6-bromo-1,2,3,4-tetrahydroisoquinoline in step 1. MS: calc'd 511 [(M+H)$^+$], measured 511 [(M+H)$^+$]. $^1$H NMR (400 MHz, METHANOL-d$_4$) δ ppm 8.88 (d, J=8.6 Hz, 1H), 8.25-8.46 (m, 2H), 7.84 (d, J=8.6 Hz, 1H), 7.53 (d, J=8.1 Hz, 1H), 4.53-4.73 (m, 3H), 4.13-4.26 (m, 1H), 3.88-4.11 (m, 8H), 3.66-3.86 (m, 2H), 3.54-3.66 (m, 2H), 3.37-3.41 (m, 4H), 2.94-3.11 (m, 1H), 2.52-2.72 (m, 1H), 2.03-2.10 (m, 1H), 1.61-1.71 (m, 1H), 1.56-1.61 (m, 3H), 1.27-1.41 (m, 2H).

Example 25

The following tests were carried out in order to determine the activity of the compounds of formula (I), (Ia) or (Ib) in HEK293-Blue-hTLR-7/8/9 cells assay.
HEK293-BLUE-hTLR-7 CELLS ASSAY:

A stable HEK293-Blue-hTLR-7 cell line was purchased from InvivoGen (Cat. #: hkb-htlr7, San Diego, California, USA). These cells were originally designed for studying the stimulation of human TLR7 by monitoring the activation of NF-κB. A SEAP (secreted embryonic alkaline phosphatase) reporter gene was placed under the control of the IFN-β minimal promoter fused to five NF-κB and AP-1-binding sites. The SEAP was induced by activating NF-κB and AP-1 via stimulating HEK-Blue hTLR7 cells with TLR7 ligands. Therefore the reporter expression was declined by TLR7 antagonist under the stimulation of a ligand, such as R848 (Resiquimod), for incubation of 20 hrs. The cell culture supernatant SEAP reporter activity was determined using QUANTI-Blue™ kit (Cat. #: rep-qb1, Invivogen, San Diego, Ca, USA) at a wavelength of 640 nm, a detection medium that turns purple or blue in the presence of alkaline phosphatase.

HEK293-Blue-hTLR7 cells were incubated at a density of 250,000~450,000 cells/mL in a volume of 170 μL in a 96-well plate in Dulbecco's Modified Eagle's medium (DMEM) containing 4.5 g/L glucose, 50 U/mL penicillin, 50 mg/mL streptomycin, 100 mg/mL Normocin, 2 mM L-glutamine, 10% (v/v) heat-inactivated fetal bovine serum with addition of 20 μL test compound in a serial dilution in the presence of final DMSO at 1% and 10 μL of 20 μM R848 in above DMEM, perform incubation under 37° C. in a CO$_2$ incubator for 20 hrs. Then 20 μL of the supernatant from each well was incubated with 180 μL Quanti-blue substrate solution at 37° C. for 2 hrs and the absorbance was read at 620-655 nm using a spectrophotometer. The signaling pathway that TLR7 activation leads to downstream NF-κB activation has been widely accepted, and therefore similar reporter assay was modified for evaluating TLR7 antagonist.
HEK293-Blue-hTLR-8 Cells Assay:

A stable HEK293-Blue-hTLR-8 cell line was purchased from InvivoGen (Cat. #: hkb-htlr8, San Diego, California, USA). These cells were originally designed for studying the stimulation of human TLR8 by monitoring the activation of NF-κB. A SEAP (secreted embryonic alkaline phosphatase) reporter gene was placed under the control of the IFN-β minimal promoter fused to five NF-κB and AP-1-binding sites. The SEAP was induced by activating NF-κB and AP-1 via stimulating HEK-Blue hTLR8 cells with TLR8 ligands. Therefore the reporter expression was declined by TLR8 antagonist under the stimulation of a ligand, such as R848, for incubation of 20 hrs. The cell culture supernatant SEAP reporter activity was determined using QUANTI-Blue™ kit (Cat. #: rep-Qb1, Invivogen, San Diego, Ca, USA) at a wavelength of 640 nm, a detection medium that turns purple or blue in the presence of alkaline phosphatase.

HEK293-Blue-hTLR8 cells were incubated at a density of 250,000-450,000 cells/mL in a volume of 170 μL in a 96-well plate in Dulbecco's Modified Eagle's medium (DMEM) containing 4.5 g/L glucose, 50 U/mL penicillin, 50 mg/mL streptomycin, 100 mg/mL Normocin, 2 mM L-glutamine, 10% (v/v) heat-inactivated fetal bovine serum with addition of 20 μL test compound in a serial dilution in the presence of final DMSO at 1% and 10 μL of 60 μM R848 in above DMEM, perform incubation under 37° C. in a CO$_2$ incubator for 20 hrs. Then 20 μL of the supernatant from each well was incubated with 180 μL Quanti-blue substrate solution at 37° C. for hrs and the absorbance was read at 620~655 nm using a spectrophotometer. The signaling pathway that TLR8 activation leads to downstream NF-κB activation has been widely accepted, and therefore similar reporter assay was modified for evaluating TLR8 antagonist.
HEK293-Blue-hTLR-9 Cells Assay:

A stable HEK293-Blue-hTLR-9 cell line was purchased from InvivoGen (Cat. #: hkb-htlr9, San Diego, California, USA). These cells were originally designed for studying the stimulation of human TLR9 by monitoring the activation of NF-κB. A SEAP (secreted embryonic alkaline phosphatase) reporter gene was placed under the control of the IFN-β minimal promoter fused to five NF-κB and AP-1-binding sites. The SEAP was induced by activating NF-κB and AP-via stimulating HEK-Blue hTLR9 cells with TLR9 ligands. Therefore the reporter expression was declined by TLR9 antagonist under the stimulation of a ligand, such as ODN2006 (Cat. #: tlrl-2006-1, Invivogen, San Diego, California, USA), for incubation of 20 hrs. The cell culture supernatant SEAP reporter activity was determined using QUANTI-Blue™ kit (Cat. #: rep-qb1, Invivogen, San Diego, California, USA) at a wavelength of 640 nm, a detection medium that turns purple or blue in the presence of alkaline phosphatase.

HEK293-Blue-hTLR9 cells were incubated at a density of 250,000~450,000 cells/mL in a volume of 170 μL in a 96-well plate in Dulbecco's Modified Eagle's medium (DMEM) containing 4.5 g/L glucose, 50 U/mL penicillin, 50 mg/mL streptomycin, 100 mg/mL Normocin, 2 mM L-glutamine, 10% (v/v) heat-inactivated fetal bovine serum with addition of 20 μL test compound in a serial dilution in the presence of final DMSO at 1% and 10 μL of 20 μM ODN2006 in above DMEM, perform incubation under 37° C. in a $CO_2$ incubator for 20 hrs. Then 20 μL of the supernatant from each well was incubated with 180 μL Quanti-blue substrate solution at 37° C. for 2 h and the absorbance was read at 620-655 nm using a spectrophotometer. The signaling pathway that TLR9 activation leads to downstream NF-κB activation has been widely accepted, and therefore similar reporter assay was modified for evaluating TLR9 antagonist.

The compounds of formula (I) have TLR7 and/or TLR8 inhibitory activities ($IC_{50}$ value) <0.1 μM. Moreover, most compounds also have TLR9 inhibitory activity <0.3 μM. Activity data of the compounds of the present invention were shown in Table 1.

TABLE 1

The activity of the compounds of present invention in HEK293-Blue-hTLR-7/8/9 cells assays

| Example No | HEK/hTLR7 $IC_{50}$ (nM) | HEK/hTLR8 $IC_{50}$ (nM) | HEK/hTLR9 $IC_{50}$ (nM) |
|---|---|---|---|
| 1 | 16.1 | 13.4 | 43.4 |
| 2 | 40.5 | 12.5 | 89.5 |
| 3 | 38.7 | 18.4 | 114.0 |
| 4 | 21.7 | 6.3 | 147.5 |
| 5 | 16.9 | 2.9 | 78.1 |
| 6 | 18.8 | 12.9 | 157.0 |
| 7A | 17.7 | 9.0 | 53.5 |
| 7B | 29.8 | 11.3 | 56.5 |
| 8A | 11.1 | 3.6 | 63.1 |
| 8B | 14.7 | 7.5 | 89.4 |
| 9A | 18.2 | 8.6 | 65.7 |
| 9B | 13.3 | 4.7 | 42.1 |
| 10 | 30.1 | 24.9 | 81.1 |
| 11 | 23.4 | 8.5 | 59.2 |
| 12 | 45.1 | 17.2 | 107.7 |
| 13 | 14.9 | 8.2 | 49.0 |
| 14 | 16.2 | 4.0 | 246.5 |
| 15 | 12.9 | 20.3 | 119.6 |
| 16 | 8.1 | 4.7 | 40.9 |
| 17 | 11.3 | 14.7 | 174.7 |
| 18 | 16.4 | 12.3 | 46.7 |
| 19 | 19.9 | 8.9 | 209.6 |
| 20 | 18.9 | 18.3 | 149.6 |
| 21 | 30.4 | 10.3 | 45.1 |
| 22A | 10.3 | 14.5 | 32.1 |
| 22B | 5.2 | 4.7 | 38.0 |
| 23A | 10.5 | 13.8 | 406.6 |
| 23B | 12.0 | 3.4 | 154.0 |
| 24 | 4.3 | 5.9 | 95.2 |

Example 26

Human Microsomal Stability Assay

Human liver microsomes (Cat. NO.: 452117, Corning, USA) were preincubated with test compound for 10 minutes at 37° C. in 100 mM potassium phosphate buffer, pH 7.4. The reactions were initiated by adding NADPH regenerating system. The final incubation mixtures contained 1 μM test compound, 0.5 mg/mL liver microsomal protein, 1 mM $MgCl_2$, 1 mM NADP, 1 unit/mL isocitric dehydrogenase and 6 mM isocitric acid in 100 mM potassium phosphate buffer, pH 7.4. After incubation times of 0, 3, 6, 9, 15 and 30 minutes at 37° C., 300 μL of cold ACN (including internal standard) was added to 100 μL incubation mixture to terminate the reaction. Following precipitation and centrifugation, 100 μL supernatant will be taken out and added 300 μL water. The amount of compound remaining in the samples was determined by LC-MS/MS. Controls of no NADPH regenerating system at zero and 30 minutes were also prepared and analyzed. The results were categorized as: low (<7.0 mL/min/kg), medium (7.0-16.2 mL/min/kg) and high (16.2-23.2 mL/min/kg). Test results were summarized in Table 2.

TABLE 2

Human microsomal stability results

| Example No | CL (h) (mL/min/kg) |
|---|---|
| 1 | 9.1 |
| 2 | 7.3 |
| 3 | 6.7 |
| 9A | 8.4 |
| 9B | 9.6 |
| 15 | 8.0 |
| 16 | 7.2 |
| 18 | 9.8 |
| 19 | 8.6 |
| 20 | 6.2 |
| 22A | 8.2 |
| 22B | 8.1 |
| 23A | 8.1 |
| 23B | 6.2 |
| 24 | 8.9 |

Example 27 hERG Channel Inhibition Assay

The hERG channel inhibition assay is a highly sensitive measurement that identifies compounds exhibiting hERG inhibition related to cardiotoxicity in vivo. The hERG $K^+$ channels were cloned in humans and stably expressed in a CHO (Chinese hamster ovary) cell line. $CHO_{hERG}$ cells were used for patch-clamp (voltage-clamp, whole-cell) experiments. Cells were stimulated by a voltage pattern to activate hERG channels and conduct $I_{KhERG}$ Currents (rapid delayed outward rectifier potassium current of the hERG channel). After the cells were stabilized for a few minutes, the amplitude and kinetics of $I_{KhERG}$ were recorded at a stimulation frequency of 0.1 Hz (6 bpm). Thereafter, the test compound was added to the preparation at increasing concentrations. For each concentration, an attempt was made to reach a steady-state effect, usually, this was achieved within 3-10 min at which time the next highest concentration was applied. The amplitude and kinetics of $I_{KhERG}$ are recorded in each concentration of the drug which were compared to the control values (taken as 100%). (references: Redfern WS, Carlsson L, Davis A S, Lynch W G, MacKenzie I, Palethorpe S, Siegl P K, Strang I, Sullivan A T, Wallis R, Camm A J, Hammond T G. 2003; Relationships between preclinical cardiac electrophysiology, clinical QT interval prolongation and torsade de pointes for a broad range of drugs: evidence for a provisional safety margin in drug development. Cardiovasc. Res. 58:32-45, Sanguinetti M C, Tristani-Firouzi M. 2006; hERG potassium channels and cardiac arrhythmia. Nature 440:463-469, Webster R, Leishman D, Walker D. 2002; Towards a drug concentration effect relationship for QT prolongation and torsades de pointes. Curr. Opin. Drug Discov. Devel. 5:116-26). Results of hERG are given in Table 3.

TABLE 3 hERG results

| Example No | hERG IC$_{20}$ (µM) | hERG IC$_{50}$ (µM) |
|---|---|---|
| 1 | >10 | >20 |
| 2 | >10 | >20 |
| 3 | >10 | >20 |
| 15 | >10 | >20 |
| 20 | >10 | >20 |

The invention claimed is:

1. A compound of formula (I),

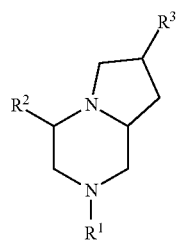

(I)

wherein:

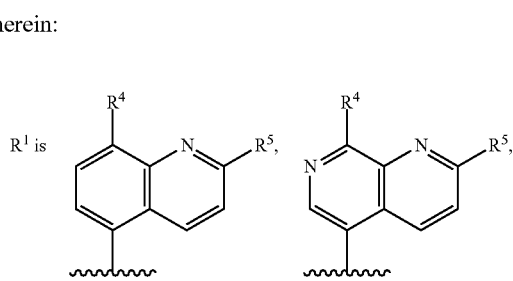

-continued

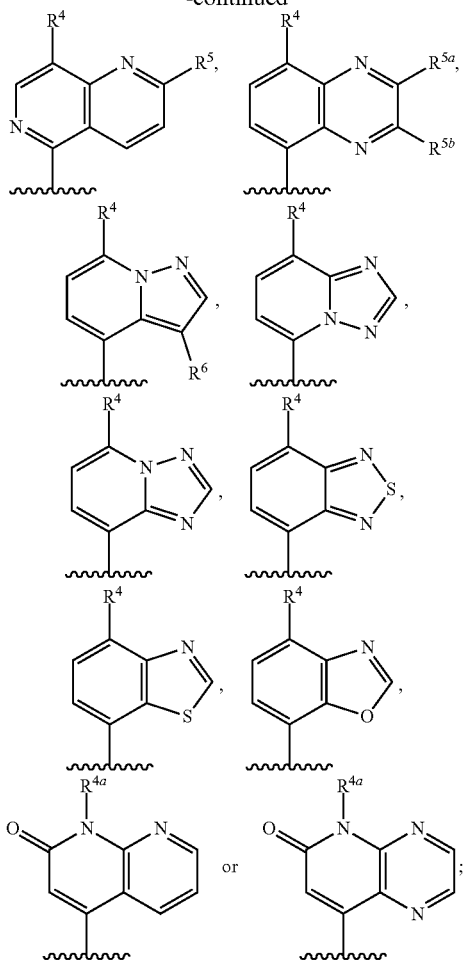

wherein:

R$^4$ is C$_{1-6}$alkyl, C$_{1-6}$alkoxy, haloC$_{1-6}$alkyl, halogen, nitro or cyano;

R$^{4a}$ is C$_{1-6}$alkyl or C$_{3-7}$cycloalkyl;

R$^5$, R$^{5a}$ and R$^{5b}$ are independently selected from H and deuterium; and R$^6$ is H or halogen;

R$^2$ is C$_{1-6}$alkyl; and

R$^3$ is a 5-7 membered monocyclic aryl or heteroaryl, a 7-12 membered bicyclic heterocyclyl, heterocyclyl-heterocyclyl, heterocyclylamino, C$_{1-6}$alkyl (heterocyclyl)amino, or heterocyclyloxy;

or a pharmaceutically acceptable salt thereof.

2. A compound according to claim 1, wherein:
R$^1$ is

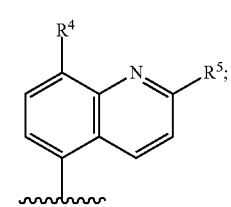

wherein:
R⁴ is cyano; and
R⁵ is H or deuterium;
R² is $C_{1-6}$alkyl; and
R³ is (5,6,7,8-tetrahydro-2,6-naphthyridinyl)piperazinyl; (amino($C_{1-6}$alkoxy)pyrrolidinyl)-3,4-dihydro-1H-2,6-naphthyridinyl; (amino($C_{1-6}$alkoxy)pyrrolidinyl)-7,8-dihydro-5H-1,6-naphthyridinyl; ($C_{1-6}$alkyl)₂aminopiperidinyl; ($C_{1-6}$alkyl-4,5,6,7-tetrahydropyrazolo[3,4-c]pyridinyl)azetidinyl; ($C_{1-6}$alkyl-5,6,7,8-tetrahydro-1,6-naphthyridinyl)amino; ($C_{1-6}$alkyl-5,6,7,8-tetrahydro-2,6-naphthyridinyl)amino; ($C_{1-6}$alkyl-6,7-dihydro-5H-pyrrolo[3,4-b]pyridinyl)amino; ($C_{1-6}$alkyl-7,8-dihydro-5H-1,6-naphthyridinyl)amino; 2,9-diazaspiro[5.5]undecanyl; 3,8-diazabicyclo[3.2.1]octanyl; 4,5,6,7-tetrahydropyrazolo[3,4-c]pyridinyl; 5,6,7,8-tetrahydro-1,6-naphthyridinylamino; 5,6,7,8-tetrahydro-1,6-naphthyridinyloxy; 5,6,7,8-tetrahydro-1,7-naphthyridinylamino; 5,6,7,8-tetrahydro-2,6-naphthyridinylamino; 5,6,7,8-tetrahydropyrido[4,3-d]pyrimidinylamino; amino($C_{1-6}$ alkyl)azetidinyl; amino($C_{1-6}$alkyl)piperidinyl; amino($C_{1-6}$alkyl)pyrrolidinyl; $C_{1-6}$alkyl(5,6,7,8-tetrahydro-1,6-naphthyridinyl)amino; piperazinyl; piperazinyl-3,4-dihydro-1H-isoquinolinyl; or piperazinyl-7,8-dihydro-5H-pyrido[3,4-b]pyrazinyl;
or a pharmaceutically acceptable salt thereof.

3. A compound of formula (Ia),

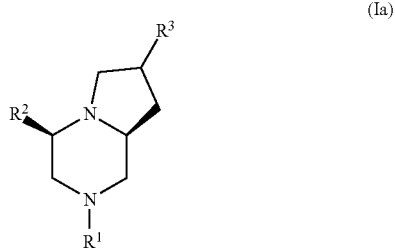

(Ia)

wherein:
R¹ is

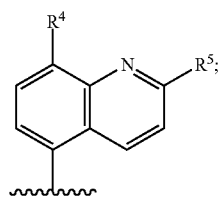

wherein:
R⁴ is cyano; and
R⁵ is H or deuterium;
R² is $C_{1-6}$alkyl; and
R³ is (5,6,7,8-tetrahydro-2,6-naphthyridinyl)piperazinyl; (amino($C_{1-6}$alkoxy)pyrrolidinyl)-3,4-dihydro-1H-2,6-naphthyridinyl; (amino($C_{1-6}$alkoxy)pyrrolidinyl)-7,8-dihydro-5H-1,6-naphthyridinyl; ($C_{1-6}$alkyl)₂aminopiperidinyl; ($C_{1-6}$alkyl-4,5,6,7-tetrahydropyrazolo[3,4-c]pyridinyl)azetidinyl; ($C_{1-6}$alkyl-5,6,7,8-tetrahydro-1,6-naphthyridinyl)amino; ($C_{1-6}$alkyl-5,6,7,8-tetrahydro-2,6-naphthyridinyl)amino; ($C_{1-6}$alkyl-6,7-dihydro-5H-pyrrolo[3,4-b]pyridinyl)amino; ($C_{1-6}$alkyl-7,8-dihydro-5H-1,6-naphthyridinyl)amino; 2,9-diazaspiro[5.5]undecanyl; 3,8-diazabicyclo[3.2.1]octanyl; 4,5,6,7-tetrahydropyrazolo[3,4-c]pyridinyl; 5,6,7,8-tetrahydro-1,6-naphthyridinylamino; 5,6,7,8-tetrahydro-1,6-naphthyridinyloxy; 5,6,7,8-tetrahydro-1,7-naphthyridinylamino; 5,6,7,8-tetrahydro-2,6-naphthyridinylamino; 5,6,7,8-tetrahydropyrido[4,3-d]pyrimidinylamino; amino($C_{1-6}$ alkyl)azetidinyl; amino($C_{1-6}$alkyl)piperidinyl; amino($C_{1-6}$alkyl)pyrrolidinyl; $C_{1-6}$alkyl(5,6,7,8-tetrahydro-1,6-naphthyridinyl)amino; piperazinyl; piperazinyl-3,4-dihydro-1H-isoquinolinyl; or piperazinyl-7,8-dihydro-5H-pyrido[3,4-b]pyrazinyl;
or a pharmaceutically acceptable salt thereof.

4. A compound according to claim 2, wherein R⁵ is deuterium.

5. A compound according to claim 4, wherein R³ is (3-amino-4-methoxy-pyrrolidin-1-yl)-3,4-dihydro-1H-2,6-naphthyridin-2-yl; (3-amino-4-methoxy-pyrrolidin-1-yl)-7,8-dihydro-5H-1,6-naphthyridin-6-yl; (5,6,7,8-tetrahydro-2,6-naphthyridin-3-yl)piperazin-1-yl; (5-methyl-4,5,6,7-tetrahydropyrazolo[3,4-c]pyridin-1-yl)azetidin-1-yl; (5-methyl-4,5,6,7-tetrahydropyrazolo[3,4-c]pyridin-2-yl)azetidin-1-yl; (5-methyl-5,6,7,8-tetrahydro-2,6-naphthyridin-3-yl)amino; (5-methyl-6,7-dihydro-5H-pyrrolo[3,4-b]pyridin-2-yl)amino; (6-methyl-7,8-dihydro-5H-1,6-naphthyridin-2-yl)amino; (7-methyl-5,6,7,8-tetrahydro-1,6-naphthyridin-2-yl)amino; 2,9-diazaspiro[5.5]undecan-9-yl; 3,8-diazabicyclo[3.2.1]octan-3-yl; 3-amino-3-methyl-azetidin-1-yl; 3-amino-3-methyl-pyrrolidin-1-yl; 3-piperazin-1-yl-7,8-dihydro-5H-pyrido[3,4-b]pyrazin-6-yl; 4-(dimethylamino)-1-piperidinyl; 4,5,6,7-tetrahydropyrazolo[3,4-c]pyridin-1-yl; 4,5,6,7-tetrahydropyrazolo[3,4-c]pyridin-2-yl; 4-amino-4-methyl-1-piperidinyl; 5,6,7,8-tetrahydro-1,6-naphthyridin-2-ylamino; 5,6,7,8-tetrahydro-1,6-naphthyridin-2-yloxy; 5,6,7,8-tetrahydro-1,7-naphthyridin-2-ylamino; 5,6,7,8-tetrahydro-2,6-naphthyridin-3-ylamino; 5,6,7,8-tetrahydropyrido[4,3-d]pyrimidin-2-ylamino; 6-piperazin-1-yl-3,4-dihydro-1H-isoquinolin-2-yl; methyl(5,6,7,8-tetrahydro-1,6-naphthyridin-2-yl)amino; or piperazin-1-yl.

6. A compound according to claim 5, wherein R² is methyl.

7. A compound according to claim 4, wherein R³ is ($C_{1-6}$alkyl)₂aminopiperidinyl; ($C_{1-6}$alkyl-4,5,6,7-tetrahydropyrazolo[3,4-c]pyridinyl)azetidinyl; 3,8-diazabicyclo[3.2.1]octanyl; piperazinyl; or piperazinyl-7,8-dihydro-5H-pyrido[3,4-b]pyrazinyl.

8. A compound according to claim 7, wherein R³ is (5-methyl-4,5,6,7-tetrahydropyrazolo[3,4-c]pyridin-1-yl)azetidin-1-yl; 3,8-diazabicyclo[3.2.1]octan-3-yl; 3-piperazin-1-yl-7,8-dihydro-5H-pyrido[3,4-b]pyrazin-6-yl; 4-(dimethylamino)-1-piperidinyl; or piperazin-1-yl.

9. A compound according to claim 2, wherein R³ is ($C_{1-6}$alkyl)₂aminopiperidinyl; ($C_{1-6}$alkyl-4,5,6,7-tetrahydropyrazolo[3,4-c]pyridinyl)azetidinyl; 3,8-diazabicyclo[3.2.1]octanyl; piperazinyl; or piperazinyl-7,8-dihydro-5H-pyrido[3,4-b]pyrazinyl;
or a pharmaceutically acceptable salt thereof.

10. A compound according to claim 9, wherein:
R² is methyl; and
R³ is (5-methyl-4,5,6,7-tetrahydropyrazolo[3,4-c]pyridin-1-yl)azetidin-1-yl; 3,8-diazabicyclo[3.2.1]octan-3-yl; 3-piperazin-1-yl-7,8-dihydro-5H-pyrido[3,4-b]pyrazin-6-yl; 4-(dimethylamino)-1-piperidinyl; or piperazin-1-yl;
or a pharmaceutically acceptable salt thereof.

11. A compound selected from:

5-[(4R,7R,8aS)-4-methyl-7-(5,6,7,8-tetrahydro-1,6-naphthyridin-2-ylamino)-3,4,6,7,8,8a-hexahydro-1H-pyrrolo[1,2-a]pyrazin-2-yl]quinoline-8-carbonitrile;

5-[(4R,7R,8aS)-4-methyl-7-(5,6,7,8-tetrahydro-2,6-naphthyridin-3-ylamino)-3,4,6,7,8,8a-hexahydro-1H-pyrrolo[1,2-a]pyrazin-2-yl]quinoline-8-carbonitrile;

5-[(4R,7R,8aS)-4-methyl-7-(5,6,7,8-tetrahydro-1,7-naphthyridin-2-ylamino)-3,4,6,7,8,8a-hexahydro-1H-pyrrolo[1,2-a]pyrazin-2-yl]quinoline-8-carbonitrile;

5-[(4R,7R,8aS)-4-methyl-7-[(6-methyl-7,8-dihydro-5H-1,6-naphthyridin-2-yl)amino]-3,4,6,7,8,8a-hexahydro-1H-pyrrolo[1,2-a]pyrazin-2-yl]quinoline-8-carbonitrile;

5-[(4R,7R,8aS)-4-methyl-7-[methyl(5,6,7,8-tetrahydro-1,6-naphthyridin-2-yl)amino]-3,4,6,7,8,8a-hexahydro-1H-pyrrolo[1,2-a]pyrazin-2-yl]quinoline-8-carbonitrile;

5-[(4R,7R,8aS)-4-methyl-7-(5,6,7,8-tetrahydropyrido[4,3-d]pyrimidin-2-ylamino)-3,4,6,7,8,8a-hexahydro-1H-pyrrolo[1,2-a]pyrazin-2-yl]quinoline-8-carbonitrile;

5-[(4R,7R,8aS)-4-methyl-7-[[(5R)-5-methyl-6,7-dihydro-5H-pyrrolo[3,4-b]pyridin-2-yl]amino]-3,4,6,7,8,8a-hexahydro-1H-pyrrolo[1,2-a]pyrazin-2-yl]quinoline-8-carbonitrile;

5-[(4R,7R,8aS)-4-methyl-7-[[(5S)-5-methyl-6,7-dihydro-5H-pyrrolo[3,4-b]pyridin-2-yl]amino]-3,4,6,7,8,8a-hexahydro-1H-pyrrolo[1,2-a]pyrazin-2-yl]quinoline-8-carbonitrile;

5-[(4R,7R,8aS)-4-methyl-7-[[(7S)-7-methyl-5,6,7,8-tetrahydro-1,6-naphthyridin-2-yl]amino]-3,4,6,7,8,8a-hexahydro-1H-pyrrolo[1,2-a]pyrazin-2-yl]quinoline-8-carbonitrile;

5-[(4R,7R,8aS)-4-methyl-7-[[(7R)-7-methyl-5,6,7,8-tetrahydro-1,6-naphthyridin-2-yl]amino]-3,4,6,7,8,8a-hexahydro-1H-pyrrolo[1,2-a]pyrazin-2-yl]quinoline-8-carbonitrile;

5-[(4R,7R,8aS)-4-methyl-7-[[(5S)-5-methyl-5,6,7,8-tetrahydro-2,6-naphthyridin-3-yl]amino]-3,4,6,7,8,8a-hexahydro-1H-pyrrolo[1,2-a]pyrazin-2-yl]quinoline-8-carbonitrile;

5-[(4R,7R,8aS)-4-methyl-7-[[(5R)-5-methyl-5,6,7,8-tetrahydro-2,6-naphthyridin-3-yl]amino]-3,4,6,7,8,8a-hexahydro-1H-pyrrolo[1,2-a]pyrazin-2-yl]quinoline-8-carbonitrile;

5-[(4R,7S,8aS)-4-methyl-7-(6-piperazin-1-yl-3,4-dihydro-1H-isoquinolin-2-yl)-3,4,6,7,8,8a-hexahydro-1H-pyrrolo[1,2-a]pyrazin-2-yl]quinoline-8-carbonitrile;

5-[(4R,7S,8aS)-7-[2-[(3R,4R)-3-amino-4-methoxy-pyrrolidin-1-yl]-7,8-dihydro-5H-1,6-naphthyridin-6-yl]-4-methyl-3,4,6,7,8,8a-hexahydro-1H-pyrrolo[1,2-a]pyrazin-2-yl]quinoline-8-carbonitrile;

5-[(4R,7S,8aS)-7-[7-[(3R,4R)-3-amino-4-methoxy-pyrrolidin-1-yl]-3,4-dihydro-1H-2,6-naphthyridin-2-yl]-4-methyl-3,4,6,7,8,8a-hexahydro-1H-pyrrolo[1,2-a]pyrazin-2-yl]quinoline-8-carbonitrile;

5-[(4R,7R,8aS)-4-methyl-7-[4-(5,6,7,8-tetrahydro-2,6-naphthyridin-3-yl)piperazin-1-yl]-3,4,6,7,8,8a-hexahydro-1H-pyrrolo[1,2-a]pyrazin-2-yl]quinoline-8-carbonitrile;

5-[(4R,8aS)-4-methyl-7-(5,6,7,8-tetrahydro-1,6-naphthyridin-2-yloxy)-3,4,6,7,8,8a-hexahydro-1H-pyrrolo[1,2-a]pyrazin-2-yl]quinoline-8-carbonitrile;

5-[(4R,7S,8aS)-4-methyl-7-piperazin-1-yl-3,4,6,7,8,8a-hexahydro-1H-pyrrolo[1,2-a]pyrazin-2-yl]-2-deuterio-quinoline-8-carbonitrile;

2-Deuterio-5-[(4R,7S,8aS)-7-(3,8-diazabicyclo[3.2.1]octan-3-yl)-4-methyl-3,4,6,7,8,8a-hexahydro-1H-pyrrolo[1,2-a]pyrazin-2-yl]quinoline-8-carbonitrile;

5-[(4R,7S,8aS)-7-(3-amino-3-methyl-azetidin-1-yl)-4-methyl-3,4,6,7,8,8a-hexahydro-1H-pyrrolo[1,2-a]pyrazin-2-yl]-2-deuterio-quinoline-8-carbonitrile;

5-[(4R,7S,8aS)-7-(4-amino-4-methyl-1-piperidyl)-4-methyl-3,4,6,7,8,8a-hexahydro-1H-pyrrolo[1,2-a]pyrazin-2-yl]-2-deuterio-quinoline-8-carbonitrile;

2-Deuterio-5-[(4R,7S,8aS)-7-(3-amino-3-methyl-pyrrolidin-1-yl)-4-methyl-3,4,6,7,8,8a-hexahydro-1H-pyrrolo[1,2-a]pyrazin-2-yl]quinoline-8-carbonitrile;

5-[(4R,7S,8aS)-7-[4-(dimethylamino)-1-piperidyl]-4-methyl-3,4,6,7,8,8a-hexahydro-1H-pyrrolo[1,2-a]pyrazin-2-yl]-2-deuterio-quinoline-8-carbonitrile;

2-Deuterio-5-[(4R,7S,8aS)-7-(2,9-diazaspiro[5.5]undecan-9-yl)-4-methyl-3,4,6,7,8,8a-hexahydro-1H-pyrrolo[1,2-a]pyrazin-2-yl]quinoline-8-carbonitrile;

5-[(4R,7S,8aS)-4-methyl-7-[3-[(5R)-5-methyl-4,5,6,7-tetrahydropyrazolo[3,4-c]pyridin-1-yl]azetidin-1-yl]-3,4,6,7,8,8a-hexahydro-1H-pyrrolo[1,2-a]pyrazin-2-yl]-2-deuterio-quinoline-8-carbonitrile;

5-[(4R,7S,8aS)-4-methyl-7-[3-[(5R)-5-methyl-4,5,6,7-tetrahydropyrazolo[3,4-c]pyridin-2-yl]azetidin-1-yl]-3,4,6,7,8,8a-hexahydro-1H-pyrrolo[1,2-a]pyrazin-2-yl]-2-deuterio-quinoline-8-carbonitrile;

2-Deuterio-5-[(4R,7S,8aS)-4-methyl-7-(4,5,6,7-tetrahydropyrazolo[3,4-c]pyridin-1-yl)-3,4,6,7,8,8a-hexahydro-1H-pyrrolo[1,2-a]pyrazin-2-yl]quinoline-8-carbonitrile;

2-deuterio-5-[(4R,7S,8aS)-4-methyl-7-(4,5,6,7-tetrahydropyrazolo[3,4-c]pyridin-2-yl)-3,4,6,7,8,8a-hexahydro-1H-pyrrolo[1,2-a]pyrazin-2-yl]quinoline-8-carbonitrile; and 2-Deuterio-5-[(4R,7S,8aS)-4-methyl-7-(2,9-diazaspiro[5.5]undecan-9-yl)-4-methyl-3,4,6,7,8,8a-hexahydro-1H-pyrrolo[1,2-a]pyrazin-2-yl]quinoline-8-carbonitrile;

or a pharmaceutically acceptable salt thereof.

12. A process for the preparation of a compound according to claim 1, the process comprising any one of the following steps:

a) Buchwald-Hartwig amination reaction or nucleophilic substitution between a compound of formula (V),

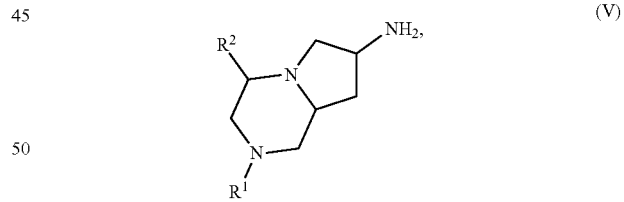

and a compound of formula (VI), X—R⁷ (VI);

b) reductive amination of a compound of formula (VII),

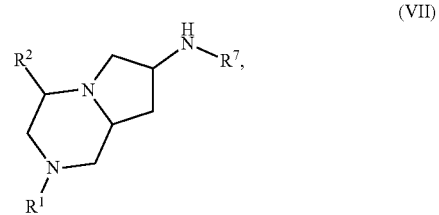

with $R^8$—CHO;
c) substitution reaction between a compound of formula (XII),

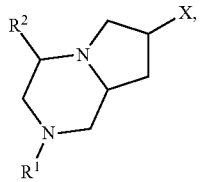
(XII)

and amine $NHR^7R^8$;
d) Buchwald-Hartwig amination reaction or nucleophilic substitution between a compound of formula (XIII),

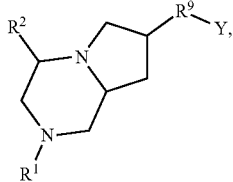
(XIII)

and amine $NHR^7R^8$; and
e) nucleophilic substitution between a compound of formula (XVII),

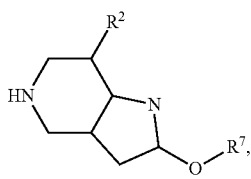
(XVII)

and a compound of formula (II), $X—R^1$ (II);

wherein:

X is halogen;

Y is halogen or a leaving group;

$R^7$ is a 5-7 membered monocyclic aryl or heteroaryl, or a 7-12 membered bicyclic heterocyclyl;

$R^8$ is H or $C_{1-6}$alkyl; and $R^9$ is a 5-7 membered monocyclic aryl or heteroaryl, or a 7-12 membered bicyclic heterocyclyl.

13. A pharmaceutical composition comprising a compound in accordance with claim 1 and a therapeutically inert carrier.

14. A compound of formula (I), or a pharmaceutically acceptable salt thereof, when manufactured according to a process of claim 12.

15. A method for the treatment or prophylaxis of systemic lupus erythematosus or lupus nephritis, which method comprises administering a therapeutically effective amount of a compound as defined in claim 1 to a patient in need thereof.

16. A method for the treatment or prophylaxis of systemic lupus erythematosus or lupus nephritis, which method comprises administering a therapeutically effective amount of a compound as defined in claim 11 to a patient in need thereof.

17. A pharmaceutical composition comprising a compound in accordance with claim 11 and a therapeutically inert carrier.

18. The process of claim 12, wherein Y is methanesulfonate.

* * * * *